United States Patent
Kim et al.

(10) Patent No.: US 12,289,685 B2
(45) Date of Patent: Apr. 29, 2025

(54) TECHNIQUE FOR PERFORMING MULTI-LINK COMMUNICATION IN WIRELESS COMMUNICATION SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Suhwook Kim, Seoul (KR); Sungjin Park, Seoul (KR); Taewon Song, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 469 days.

(21) Appl. No.: 17/758,378

(22) PCT Filed: Jan. 11, 2021

(86) PCT No.: PCT/KR2021/000315
§ 371 (c)(1),
(2) Date: Nov. 28, 2022

(87) PCT Pub. No.: WO2021/141466
PCT Pub. Date: Jul. 15, 2021

(65) Prior Publication Data
US 2023/0146451 A1 May 11, 2023

(30) Foreign Application Priority Data

Jan. 10, 2020 (KR) .................. 10-2020-0003867
Jan. 10, 2020 (KR) .................. 10-2020-0003870

(Continued)

(51) Int. Cl.
*H04W 52/02* (2009.01)
*H04W 74/0816* (2024.01)
*H04W 84/12* (2009.01)

(52) U.S. Cl.
CPC ..... *H04W 52/028* (2013.01); *H04W 52/0235* (2013.01); *H04W 74/0816* (2013.01); *H04W 84/12* (2013.01)

(58) Field of Classification Search
CPC .......... H04W 52/0235; H04W 52/028; H04W 74/0816; H04W 84/12
See application file for complete search history.

(56) References Cited

U.S. PATENT DOCUMENTS

2021/0007168 A1* 1/2021 Asterjadhi ........ H04W 52/0235

FOREIGN PATENT DOCUMENTS

WO 2017-086731 5/2017

OTHER PUBLICATIONS

PCT International Application No. PCT/KR2021/000315, International Search Report dated Apr. 1, 2021, 4 pages.

(Continued)

*Primary Examiner* — Kent Krueger
(74) *Attorney, Agent, or Firm* — LEE, HONG, DEGERMAN, KANG & WAIMEY

(57) ABSTRACT

According to various embodiments, a multi-link device including a first STA and a second STA may receive a first PPDU by means of the first STA. The PPDU may include information about traffic buffered in the second STA operating in a second link. In response to the first PPDU, the multi-link device may change the second STA from a doze state to an awake state, and transmit information about the state of the second STA by means of the second STA.

17 Claims, 62 Drawing Sheets

(30) Foreign Application Priority Data

Mar. 20, 2020 (KR) .......................... 10-2020-0034656
Mar. 25, 2020 (KR) .......................... 10-2020-0036476

(56) References Cited

OTHER PUBLICATIONS

Chu et al., "Multi-Link Power Save," IEEE 802.11-19/1617r1, Sep. 2019, 10 pages.
Kim et al., "EHT Power saving considering multi-link," IEEE 802.11-19/1510r1, Sep. 2019, 17 pages.
Chitrakar et al., "Power Consideration for Multi-link Transmissions," IEEE 802.11-19/1536r2, Sep. 2019, 12 pages.
Patil et al., "Multi-Link Operation: Anchor Channel," IEEE 802.11-19/1526r1, Sep. 2019, 12 pages.

* cited by examiner

FIG. 1
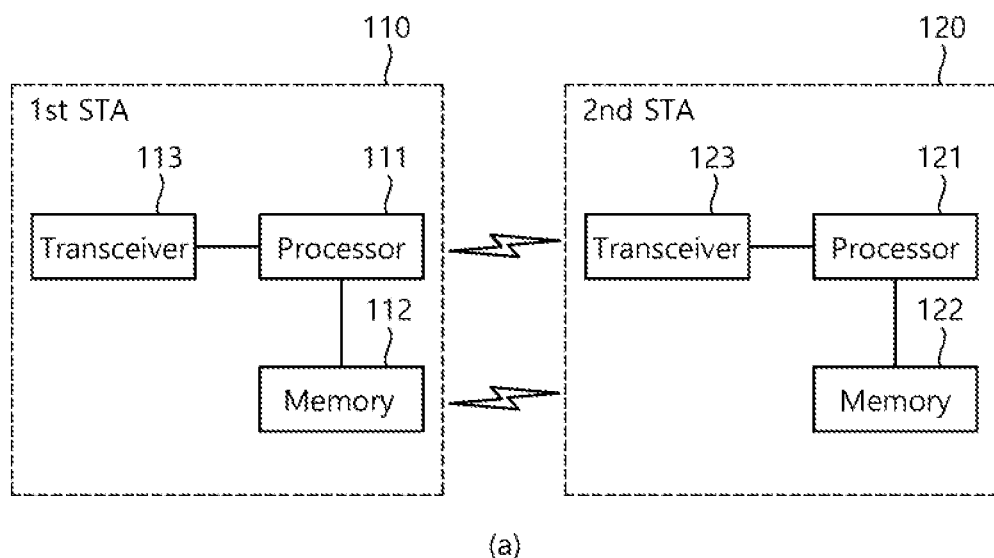
(a)
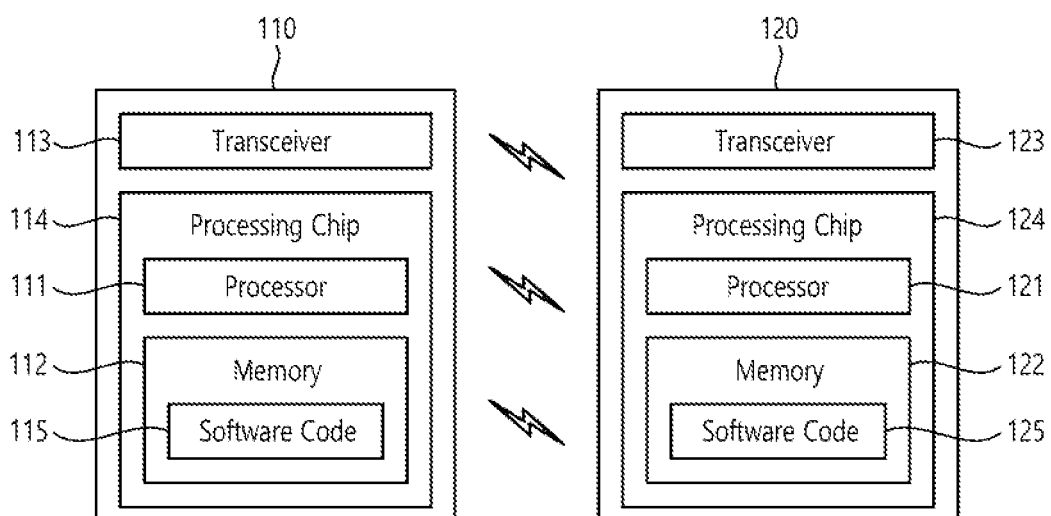
(b)

FIG. 2
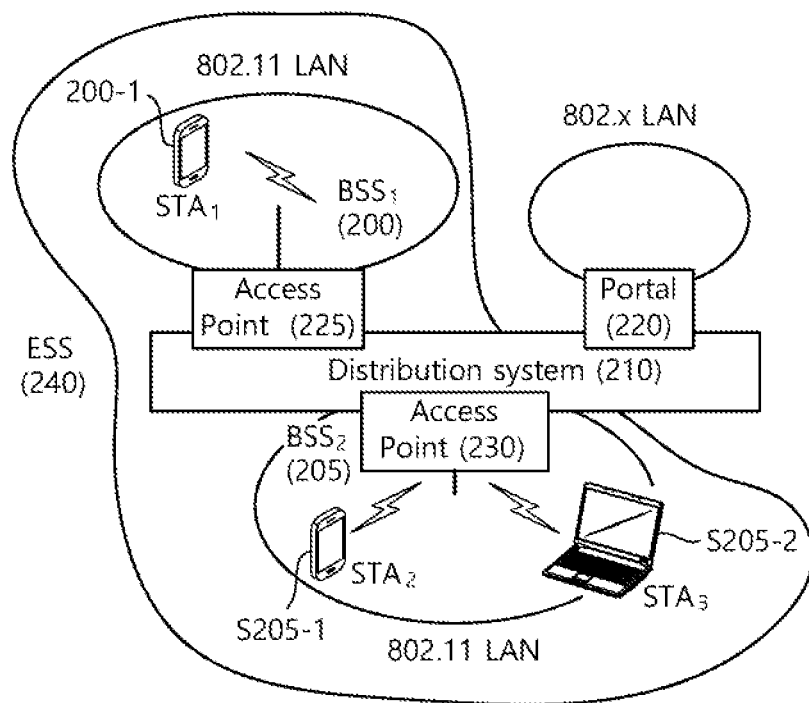
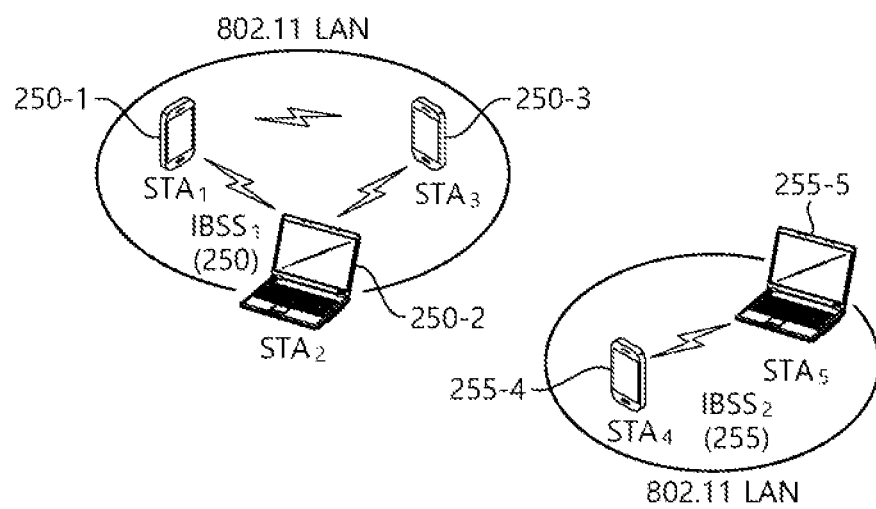

FIG. 4
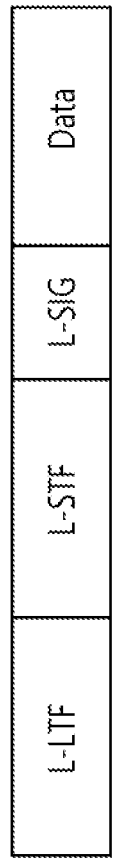
PPDU Format (IEEE 802.11a/g)
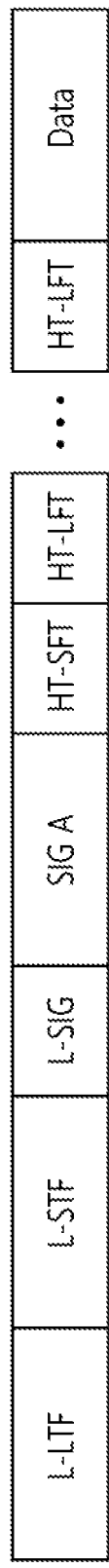
HT PPDU Format (IEEE 802.11n)
VHT PPDU Format (IEEE 802.11ac)
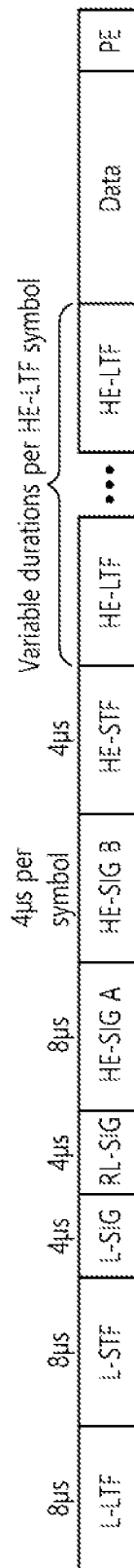

TECHNIQUE FOR PERFORMING MULTI-LINK COMMUNICATION IN WIRELESS COMMUNICATION SYSTEM

CROSS-REFERENCE TO RELATED APPLICATIONS

This application is the National Stage filing under 35 U.S.C. 371 of International Application No. PCT/KR2021/000315, filed on Jan. 11, 2021, which claims the benefit of earlier filing date and right of priority to Korean Application Nos. 10-2020-0003867, filed on Jan. 10, 2020, 10-2020-0003870, filed on Jan. 10, 2020, 10-2020-0034656, filed on Mar. 20, 2020, and 10-2020-0036476, filed on Mar. 25, 2020, the contents of which are all hereby incorporated by reference herein in their entireties.

BACKGROUND

Field of the Disclosure

The present specification relates to a technique for performing multi-link communication in a wireless LAN system, and more particularly, to a method for changing n STA from a doze state to an awake state in multi-link communication, and an apparatus supporting the same.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

SUMMARY

Technical Problem

In the EHT standard, in order to support high throughput and high data rate, a wide bandwidth (for example, 160/320 MHz), 16 streams, and/or multi-link (or multi-band) operation may be used.

In the EHT standard, a power reduction technique for reducing power consumption of a multi-link device (MLD) may be applied/used in a power management. An MLD in which simultaneous transmission and reception (STR) is not supported and/or an MLD in which STR is supported may activate a power saving mechanism (PSM) (for example, non-STR PSM or STR PSM).

As such, when the non-AP MLD enters the doze state by the PSM, a technical feature regarding signaling for waking it may be required. Specifically, a technical feature for changing a STA operating in link 2 from a doze state to an awake state through link 1 may be required.

Technical Solutions

According to various embodiments, a multi-link device (MLD) including a first station (STA) and a second STA may perform the steps of receiving, through the first STA operating in a first link, a first physical layer protocol data unit (PPDU), wherein the first PPDU includes information on traffic buffered in the second STA operating in a second link; changing the second STA from a doze state to an awake state in response to the first PPDU; and transmitting, through the second STA, a second PPDU including information on a state of the second STA, after the state of the second STA is changed to the awake state.

Technical Effects

According to various embodiments, the multi-link device may activate PSM (for example, non-STR PSM or STR PSM) in at least one link among multi-links to avoid collision between links. For example, when the non-STR PSM is activated in at least one link, collisions can be avoided and power consumption can be reduced.

According to various embodiments, the multi-link device may receive, from the AP, information indicating that traffic for the STA in the doze state has occurred. The multi-link device may change the STA to the awake state based on information indicating that traffic for the STA in the doze state has occurred. In addition, the STA may transmit a PPDU including information on its own state to the AP. Accordingly, when traffic for a STA in a doze state occurs, there is the effect that the STA can be changed to an awake state regardless of the beacon listen interval.

According to various embodiments, the STA changed to the awake state may receive buffered traffic. Accordingly, there is the effect of increasing link utilization.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

DETAILED DESCRIPTION

Figure 3:
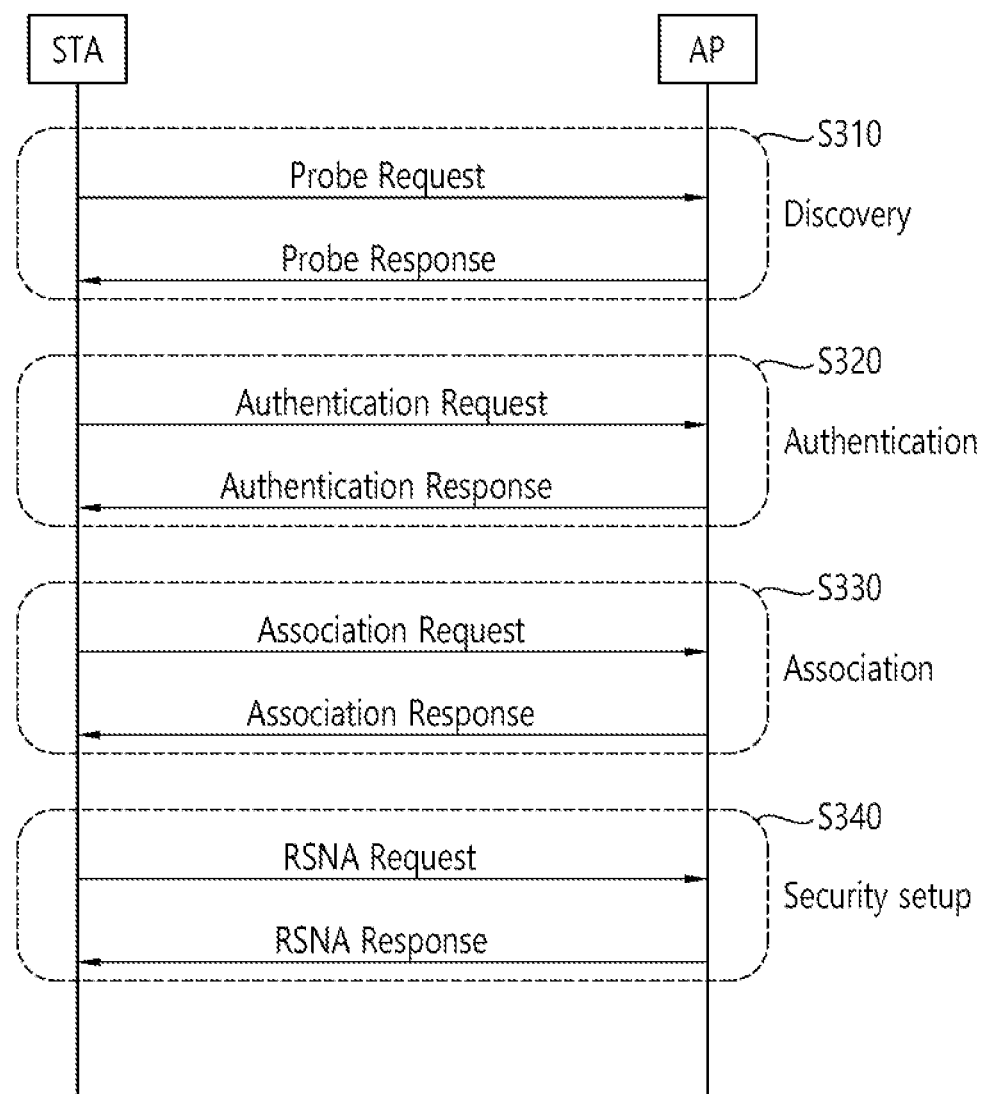
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
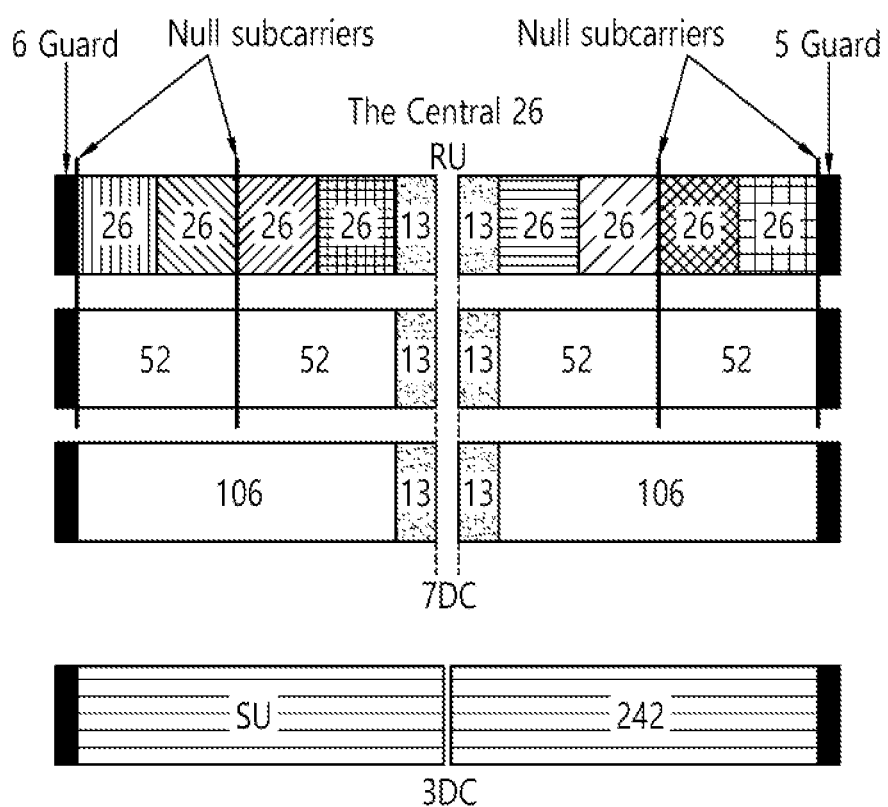
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
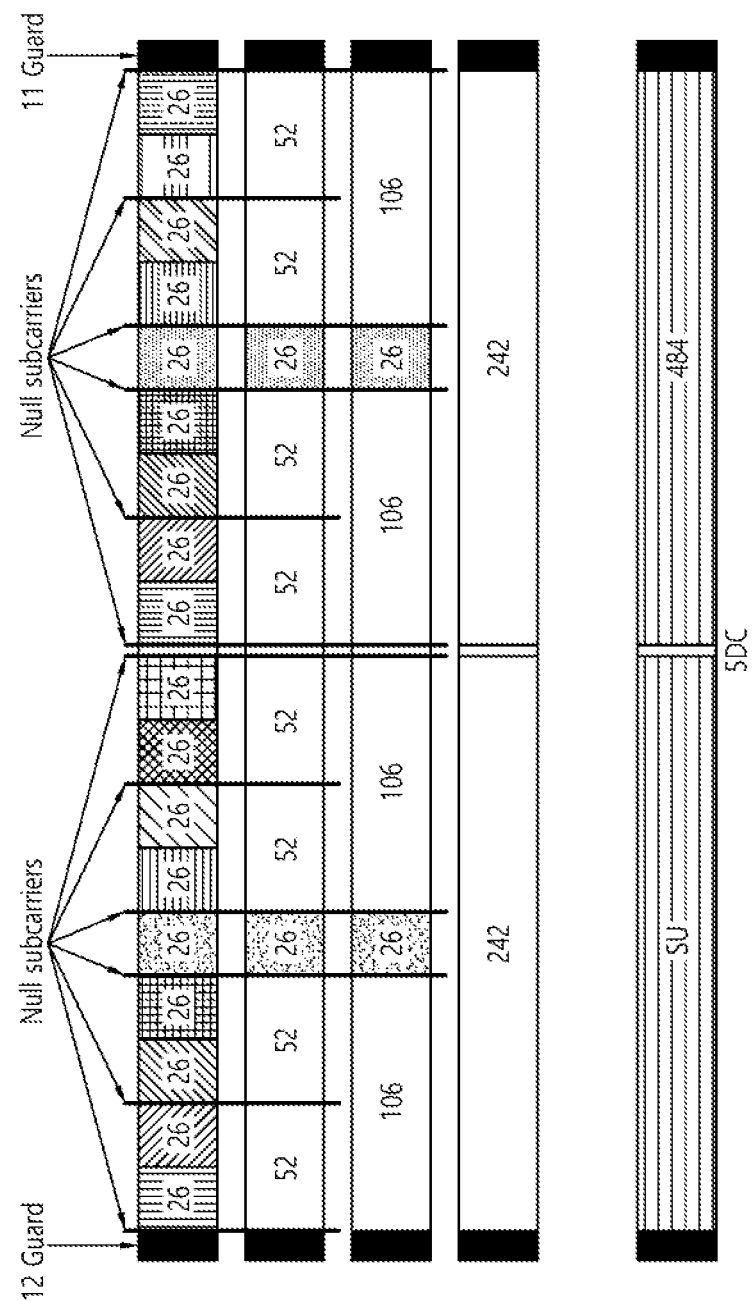
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
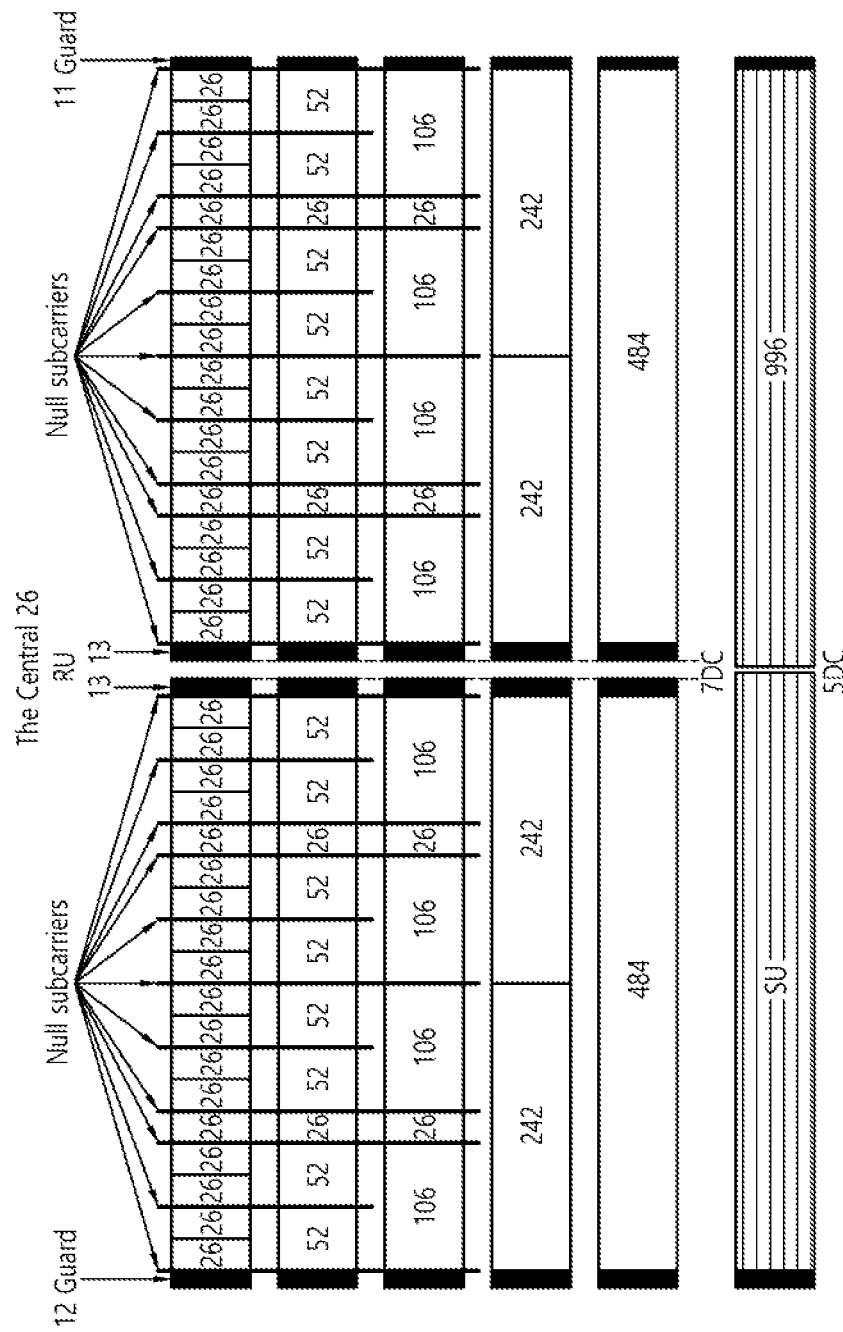
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
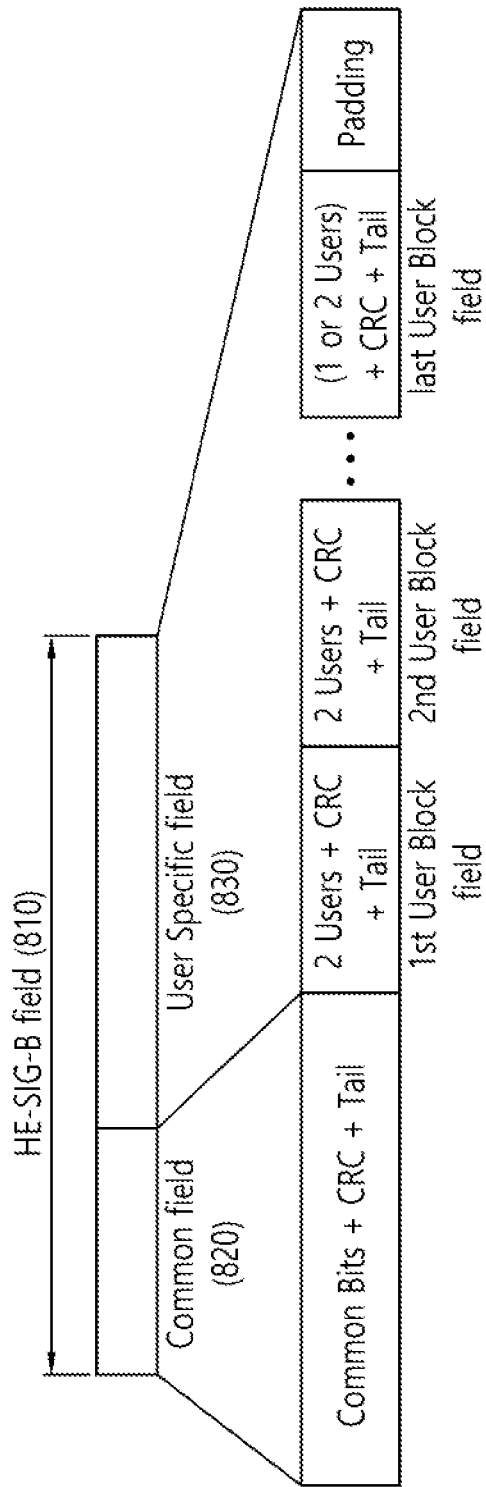
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 |  | 52 | 1 |
| 00000010 | 26 | 26 | 26 | 26 | 26 |  | 52 | 26 | 26 | 1 |
| 00000011 | 26 | 26 | 26 | 26 | 26 |  | 52 |  | 52 | 1 |
| 00000100 | 26 | 26 |  | 52 | 26 | 26 | 26 | 26 |  | 1 |
| 00000101 | 26 | 26 |  | 52 | 26 | 26 | 26 |  | 52 | 1 |
| 00000110 | 26 | 26 |  | 52 | 26 |  | 52 | 26 | 26 | 1 |
| 00000111 | 26 | 26 |  | 52 | 26 |  | 52 |  | 52 | 1 |
| 00001000 |  | 52 | 26 | 26 | 26 | 26 | 26 | 26 |  | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | | 106 | | 26 | 26 | 26 | 26 | 26 | | 8 |
| 01001$y_2y_1y_0$ | | 106 | | 26 | 26 | 26 | 52 | | | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
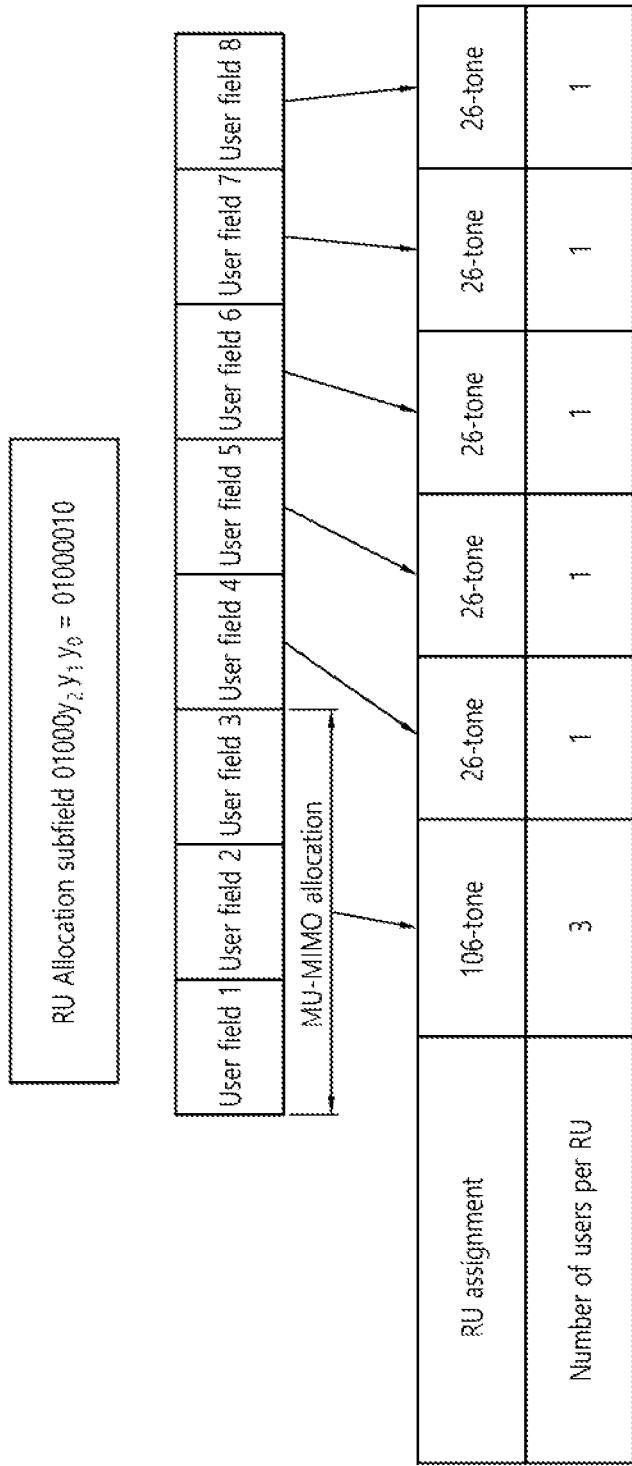
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$ [1] | $N_{STS}$ [2] | $N_{STS}$ [3] | $N_{STS}$ [4] | $N_{STS}$ [5] | $N_{STS}$ [6] | $N_{STS}$ [7] | $N_{STS}$ [8] | Total $N_{STS}$ | Number of entries |
|---|---|---|---|---|---|---|---|---|---|---|---|
| 2 | 0000-0011 | 1-4 | 1 | | | | | | | 2-5 | 10 |
| | 0100-0110 | 2-4 | 2 | | | | | | | 4-6 | |
| | 0111-1000 | 3-4 | 3 | | | | | | | 6-7 | |
| | 1001 | 4 | 4 | | | | | | | 8 | |
| 3 | 0000-0011 | 1-4 | 1 | 1 | | | | | | 3-6 | 13 |
| | 0100-0110 | 2-4 | 2 | 1 | | | | | | 5-7 | |
| | 0111-1000 | 3-4 | 3 | 1 | | | | | | 7-8 | |
| | 1001-1011 | 2-4 | 2 | 2 | | | | | | 6-8 | |
| | 1100 | 3 | 3 | 2 | | | | | | 8 | |
| 4 | 0000-0011 | 1-4 | 1 | 1 | 1 | | | | | 4-7 | 11 |
| | 0100-0110 | 2-4 | 2 | 1 | 1 | | | | | 6-8 | |
| | 0111 | 3 | 3 | 1 | 1 | | | | | 8 | |
| | 1000-1001 | 2-3 | 2 | 2 | 1 | | | | | 7-8 | |
| | 1010 | 2 | 2 | 2 | 2 | | | | | 8 | |

TABLE 4

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS[1], N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
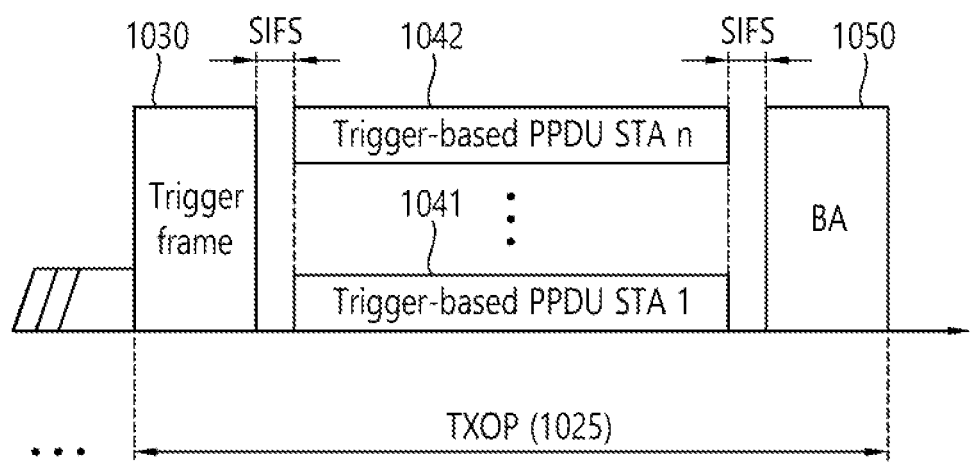
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
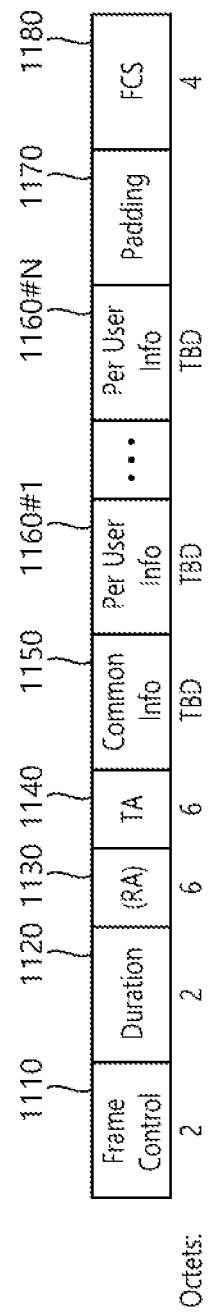
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
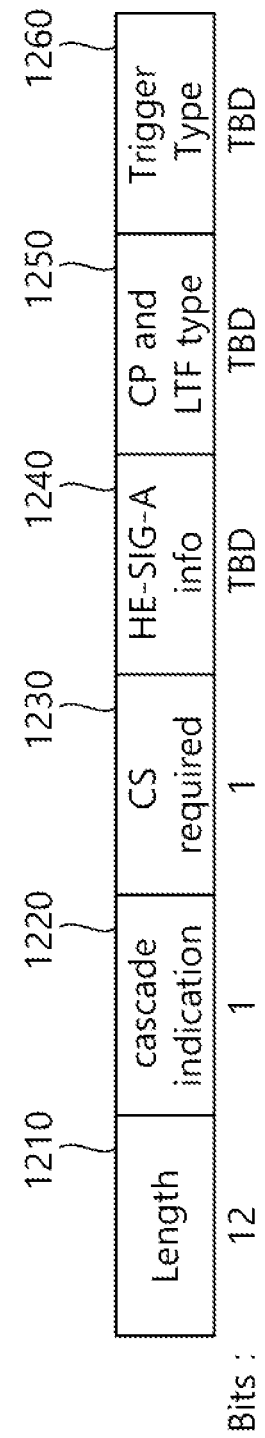
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
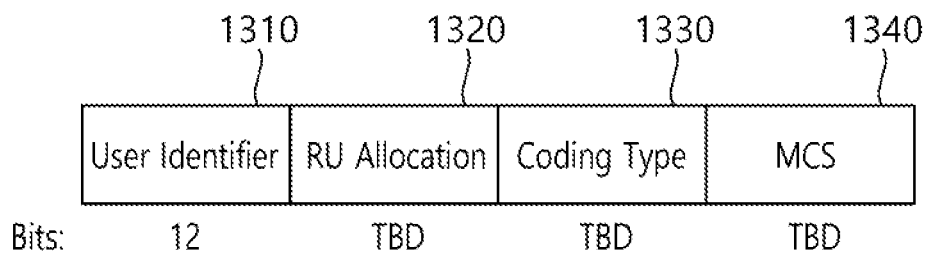
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
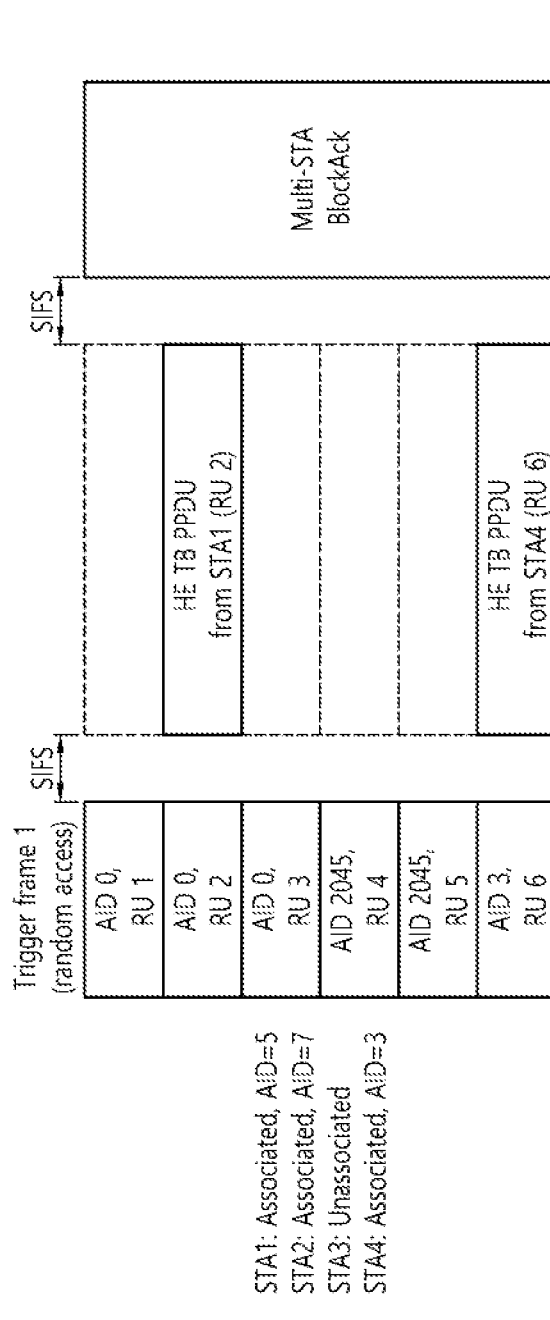
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
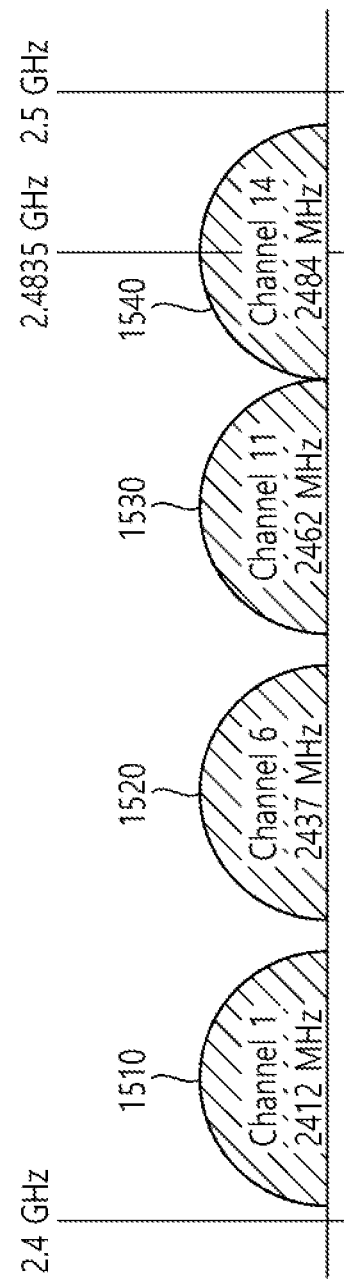
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
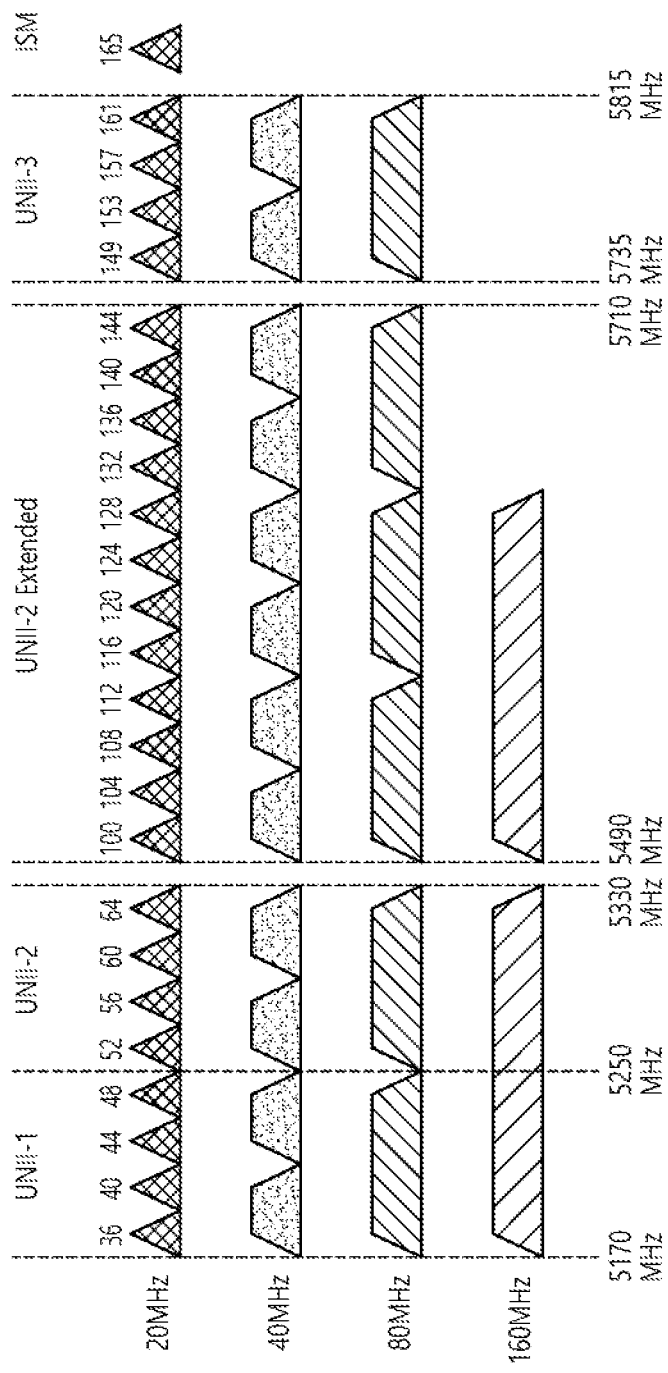
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
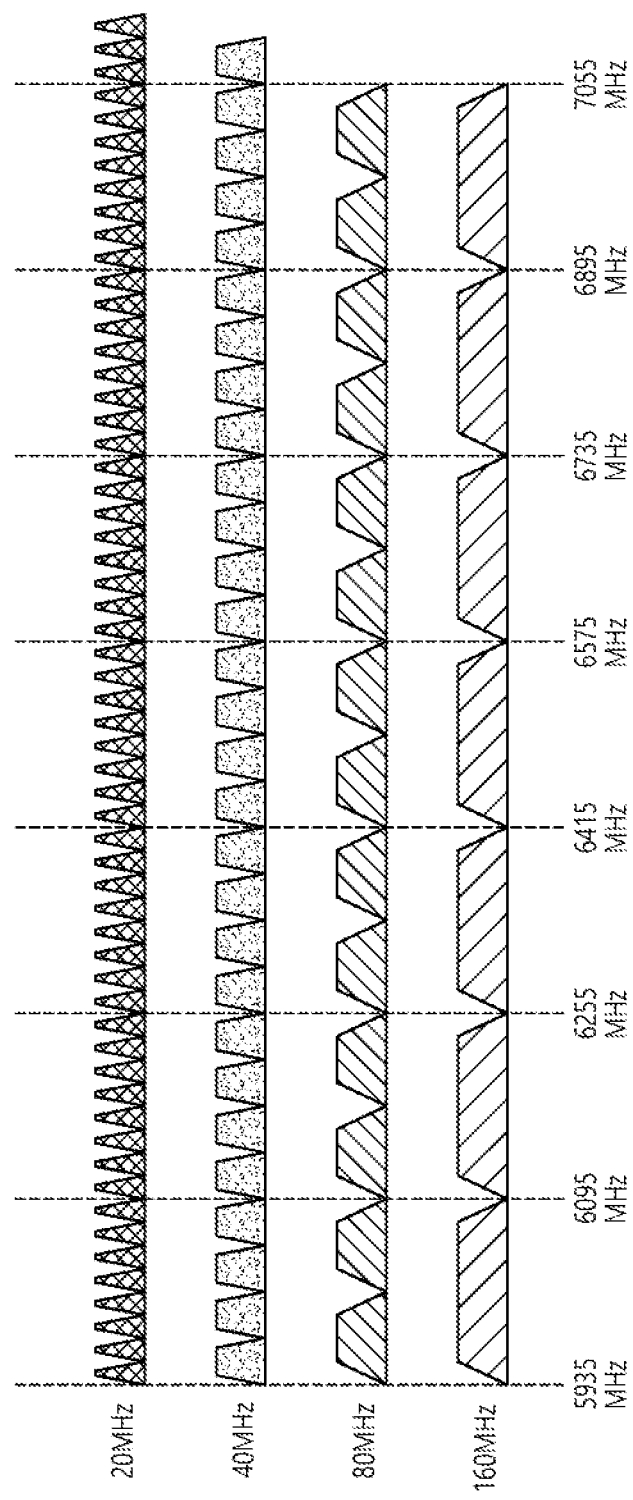
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
FIG. 18 illustrates an example of a PPDU used in the present specification.

FIG. 18 illustrates an example of a PPDU used in the present specification.

The PPDU of FIG. 18 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 18 may indicate the entirety or part of a PPDU type used in the EHT system. For example, the example of FIG. 18 may be used for both of a single-user (SU) mode and a multi-user (MU) mode. In other words, the PPDU of FIG. 18 may be a PPDU for one receiving STA or a plurality of receiving STAs. When the PPDU of FIG. 18 is used for a trigger-based (TB) mode, the EHT-SIG of FIG. 18 may be omitted. In other words, a STA which has received a trigger frame for uplink-MU (UL-MU) may transmit the PPDU in which the EHT-SIG is omitted in the example of FIG. 18.

In FIG. 18, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 18 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 18, the L-LTE and the L-STF may be the same as those in the conventional fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 18. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g., 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 18. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 18 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

The example of Table 5 to Table 7 is an example of 8-bit (or N-bit) information for various RU allocations. An index shown in each table may be modified, and some entries in Table 5 to Table 7 may be omitted, and entries (not shown) may be added.

The example of Table 5 to Table 7 relates to information related to a location of an RU allocated to a 20 MHz band. For example, 'an index 0' of Table 5 may be used in a situation where nine 26-RUs are individually allocated (e.g., in a situation where nine 26-RUs shown in FIG. 5 are individually allocated).

Meanwhile, a plurality or RUs may be allocated to one STA in the EHT system. For example, regarding 'an index 60' of Table 6, one 26-RU may be allocated for one user (i.e., receiving STA) to the leftmost side of the 20 MHz band, one 26-RU and one 52-RU may be allocated to the right side thereof, and five 26-RUs may be individually allocated to the right side thereof.

TABLE 5

| Indices | #1 | #2 | #3 | #4 | #5 | #6 | #7 | #8 | #9 | Number of entries |
|---|---|---|---|---|---|---|---|---|---|---|
| 0 | 26 | 26 | 26 | 26 | 26 | 26 | 26 | 26 | 26 | 1 |
| 1 | 26 | 26 | 26 | 26 | 26 | 26 | 26 | 52 | | 1 |
| 2 | 26 | 26 | 26 | 26 | 26 | 52 | | 26 | 26 | 1 |
| 3 | 26 | 26 | 26 | 26 | 26 | 52 | | 52 | | 1 |
| 4 | 26 | 26 | | 52 | 26 | 26 | 26 | 26 | 26 | 1 |
| 5 | 26 | 26 | | 52 | 26 | 26 | 26 | 52 | | 1 |
| 6 | 26 | 26 | | 52 | 26 | 52 | | 26 | 26 | 1 |
| 7 | 26 | 26 | | 52 | 26 | 52 | | 52 | | 1 |
| 8 | 52 | | 26 | 26 | 26 | 26 | 26 | 26 | 26 | 1 |
| 9 | 52 | | 26 | 26 | 26 | 26 | 26 | 52 | | 1 |
| 10 | 52 | | 26 | 26 | 26 | 52 | | 26 | 26 | 1 |
| 11 | 52 | | 26 | 26 | 26 | 52 | | 52 | | 1 |
| 12 | 52 | | | 52 | 26 | 26 | 26 | 26 | 26 | 1 |
| 13 | 52 | | | 52 | 26 | 26 | 26 | 52 | | 1 |
| 14 | 52 | | | 52 | 26 | 52 | | 26 | 26 | 1 |
| 15 | 52 | | | 52 | 26 | 52 | | 52 | | 1 |
| 16 | 26 | 26 | 26 | 26 | 26 | 106 | | | | 1 |
| 17 | 26 | 26 | | 52 | 26 | 106 | | | | 1 |

TABLE 5-continued

| Indices | #1 | #2 | #3 | #4 | #5 | #6 | #7 | #8 | #9 | Number of entries |
|---|---|---|---|---|---|---|---|---|---|---|
| 18 | 52 | 26 | 26 | 26 | | 106 | | | | 1 |
| 19 | 52 | | 52 | 26 | | 106 | | | | 1 |

TABLE 6

| Indices | #1 | #2 | #3 | #4 | #5 | #6 | #7 | #8 | #9 | Number of entries |
|---|---|---|---|---|---|---|---|---|---|---|
| 20 | | 106 | | 26 | 26 | 26 | 26 | 26 | | 1 |
| 21 | | 106 | | 26 | 26 | 26 | | 52 | | 1 |
| 22 | | 106 | | 26 | 52 | | 26 | 26 | | 1 |
| 23 | | 106 | | 26 | 52 | | 52 | | | 1 |
| 24 | 52 | | 52 | — | 52 | | 52 | | | 1 |
| 25 | 242-tone RU empty (with zero users) | | | | | | | | | 1 |
| 26 | | 106 | | 26 | | 106 | | | | 1 |
| 27-34 | | | | 242 | | | | | | 8 |
| 35-42 | | | | 484 | | | | | | 8 |
| 43-50 | | | | 996 | | | | | | 8 |
| 51-58 | | | | 2*996 | | | | | | 8 |
| 59 | 26 | 26 | 26 | 26 | 26 | 52 + 26 | | 26 | | 1 |
| 60 | 26 | 26 + 52 | | 26 | 26 | 26 | 26 | 26 | | 1 |
| 61 | 26 | 26 + 52 | | 26 | 26 | 26 | | 52 | | 1 |
| 62 | 26 | 26 + 52 | | 26 | 52 | | 26 | 26 | | 1 |
| 63 | 26 | 26 | 52 | 26 | 52 + 26 | | 26 | | | 1 |
| 64 | 26 | 26 + 52 | | 26 | 52 + 26 | | 26 | | | 1 |
| 65 | 26 | 26 + 52 | | 26 | 52 | | 52 | | | 1 |

TABLE 7

| 66 | 52 | | 26 | 26 | 26 | 52 + 26 | | 26 | | 1 |
|---|---|---|---|---|---|---|---|---|---|---|
| 67 | 52 | | 52 | | 26 | 52 + 26 | | 26 | | 1 |
| 68 | 52 | | 52 + 26 | | 52 | | 52 | | | 1 |
| 69 | 26 | 26 | 26 | 26 | | 26 + 106 | | | | 1 |
| 70 | 26 | | 26 + 52 | | 26 | | 106 | | | 1 |
| 71 | 26 | 26 | 52 | | | 26 + 106 | | | | 1 |
| 72 | 26 | | 26 + 52 | | | 26 + 106 | | | | 1 |
| 73 | 52 | | 26 | 26 | | 26 + 106 | | | | 1 |
| 74 | 52 | | 52 | | | 26 + 106 | | | | 1 |
| 75 | | 106 + 26 | | | 26 | 26 | 26 | 26 | | 1 |
| 76 | | 106 + 26 | | | 26 | 26 | | 52 | | 1 |
| 77 | | 106 + 26 | | | 52 | | 26 | 26 | | 1 |
| 78 | | 106 | | 26 | 52 + 26 | | 26 | | | 1 |
| 79 | | 106 + 26 | | | 52 + 26 | | 26 | | | 1 |
| 80 | | 106 + 26 | | | 52 | | 52 | | | 1 |
| 81 | | 106 + 26 | | | | 106 | | | | 1 |
| 82 | | 106 | | | 26 + 106 | | | | | 1 |

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG.

An HE-STF of FIG. 18 may be used for improving automatic gain control estimation in a multiple input multiple output (MIMO) environment or an OFDMA environment. An HE-LTF of FIG. 18 may be used for estimating a channel in the MIMO environment or the OFDMA environment.

The EHT-STF of FIG. 18 may be set in various types. For example, a first type of STF (e.g., 1× STF) may be generated based on a first type STF sequence in which a non-zero coefficient is arranged with an interval of 16 subcarriers. An STF signal generated based on the first type STF sequence may have a period of 0.8 µs, and a periodicity signal of 0.8 µs may be repeated 5 times to become a first type STF having a length of 4 µs. For example, a second type of STF (e.g., 2× STF) may be generated based on a second type STF sequence in which a non-zero coefficient is arranged with an interval of 8 subcarriers. An STF signal generated based on the second type STF sequence may have a period of 1.6 µs, and a periodicity signal of 1.6 µs may be repeated 5 times to become a second type STF having a length of 8 µs. Hereinafter, an example of a sequence for configuring an EHT-STF (i.e., an EHT-STF sequence) is proposed. The following sequence may be modified in various ways.

The EHT-STF may be configured based on the following sequence M.

$$M=\{-1,-1,-1,1,1,1,-1,1,1,1,-1,1,1,-1,1\} \quad \text{<Equation 1>}$$

The EHT-STF for the 20 MHz PPDU may be configured based on the following equation. The following example may be a first type (i.e., 1× STF) sequence. For example, the first type sequence may be included in not a trigger-based (TB) PPDU but an EHT-PPDU. In the following equation, (a:b:c) may imply a duration defined as b tone intervals (i.e., a subcarrier interval) from a tone index (i.e., subcarrier index) 'a' to a tone index 'c'. For example, the equation 2 below may represent a sequence defined as 16 tone intervals from a tone index −112 to a tone index 112. Since a subcarrier spacing of 78.125 kHz is applied to the EHT-STR, the 16 tone intervals may imply that an EHT-STF coefficient (or element) is arranged with an interval of 78.125*16=1250 kHz. In addition, *implies multiplication, and sqrt( ) implies a square root. In addition, j implies an imaginary number.

$$\text{EHT-STF}(-112:16:112)=\{M\}*(1+j)/\text{sqrt}(2)$$

$$\text{EHT-STF}(0)=0 \quad \text{<Equation 2>}$$

The EHT-STF for the 40 MHz PPDU may be configured based on the following equation. The following example may be the first type (i.e., 1× STF) sequence.

$$\text{EHT-STF}(-240:16:240)=\{M,0,-M\}*(1+j)/\text{sqrt}(2) \quad \text{<Equation 3>}$$

The EHT-STF for the 80 MHz PPDU may be configured based on the following equation. The following example may be the first type (i.e., 1× STF) sequence.

$$\text{EHT-STF}(-496:16:496)=\{M,1,-M,0,-M,1,-M\}*(1+j)/\text{sqrt}(2) \quad \text{<Equation 4>}$$

The EHT-STF for the 160 MHz PPDU may be configured based on the following equation. The following example may be the first type (i.e., 1× STF) sequence.

EHT-STF(−1008:16:1008)={$M$,1,−$M$,0,−$M$,1,−$M$, 0,−$M$,−1,$M$,0,−$M$,1,−$M$}*(1+$j$)/sqrt(2) <Equation 5>

In the EHT-STF for the 80+80 MHz PPDU, a sequence for lower 80 MHz may be identical to Equation 4. In the EHT-STF for the 80+80 MHz PPDU, a sequence for upper 80 MHz may be configured based on the following equation.

EHT-STF(−496:16:496)={−$M$,−1,$M$,0,−$M$,1,−$M$}* (1+$j$)/sqrt(2) <Equation 6>

Equation 7 to Equation 11 below relate to an example of a second type (i.e., 2× STF) sequence.

EHT-STF(−120:8:120)={$M$,0,−$M$}*(1+$j$)/sqrt(2) <Equation 7>

The EHT-STF for the 40 MHz PPDU may be configured based on the following equation.

EHT-STF(−248:8:248)={$M$,−1,−$M$,0,$M$,−1,$M$}*(1+$j$)/sqrt(2)

EHT-STF(−248)=0

EHT-STF(248)=0 <Equation 8>

The EHT-STF for the 80 MHz PPDU may be configured based on the following equation.

EHT-STF(−504:8:504)={$M$,−1,$M$,−1,−$M$,−1,$M$,0,−$M$, 1,$M$,1,−$M$,1,−$M$}*(1+$j$)/sqrt(2) <Equation 9>

The EHT-STF for the 160 MHz PPDU may be configured based on the following equation.

EHT-STF(−1016:16:1016)={$M$,−1,$M$,−1,−$M$,−1,$M$, 0,−$M$,1,$M$,1,−$M$,1,−$M$,0, −$M$,1,−$M$,1,$M$,1,−$M$, 0,−$M$,1,$M$,1,−$M$,1,−$M$}*(1+$j$)/sqrt(2)

EHT-STF(−8)=0,EHT-STF(8)=0,

EHT-STF(−1016)=0,EHT-STF(1016)=0 <Equation 10>

In the EHT-STF for the 80+80 MHz PPDU, a sequence for lower 80 MHz may be identical to Equation 9. In the EHT-STF for the 80+80 MHz PPDU, a sequence for upper 80 MHz may be configured based on the following equation.

EHT-STF(−504:8:504)={−$M$,1,−$M$,1,$M$,1,−$M$,0,−$M$,1, $M$,1,−$M$,1,−$M$}*(1+$j$)/sqrt(2)

EHT-STF(−504)=0,

EHT-STF(504)=0 <Equation 11>

The EHT-LTF may have first, second, and third types (i.e., 1×, 2×, 4× LTF). For example, the first/second/third type LTF may be generated based on an LTF sequence in which a non-zero coefficient is arranged with an interval of 4/2/1 subcarriers. The first/second/third type LTF may have a time length of 3.2/6.4/12.8 µs. In addition, a GI (e.g., 0.8/1/6/3.2 µs) having various lengths may be applied to the first/second/third type LTF.

Information related to a type of STF and/or LTF (information related to a GI applied to LTF is also included) may be included in a SIG-A field and/or SIG-B field or the like of FIG. 18.

A PPDU (e.g., EHT-PPDU) of FIG. 18 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG.

18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
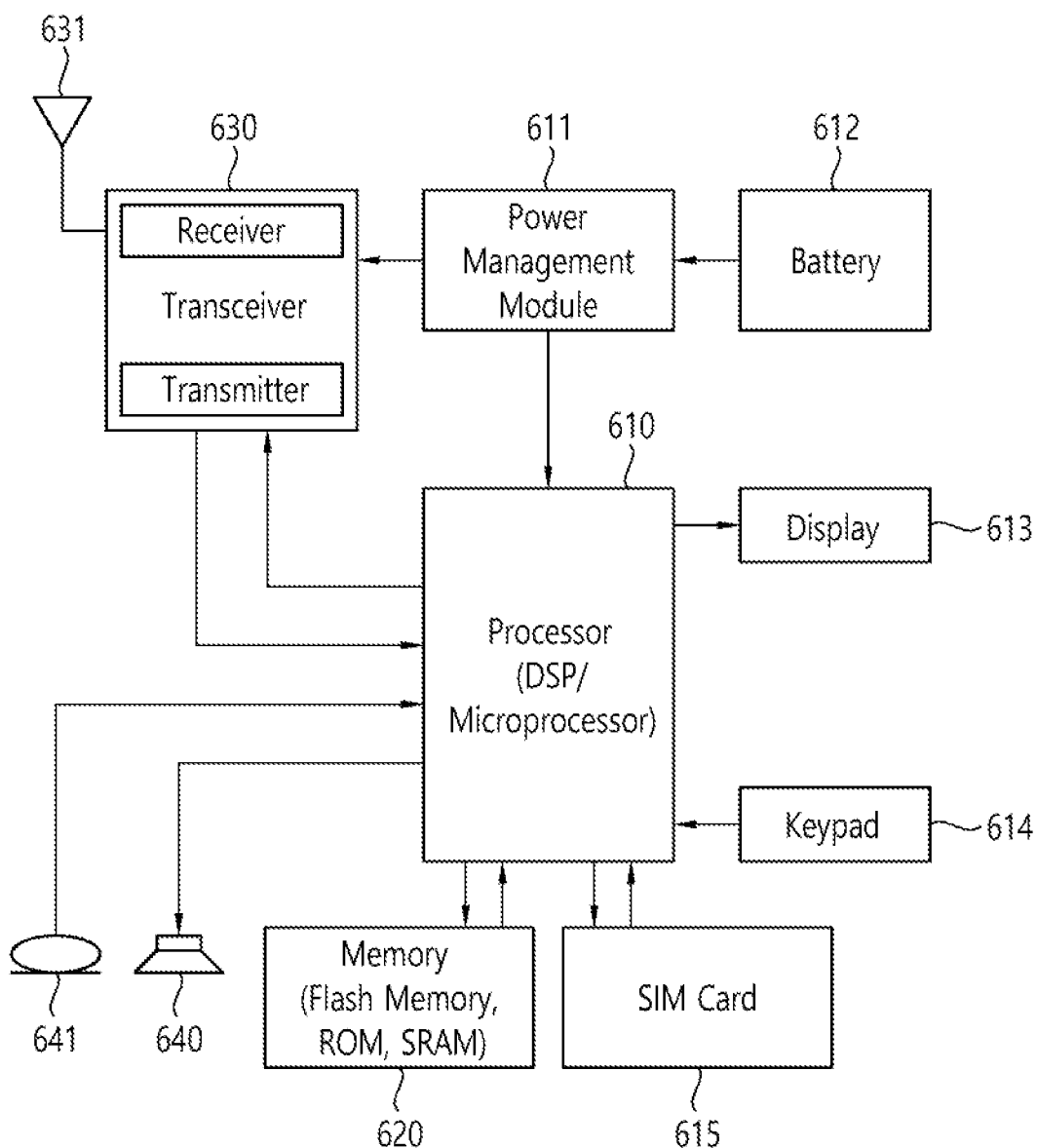
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Hereinafter, technical features of channel bonding supported by the STA of the present disclosure will be described.

For example, in an IEEE 802.11n system, 40 MHz channel bonding may be performed by combining two 20 MHz channels. In addition, 40/80/160 MHz channel bonding may be performed in the IEEE 802.11ac system.

For example, the STA may perform channel bonding for a primary 20 MHz channel (P20 channel) and a secondary 20 MHz channel (S20 channel). A backoff count/counter may be used in the channel bonding process. The backoff count value may be chosen as a random value and decremented during the backoff interval. In general, when the backoff count value becomes 0, the STA may attempt to access the channel.

During the backoff interval, when the P20 channel is determined to be in the idle state and the backoff count value for the P20 channel becomes 0, the STA, performing channel bonding, determines whether an S20 channel has maintained an idle state for a certain period of time (for example, point coordination function interframe space (PIFS)). If the S20 channel is in an idle state, the STA may perform bonding on the P20 channel and the S20 channel. That is, the STA may transmit a signal (PPDU) through a 40 MHz channel (that is, a 40 MHz bonding channel) including a P20 channel and the S20 channel.

Figure 20:
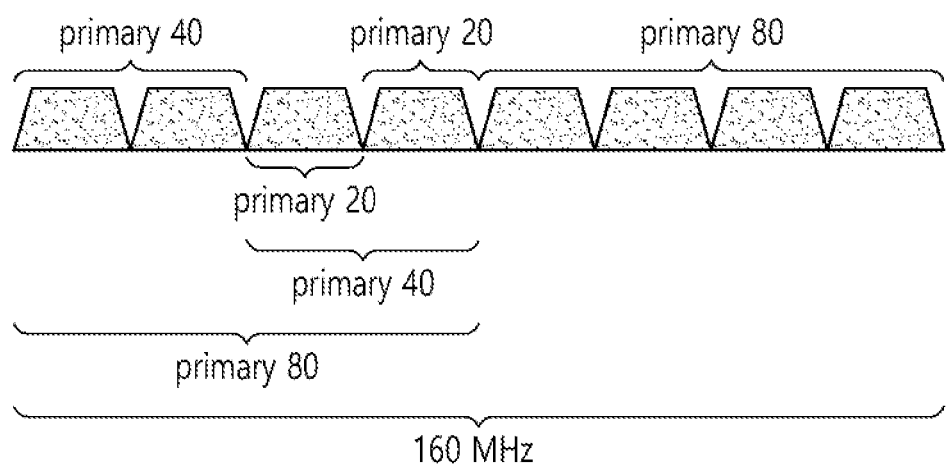
FIG. 20 shows an example of channel bonding.

FIG. 20 shows an example of channel bonding. As shown in FIG. 20, the primary 20 MHz channel and the secondary 20 MHz channel may make up a 40 MHz channel (primary 40 MHz channel) through channel bonding. That is, the bonded 40 MHz channel may include a primary 20 MHz channel and a secondary 20 MHz channel.

Channel bonding may be performed when a channel contiguous to the primary channel is in an idle state. That is, the Primary 20 MHz channel, the Secondary 20 MHz channel, the Secondary 40 MHz channel, and the Secondary 80 MHz channel can be sequentially bonded. However, if the secondary 20 MHz channel is determined to be in the busy state, channel bonding may not be performed even if all other secondary channels are in the idle state. In addition, when it is determined that the secondary 20 MHz channel is in the idle state and the secondary 40 MHz channel is in the busy state, channel bonding may be performed only on the primary 20 MHz channel and the secondary 20 MHz channel.

Hereinafter, preamble puncturing supported by a STA in the present disclosure will be described.

For example, in the example of FIG. 20, if the Primary 20 MHz channel, the Secondary 40 MHz channel, and the Secondary 80 MHz channel are all in the idle state, but the Secondary 20 MHz channel is in the busy state, bonding to the secondary 40 MHz channel and the secondary 80 MHz channel may not be possible. In this case, the STA may configure a 160 MHz PPDU and may perform a preamble puncturing on the preamble transmitted through the secondary 20 MHz channel (for example, L-STF, L-LTF, L-SIG, RL-SIG, U-SIG, HE-SIG-A, HE-SIG-B, HE-STF, HE-LTF, EHT-SIG, EHT-STF, EHT-LTF, etc.), so that the STA may transmit a signal through a channel in the idle state. In other words, the STA may perform preamble puncturing for some bands of the PPDU. Information on preamble puncturing (for example, information about 20/40/80 MHz channels/bands to which puncturing is applied) may be included in a signal field (for example, HE-SIG-A, U-SIG, EHT-SIG) of the PPDU.

Hereinafter, technical features of a multi-link (ML) supported by a STA of the present disclosure will be described.

The STA (AP and/or non-AP STA) of the present disclosure may support multi-link (ML) communication. ML communication may refer to communication supporting a plurality of links. The link related to ML communication may include channels of the 2.4 GHz band shown in FIG. 15, the 5 GHz band shown in FIG. 16, and the 6 GHz band shown in FIG. 17 (for example, 20/40/80/160/240/320 MHz channels).

A plurality of links used for ML communication may be set in various ways. For example, a plurality of links supported by one STA for ML communication may be a plurality of channels in a 2.4 GHz band, a plurality of channels in a 5 GHz band, and a plurality of channels in a 6 GHz band. Alternatively, a plurality of links supported by one STA for ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported by one STA for ML communication may be a channel to which preamble puncturing is applied.

The STA may perform an ML setup to perform ML communication. The ML setup may be performed based on a management frame or control frame such as a Beacon, a Probe Request/Response, an Association Request/Response, and the like. For example, information about ML setup may be included in an element field included in a Beacon, a Probe Request/Response, an Association Request/Response, and the like.

When ML setup is completed, an enabled link for ML communication may be determined. The STA may perform frame exchange through at least one of a plurality of links determined as an enabled link. For example, the enabled link may be used for at least one of a management frame, a control frame, and a data frame.

When one STA supports multiple links, a transceiver supporting each link may operate as one logical STA. For example, one STA supporting two links may be expressed as one Multi Link Device (MLD) including a first STA for the first link and a second STA for the second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

Hereinafter, more specific features related to the ML setup are described.

The MLD (AP MLD and/or non-AP MLD) may transmit, through ML setup, information on a link that the corresponding MLD can support. Link information may be configured in various ways. For example, information on the link may include at least one of 1) information on whether the MLD (or STA) supports simultaneous RX/TX operation, 2) information on the number/upper limit of uplink/downlink links supported by the MLD (or STA), 3) information on the location/band/resource of the uplink/downlink Link supported by the MLD (or STA), 4) information on the frame type (management, control, data, etc.) available or preferred in at least one uplink/downlink link, 5) information on ACK policy available or preferred in at least one uplink/downlink link, and 6) information on an available or preferred traffic identifier (TID) in at least one uplink/downlink Link. The TID is related to the priority of traffic data and is expressed as eight types of values according to the conventional wireless LAN standard. That is, eight TID values corresponding to four access categories (ACs) (AC_Background (AC_BK), AC_Best Effort (AC_BE), AC_Video (AC_VI), AC_Voice (AC_VO)) according to the conventional WLAN standard may be defined.

For example, it may be preset that all TIDs are mapped for uplink/downlink link. Specifically, if negotiation is not made through ML setup, if all TIDs are used for ML communication, and if the mapping between uplink/downlink link and TID is negotiated through additional ML settings, the negotiated TID may be used for ML communication.

Through ML setup, a plurality of links usable by the transmitting MLD and the receiving MLD related to ML communication may be set, and this may be referred to as an "enabled link". The "enabled link" may be called differently in various expressions. For example, it may be referred to as various expressions such as a first link, a second link, a transmission link, and a reception link.

After the ML setup is completed, the MLD could update the ML setup. For example, the MLD may transmit information on a new link when it is necessary to update information on the link. Information on the new link may be transmitted based on at least one of a management frame, a control frame, and a data frame.

MLD and STR Capability

The 802.11be standard (hereinafter, the EHT standard) may support a multi-link. Here, the multi-link may include multiple bands. That is, the multi-link may mean links included in several frequency bands, or may mean a plurality of links included in one frequency band.

The EHT standard may support Simultaneous TX/RX (STR) Channel access according to Link capability in a multi-link support environment. A device supporting a multi-link may be defined as a Non-AP/AP Multi-Link Device (MLD). STR Capability may mean that data (or signals) can be transmitted/received simultaneously in multiple links. That is, an MLD supporting STR capability (hereinafter, STR MLD) may receive data through one link when data transmission occurs on another link.

On the other hand, MLDs that do not support STR capability (hereinafter, non-STR MLDs) cannot simultaneously transmit and receive data (or signals) because data collision may occur due to interference. For example, when a non-STR MLD receives data (or a signal) from one link, it does not attempt transmission to another link to avoid interference. If data (or signal) transmission and reception occur simultaneously in both links, data (or signal) collision may occur.

In other words, the STR MLD may simultaneously perform signal transmission and signal reception in a multi-link, respectively. Non-STR MLD cannot simultaneously transmit and receive signals in a multi-link. While transmitting a signal in the first link among a multi-link, a STA that does not support the STR operation cannot receive a signal in a link different from the first link, but could transmit a signal. In addition, while receiving a signal in the first link among the multi-link, a STA that does not support the STR operation cannot transmit a signal in a link different from the first link, but could receive a signal.

Hereinafter, examples in which collision may occur in the non-STR MLD may be described with reference to FIGS. 21 and 22.

Figure 21:
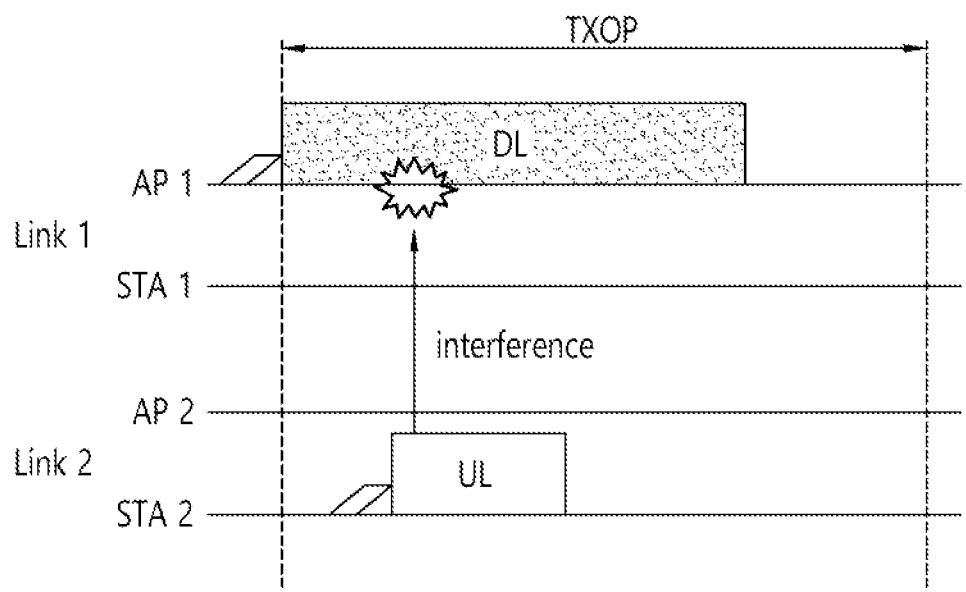
FIG. 21 shows an example in which a collision may occur in a non-STR MLD.

FIG. 21 shows an example in which a collision may occur in a non-STR MLD.

Referring to FIG. 21, the AP MLD may include AP 1 operating in a first link and AP 2 operating in a second link. The non-AP MLD may include STA 1 operating in the first link and STA 2 operating in the second link. At least one of an AP MLD and a non-AP MLD may not support STR capability. The AP MLD may transmit a DL signal through AP 1. When the non-AP MLD transmits a UL signal through STA 2 while the non-AP MLD is receiving the DL signal through STA 1, a collision may occur.

Figure 22:
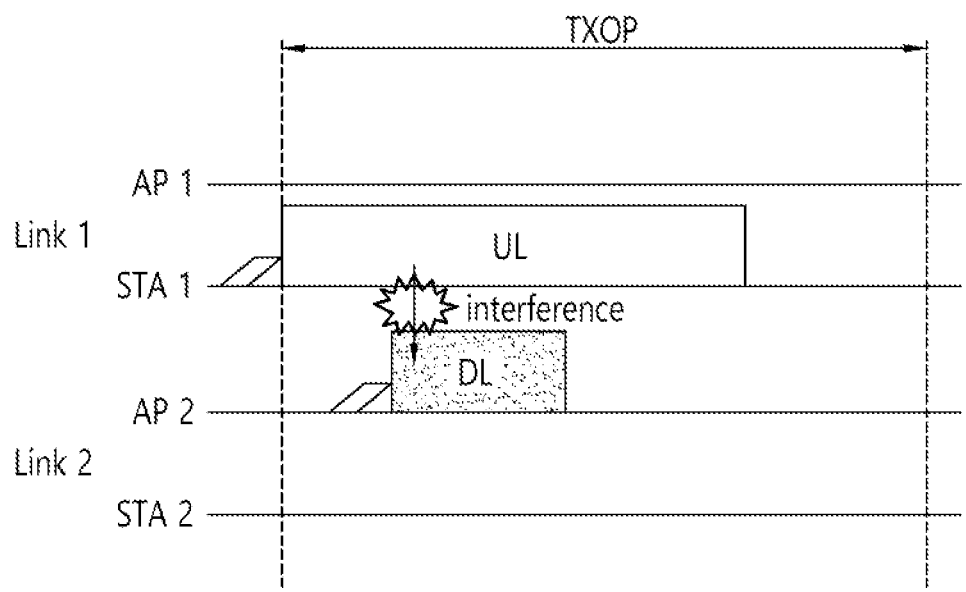
FIG. 22 shows another example in which a collision may occur in a non-STR MLD.

FIG. 22 shows another example in which a collision may occur in a non-STR MLD.

Referring to FIG. 22, an AP MLD and a non-AP MLD may correspond to the AP MLD and the non-AP MLD of FIG. 21, respectively. The non-AP MLD may transmit a UL signal through STA 1. When the AP MLD transmits the DL signal through AP 2, while transmitting the UL signal, a collision may occur.

Referring to FIGS. 21 and 22, when either one of the AP MLD or the non-AP MLD does not support STR capability, there may be restrictions on TX/RX operation. Due to the restrictions of the non-STR MLD operation, a specific section in which a link is not used (i.e. a section in which neither TX/RX occurs) may occur. A specific section in which the link is not used may cause unnecessary power consumption in the non-AP MLD.

In order to remove such unnecessary total power consumption, the non-AP MLD, which is non-STR, may support the non-STR power save mechanism in consideration of the above characteristics. However, depending on the situation, there is a case where it is necessary to wake the STA that has entered the doze state during the DL TXOP period. In the following specification, a technical feature for power reduction in consideration of the characteristic of a non-STR MLD that does not support simultaneous transmission/reception (STR) may be proposed. In addition, a technical feature related to signaling for awaking a STA that has already entered the doze state during the DL TXOP period may be proposed. In addition, when the STA of the non-AP MLD supporting the STR capability enters the doze state, a technical feature related to signaling for awake may be proposed together.

Prior to the above-described technical features, a power reduction method in consideration of the characteristics of a non-STR MLD that does not support simultaneous transmission/reception may be first proposed.

Specifically, when the MLD supports STR Capability in an environment where AP Multi-Link Device (MLD) and Non-AP MLD are connected by a plurality of links (or multi-links), transmission/reception of data (or signal) may occur simultaneously within the same TXOP. However, when any one of AP MLD and non-AP MLD is a non-STR device, if data (or signal) is simultaneously transmitted/received within the same TXOP, data (or signal) may be corrupted by interference. Accordingly, a power reduction technique for non-AP MLDs in consideration of the characteristics of such non-STR MLDs may be proposed. Hereinafter, a specific signaling technique for the power reduction technique may be proposed.

AP MLD and Non-AP MLD

According to an embodiment, the MLD may include anon-AP MLD and an AP-MLD. The non-AP MLD and the AP-MLD may be classified according to the function of an access point (AP). The non-AP MLD and the AP-MLD may be physically separated or logically separated. For example, when the MLD performs an AP function, it may be referred to as an AP MLD, and when the MLD performs a STA function, it may be referred to as a non-AP MLD.

According to an embodiment, in the EHT standard (that is, 802.11be), a multi-link may be divided into a Primary/Secondary link to reduce power consumption. APs supporting a multi-link can be managed by designating each link as a primary link or a secondary link. The AP can designate one or more links among several links as the Primary Link. Links other than primary links can operate as secondary links.

According to an embodiment, the primary link may mean a link that performs all functions of the link. In addition, the secondary link may mean a link that performs a limited function (for example, data frame exchange) for power-saving.

According to an embodiment, in the EHT standard, a multi-link may be divided into a general/power-saving link. The above-described primary link may correspond to a general link. In other words, the above-described primary link may be related to a general link. In addition, the above-described secondary link may correspond to a power-saving link. In other words, the above-described secondary link may be related to a power-saving link.

For example, the primary link may be used not only for frame exchange for synchronization but also for non-data frame exchange (that is, Control/Management frame exchange). The secondary link can only be used for data frame exchange.

Therefore, the STA can listen only to the primary link for receiving the Beacon and/or Control/Management frame during the idle time (or period). In other words, the STA may operate only in the primary link for receiving the Beacon and/or Control/Management frame during the idle time (or period). Therefore, a non-AP Multi-Link Device (MLD) must be connected to at least one primary link.

In the following specification, MLD may refer to a multi-link device. The MLD has one or more connected STAs and has one MAC service access point (SAP) that connects to an upper link layer (Logical Link Control, LLC). MLD may mean a physical device or a logical device. Hereinafter, a device may mean an MLD.

In addition, the MLD may include at least one STA connected to each link of the multi-link. For example, the processor of the MLD may control the at least one STA. For example, the at least one STA may be independently configured and operated. The at least one STA may include a processor and a transceiver, respectively. For example, the at least one STA may operate independently regardless of the processor of the MLD.

In the following specification, for the convenience of description, it is described that the MLD (or the processor of the MLD) controls at least one STA, but is not limited thereto. As described above, the at least one STA may transmit/receive a signal independently regardless of the MLD.

An AP MLD and a non-AP MLD may be connected by a plurality of links. Hereinafter, for the convenience of description, technical features of the AP MLD and the non-AP MLD may be described through the structures of the two links, which are the most basic structures, of the AP MLD and the non-AP MLD. In addition, by assuming that the non-AP MLD is a non-STR MLD that does not support STR capability, technical features regarding the AP MLD and the non-AP MLD may be described.

Figure 23:
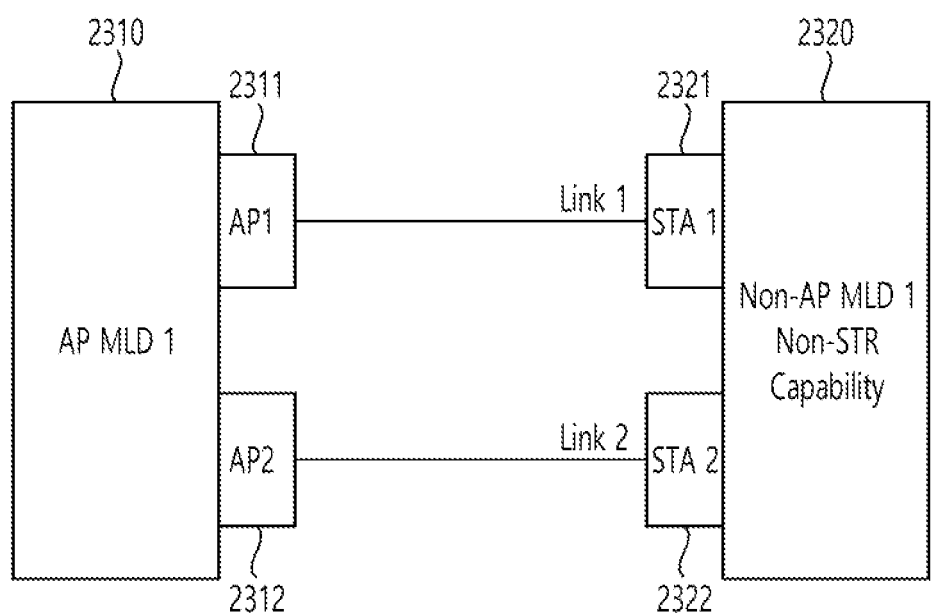
FIG. 23 shows the basic structures of an AP MLD and a non-AP MLD.

FIG. 23 shows the basic structures of an AP MLD and a non-AP MLD.

Referring to FIG. 23, the AP MLD 1 2310 may include AP 1 2311 and AP 2 2312. The non-AP MLD 1 2320 may include STA 1 2321 and STA 2 2322. AP 1 2311 and STA 1 2321 may operate in link 1. Also, AP 1 2311 and STA 1 2321 may be connected through link 1. AP 2 2312 and STA 2 2322 may operate in link 2. Also, AP 2 2312 and STA 2 2322 may be connected through link 2. The non-AP MLD 1 2320 may not support STR Capability. That is, the non-AP MLD 1 2320 may be a non-STR MLD.

The structures of the AP MLD and the non-AP MLD described in the following specification may correspond to the structures of the AP MLD 1 2310 and the non-AP MLD 1 2320 of FIG. 23.

Example of Interference in the Non-AP MLD of the Non-STR Capability

As described above, when the non-AP MLD is a non-STR MLD, when the non-AP MLD receives DL from the AP MLD or transmits UL to the AP MLD through a specific link, it may cause interference to a link other than the specific link. Also, in order to prevent data collision due to the interference, a section in which the link is not used for a specific period may occur. A specific example thereof may be described with reference to FIGS. 24 and 25.

Figure 24:
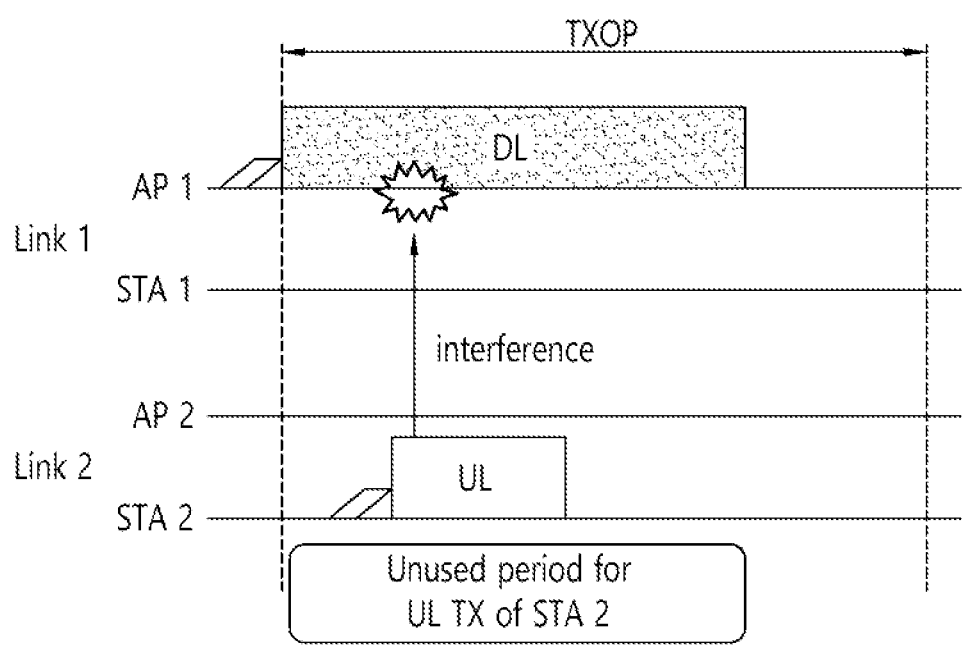
FIG. 24 shows an example of a section in which a link is not used in a non-AP MLD.

FIG. 24 shows an example of a section in which a link is not used in a non-AP MLD.

Referring to FIG. 24, the AP MLD may transmit a DL PPDU through AP 1. When the non-AP MLD transmits the UL PPDU through STA 2, while the DL PPDU is being received, collision (or interference) may occur.

In other words, AP 1 of the AP MLD may transmit a DL PPDU. If STA 2 transmits a UL PPDU, while STA 1 is receiving the DL PPDU, a collision between the DL PPDU and the UL PPDU may occur.

Therefore, when STA 1 of the non-AP MLD receives a DL PPDU through Link 1, STA 2 should not attempt to transmit the UL PPDU to avoid interference until the DL PPDU reception is finished. That is, STA 2 cannot use the link 2 for UL PPDU transmission, until the reception of the DL PPDU by STA 1 is finished.

Figure 25:
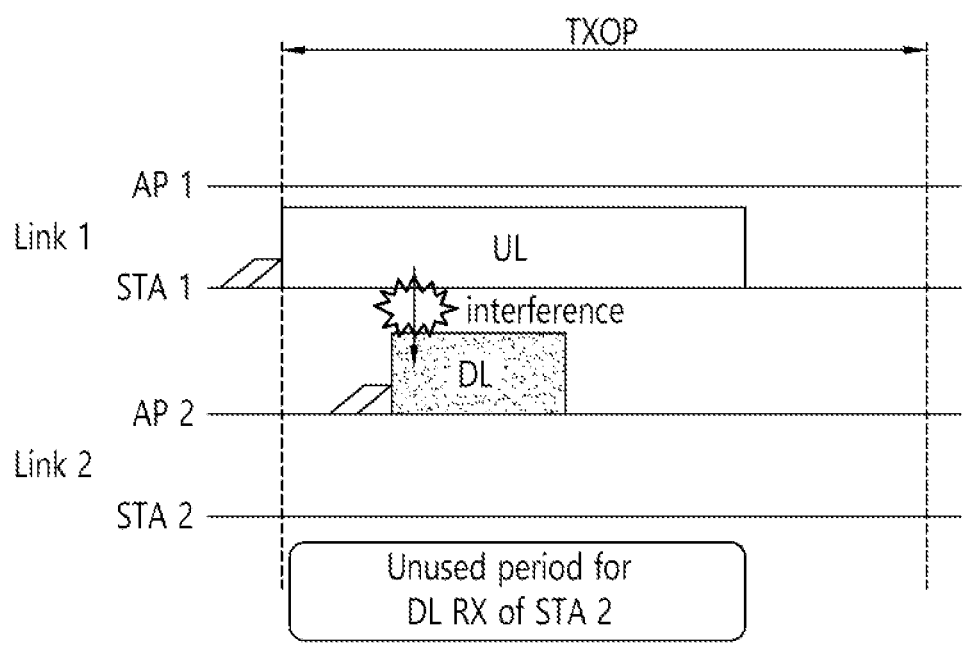
FIG. 25 shows another example of a section in which a link is not used in a non-AP MLD.

FIG. 25 shows another example of a section in which a link is not used in a non-AP MLD.

Referring to FIG. 25, an AP MLD and a non-AP MLD may correspond to the AP MLD and the non-AP MLD of FIG. 21, respectively. The non-AP MLD may transmit a UL PPDU through STA 1. When the AP MLD transmits the DL PPDU through AP 2, while transmitting the UL PPDU, collision (or interference) may occur.

In other words, STA 1 may transmit a UL PPDU through link 1. While STA 1 is transmitting a UL PPDU, when AP 2 transmits a DL PPDU through link 2, collision (or interference) between the UL PPDU and the DL PPDU may occur.

Therefore, when STA 1 of non-AP MLD 1 transmits a UL PPDU through Link 1, AP 2 should not attempt to transmit a DL PPDU to avoid interference until the UL PPDU transmission is finished. That is, STA 2 cannot use Link 2 for DL reception until the UL PPDU of STA 1 ends.

Referring to FIGS. 24 and 25, a specific interval that cannot be used for UL transmission or DL reception may occur due to the characteristics of the non-STR MLD. Accordingly, in the specific period, based on whether STA 2 transmits/receives data, STA 2 may enter a doze state to reduce power.

Hereinafter, in the case of receiving a DL (or DL PPDU) through the first link (or link 1) and transmitting a UL (or UL PPDU) through the first link, various embodiments in which a STA (for example, STA 2) enters a doze state to reduce power may be described. In addition, the AP MLD and the non-AP MLD may be configured based on the structure shown in FIG. 23.

Power Saving Mechanism when Receiving DL PPDU

Hereinafter, when the non-AP MLD receives DL data (or DL PPDU) from the AP MLD, a power-saving mechanism may be described.

In an environment where an AP MLD (Multi-Link Device) and a Non-AP MLD are connected by multiple links (or a multi-link), if MLD supports STR Capability, data (or signal) transmission/reception can occur simultaneously within the same TXOP. However, if either the AP MLD or the non-AP MLD is a non-STR MLD (or a non-STR device), data (or signal) transmission/reception cannot occur simultaneously in the same TXOP. Considering these characteristics, the MLD device can reduce unnecessary power consumption.

When the non-STR non-AP MLD receives DL data from the AP MLD, an example of operations of the non-AP MLD and the AP MLD may be described with reference to FIG. 26.

Figure 26:
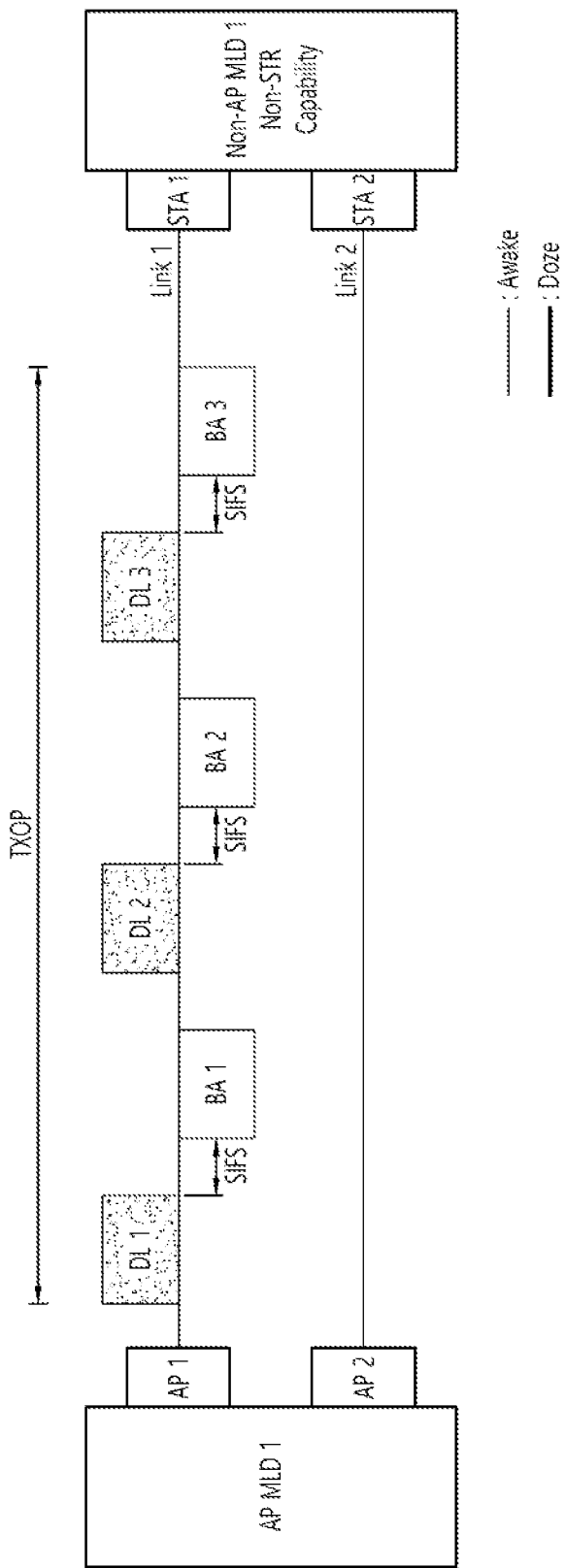
FIG. 26 shows an example of the operation of a non-AP MLD and an AP MLD.

FIG. 26 shows an example of the operation of a non-AP MLD and an AP MLD.

Referring to FIG. 26, non-AP MLD 1 and AP MLD 1 may have the structures of non-AP MLD 1 and AP MLD 1 of FIG. 23. Non-AP MLD 1 may be a non-STR capability device (or a non-STR MLD) that does not support the STR capability.

STA 1 of Non-AP MLD 1 may receive a DL PPDU (or a DL signal) from AP 1 through Link 1. Until the DL PPDU reception is finished, STA 2 cannot transmit a UL PPDU (or UL signal) to avoid interference. STA 2 may only perform DL PPDU reception.

According to an embodiment, DL data transmission for STA 2 of AP 2 may not occur during the same DL TXOP period. In this case, a period in which neither UL data transmission nor DL data reception occurs until DL PPDU transmission in STA 2 is completed. During this period, STA 2 may enter a doze state (or a power-saving state, a sleep state, or an Unavailable state for Other Links) to reduce power.

A situation in which the aforementioned AP 2 considers that DL data transmission does not occur with respect to STA 2 is as follows.

i) The first example of a situation in which AP 2 considers that DL data transmission does not occur to STA 2 is a case in which AP 2 does not have DL data to transmit to STA 2.

ii) A second example of a situation in which AP 2 considers that DL data transmission does not occur to STA 2 is a case in which AP 2 has DL data to transmit to STA 2 but cannot transmit it because the channel is in a busy state.

In the above two cases, STA 2 may determine that it is impossible to receive DL data and enter a doze state to reduce power. For this, the AP MLD needs to inform/indicate this information to the non-AP MLD in the DL data.

That is, in order to enter the doze state for power reduction by STA 2, it should be noted that the DL PPDU is not transmitted through Link 2 during the TXOP period. Therefore, when AP 1 transmits a DL PPDU to STA 1, information on whether to transmit a DL PPDU in Link 2 may be transmitted together. Specifically, when AP 1 transmits a DL PPDU to STA 1, it may indicate (or inform) that DL data transmission to STA 2 by AP 2 does not occur during the same TXOP period. An embodiment related thereto may be described with reference to FIG. 27.

Figure 27:
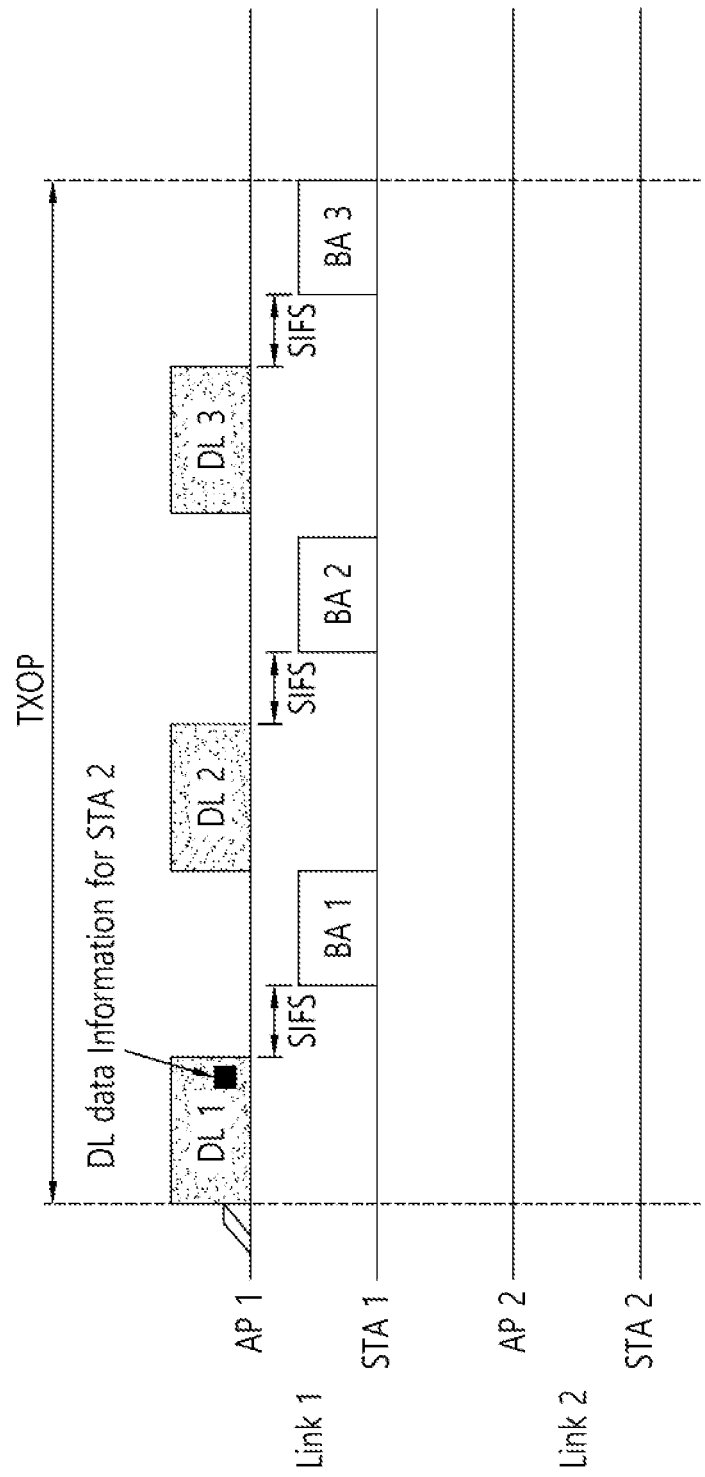
FIG. 27 shows another example of the operation of a non-AP MLD and an AP MLD.

FIG. 27 shows another example of the operation of a non-AP MLD and an AP MLD.

Referring to FIG. 27, when DL frame (for example, DL 1, DL 2, DL3) transmission occurs only in some links (for example, Link 1) in a TXOP, AP MLD 1 may transmit information (for example, traffic indicator information) on whether or not to receive DL data by a STA (for example, STA 2) connected to Link 2 via the DL frame. STA 1 may check information on whether or not there is a data buffer for STA 2 based on the information on whether or not to receive the DL data.

For example, a new field may be defined to display/transmit information on whether or not to receive the DL data. As another example, an existing TIM element may be reused to display/transmit information on whether or not the DL data is received.

For example, the information on whether or not to receive the DL data may be included in the DL frame. Information on whether to receive DL data or not included in the DL frame may be omitted in the case of a STA that does not have content/item to indicate. When information on whether or not to receive DL data is omitted, STA 2 may determine that there is no data buffered therein.

For example, only DL transmission for STA 1 may occur within the same TXOP. In this case, AP MLD 1 (for example, AP 1) may transmit information indicating that only DL transmission for STA 1 will occur via a DL frame. In this case, the non-AP MLD 1 receiving the DL frame through Link 1 can confirm that there is no DL data transmitted to STA 2 within the same TXOP period (or DL TXOP period) based on the above information. Accordingly, based on the information, STA 2 may enter the doze state.

However, in the above-described second case, although AP 2 has DL data to be transmitted to the STA 2, it may not be transmitted due to a channel state. Since STA 2 has entered the doze state, AP 2 needs to buffer data until STA 2 wakes up.

Hereinafter, various embodiments regarding a period in which STA 2 enters a doze state may be described.

The First Embodiment

Hereinafter, for the convenience of description, at least one STA that receives a DL frame may be described as a first STA. Also, for the convenience of description, STAs distinguished from the first STA that do not receive the DL frame may be described as second STAs.

According to the first embodiment, the Non-AP MLD may receive a DL frame from the AP MLD through at least one STA. The first STA may check the TXOP field information included in the PHY header of the DL frame and/or the Duration field included in the MAC header. Then, if DL and UL transmission does not occur through the second STA (or the link to which the second STA is connected) during the TXOP period/interval, the non-AP MLD may change the state of the second STA to the Doze state. As the second STA enters the Doze state (or the Power-saving state, the sleep state, or the Unavailable state for Other Links) during the TXOP period, power consumption can be reduced. Thereafter, the second STA that has entered the Doze state may change the state to the Awake state after the TXOP duration ends.

Figure 28:
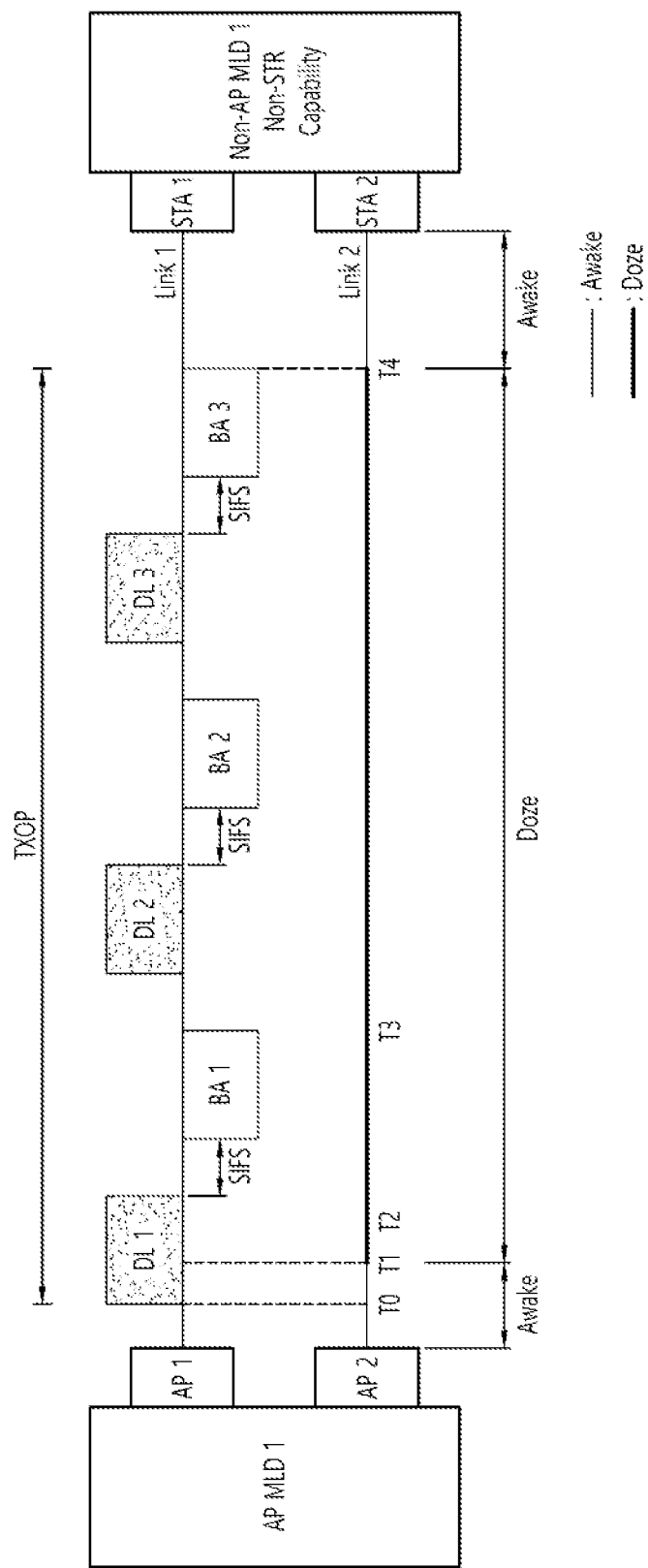
FIGS. 28 and 29 show another example of the operation of a non-AP MLD and an AP MLD.
Figure 29:
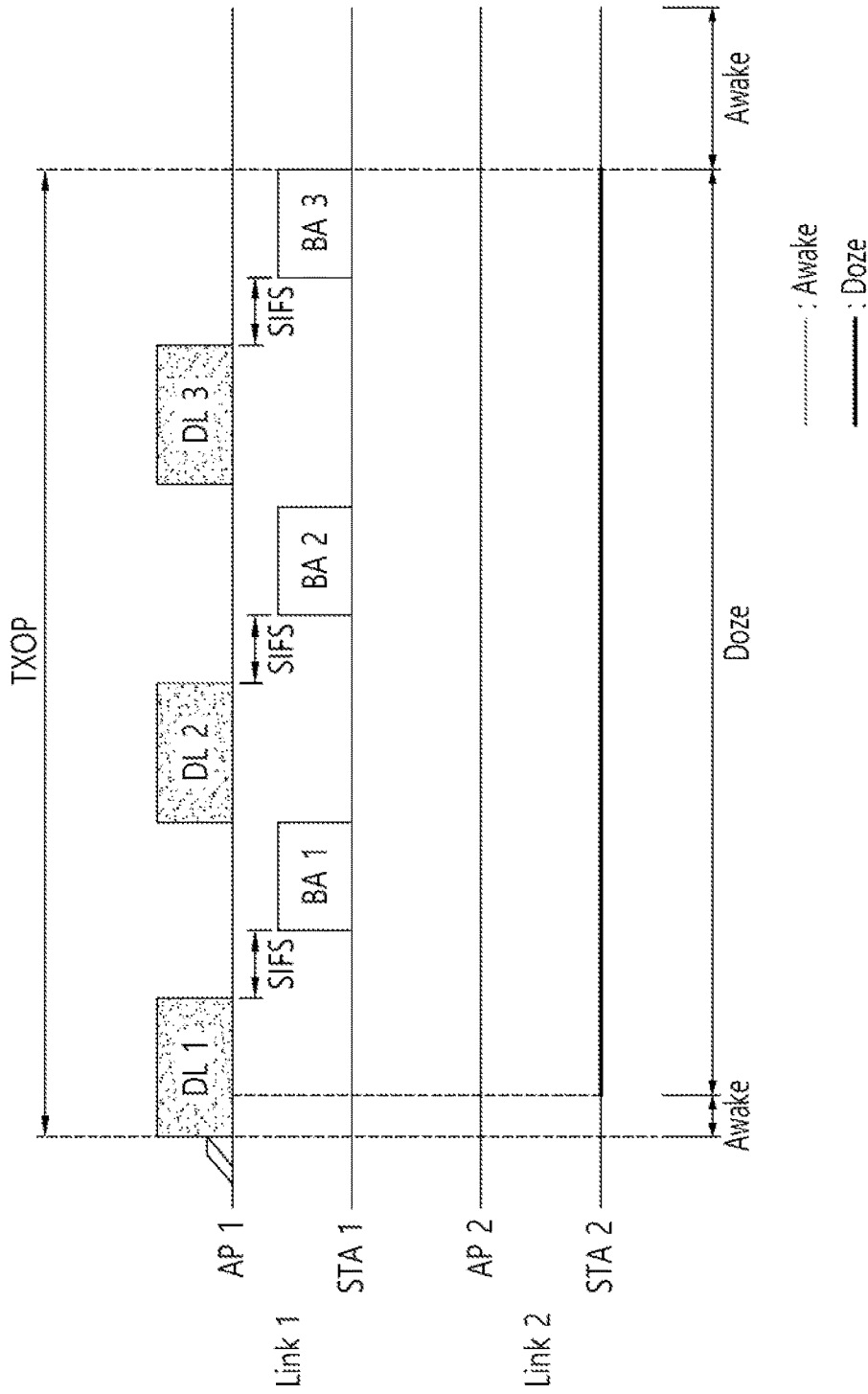

FIGS. 28 and 29 show other examples of operations of a non-AP MLD and an AP MLD.

Referring to FIGS. 28 and 29, STA 1 may be an example of the above-described first STA. STA 2 may be an example of the above-described second STA. AP MLD 1 (for example, AP 1) may acquire TXOP from Link 1.

AP 1 may transmit DL 1 to non-AP MLD 1 (for example, STA 1) within the TXOP. DL 1 may include information on whether to transmit a DL frame through link 2. In other words, DL 1 may include information about data buffered in AP 2.

STA 1 may receive DL 1. STA 1 may acquire information on whether to transmit a DL frame through link 2 together. The non-AP MLD 1 may confirm that a DL frame through link 2 will not be transmitted based on DL 1. In other words, the non-AP MLD 1 may confirm that there is no data buffered in AP 2 based on the DL 1.

Accordingly, the non-AP MLD 1 may change the state of STA 2 from the awake state to the doze state based on the DL 1. In other words, STA 2 may enter a doze state based on DL 1.

For example, the time point at which STA 2 enters the doze state may be a time point at which non-AP MLD 1 (for example, STA 1) knows whether data is transmitted to itself through a DL frame (for example, DL 1). For example, the time point at which STA 2 enters the doze state may be the time point at which non-AP MLD 1 (for example, STA 1) checks the STAID field value of the PHY Header of the SU/MU PPDU or the RA value of the MAC Header of the SU/MU PPDU.

For another example, the time point at which STA 2 enters the doze state may be a time point (for example, T1 in FIG. 28) at which non-AP MLD 1 recognizes that there is no DL frame (for example, DL 1) transmitted to STA 2 within the same DL TXOP period. For example, the time point at which STA 2 enters the doze state may be the time point at which DL frame presence indication information for STA 2 in the DL frame of STA 1 is checked.

As another example, the time point at which STA 2 enters the doze state may be the time point at which the DL frame is transmitted (for example, T0 in FIG. 28).

According to an embodiment, the non-AP MLD 1 may change the state of STA 2 from the doze state to the awake state at the time point at which the TXOP is terminated (for example, T4 in FIG. 28). In other words, STA 2 may enter the awake state at a time point at which TXOP is terminated (for example, T4 in FIG. 28).

The Second Embodiment

Hereinafter, for the convenience of description, at least one STA that receives the DL frame may be described as a first STA. Also, for the convenience of description, STAs distinguished from the first STA that do not receive the DL frame may be described as the second STA.

According to the second embodiment, the non-AP MLD may set/change the state of the second STA to the doze state until the end of receiving the DL frame. In other words, the second STA may maintain the doze state until the first STA finishes receiving the DL frame. According to the second embodiment, there is the effect of reducing power consumption.

In the first embodiment, during DL TXOP (TXOP in which a DL frame is transmitted), the non-AP MLD sets the second STA to the doze state. Unlike the first embodiment, the second embodiment may set/change the state of the second STA to the doze state until the DL frame reception ends. Compared with the first embodiment, the second embodiment has the effect of increasing link utilization. However, compared to the first embodiment, the transmission opportunity (for example, channel access) increases, but power efficiency may decrease.

Specifically, when the first STA receives the DL frame, it may consider that DL and UL transmission does not occur in the second STA. For example, the first STA may confirm that DL and UL transmission does not occur through the link connected to the second STA based on the DL frame. Accordingly, the second STA may enter the doze state until the end of receiving the DL frame. The second STA may enter the awake state after receiving the DL frame.

Figure 30:
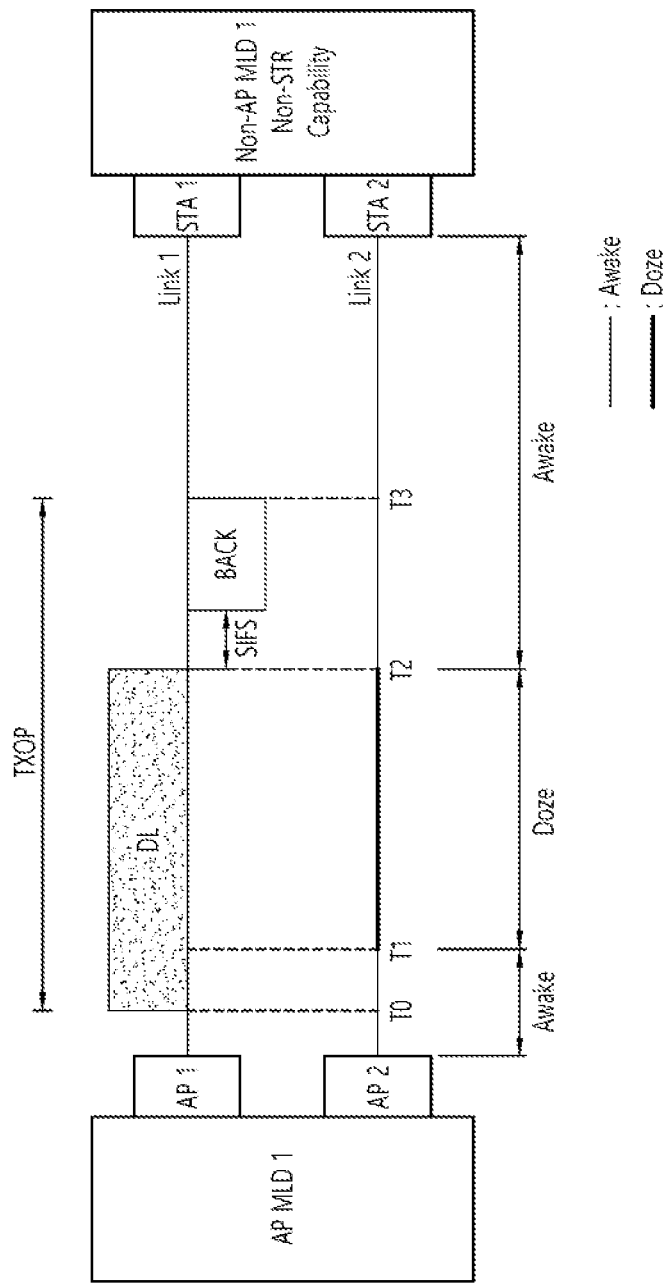
FIG. 30 shows another example of the operation of a non-AP MLD and an AP MLD.

FIG. 30 shows another example of the operation of a non-AP MLD and an AP MLD.

Referring to FIG. 30, STA 1 may be an example of the above-described first STA. STA 2 may be an example of the above-described second STA. During the TXOP period, only one DL frame may be transmitted. STA 2 may operate in a doze state until the end of reception of the DL frame (for example, T2).

Figure 31:
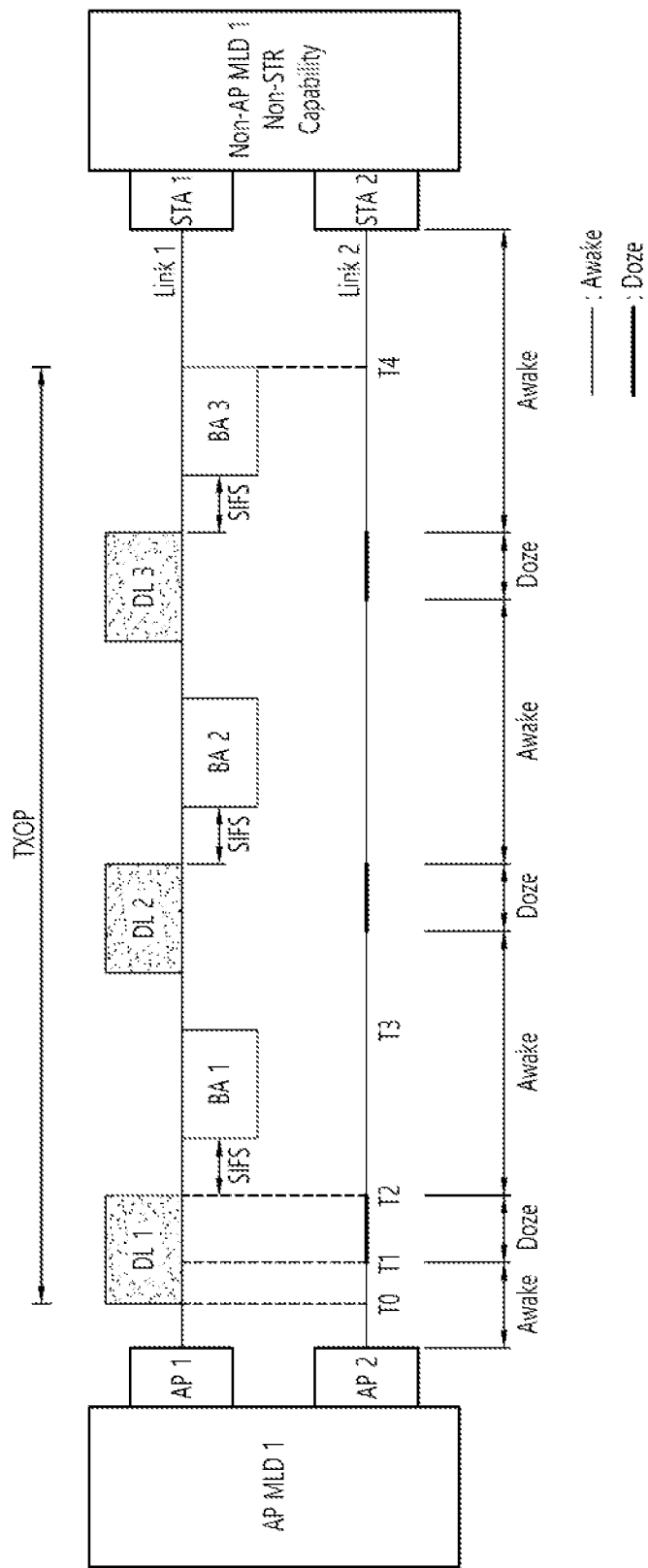
FIGS. 31 and 32 show other examples of operation of anon-AP MLD and an AP MLD.
Figure 32:
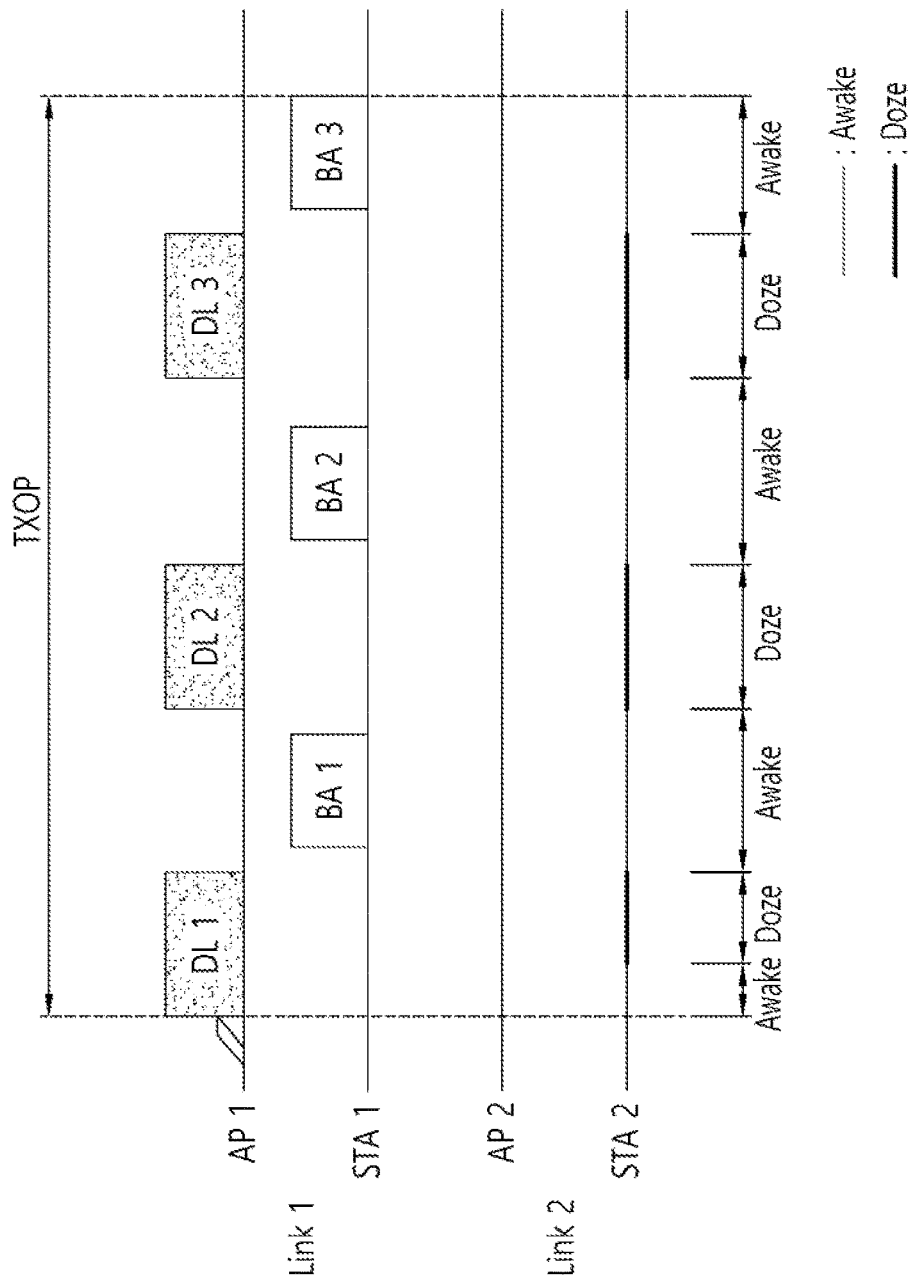

FIGS. 31 and 32 show other examples of operation of anon-AP MLD and an AP MLD.

FIGS. 31 and 32, STA 1 may be an example of the above-described first STA. STA 2 may be an example of the above-described second STA. A plurality of DL frames may be transmitted during the TXOP period. AP MLD 1 (for example, AP 1) may acquire a TXOP from Link 1.

AP 1 may transmit DL 1 to non-AP MLD 1 (for example, STA 1) within the TXOP. DL 1 may include information on whether to transmit a DL frame through link 2. In other words, DL 1 may include information about data buffered in AP 2.

STA 1 may receive DL 1. STA 1 may acquire information on whether to transmit a DL frame through link 2, together. The non-AP MLD 1 may confirm that a DL frame through link 2 will not be transmitted based on DL 1. In other words, the non-AP MLD 1 may confirm that there is no data buffered in AP 2 based on the DL 1.

Accordingly, the non-AP MLD 1 may change the state of STA 2 from the awake state to the doze state based on the DL 1. In other words, STA 2 may enter a doze state based on DL 1.

For example, the time when STA 2 enters the doze state may be a time when non-AP MLD 1 knows whether data is transmitted to itself through a DL frame (for example, DL 1). For example, the time when STA 2 enters the doze state may be a time when non-AP MLD 1 (for example, STA 1) checks the STAID field value of the PHY Header of the SU/MU PPDU or the RA value of the MAC Header of the SU/MU PPDU.

For another example, the time when STA 2 enters the doze state may be a time when non-AP MLD 1 recognizes that there is no DL frame (for example, DL 1) transmitted to STA 2 within the same DL TXOP period (For example, T1 in FIG. 31). For example, the time when STA 2 enters the doze state may be a time when non-AP MLD 1 checks DL frame presence or absence indication information for STA 2 within a DL frame received from STA 1.

As another example, the time point at which STA 2 enters the doze state may be the time point at which DL 1 is transmitted (For example, T0 in FIG. 31).

According to an embodiment, the non-AP MLD 1 may change the state of STA 2 from the doze state to the awake state at the time point when DL 1 is terminated (for example, T2 in FIG. 31). The non-AP MLD 1 may operate in the same manner as described above even when DL 2 and DL 3 are received.

When multiple DL frames (for example, DL 1, DL 2 and DL 3) are transmitted through Link 1 during the DL TXOP period, STA 1 may transmit each Block Ack (BA) for each DL frame to AP 1 through UL transmission.

During a period in which UL data transmission for BA occurs, UL transmission through STA 2 may occur. Accordingly, the non-AP MLD 1 may change the state of STA 2 to the awake state every time the reception of the DL frame ends. In other words, STA 2 may change the state to the awake state whenever the reception of the DL frame ends. That is, STA 2 may transmit a UL frame during BA transmission by STA 1.

Therefore, according to the second embodiment, there is the effect of increasing link utilization. However, according to the second embodiment, the transmission opportunity may increase, but power efficiency may decrease.

The Third Embodiment

Hereinafter, for the convenience of description, at least one STA that receives a DL frame may be described as a first STA. Also, for convenience of description, STAs distinguished from the first STA that do not receive the DL frame may be described as second STAs.

According to the third embodiment, when multiple DL frames are transmitted during the same TXOP, the non-AP MLD may set/change the state of the second STA to the doze state until the nth DL frame ends. may mean the total number of DL frames transmitted by the AP MLD (for example, AP 1). The n-th DL frame may be changed according to the number of frames. That is, the n-th DL frame may mean the last transmitted frame. According to the third embodiment, there is the effect of reducing power consumption.

Specifically, when the first STA receives the DL frame, it may be assumed that DL and UL transmission does not occur in the second STA (or the link on which the second STA operates). For example, the first STA may confirm that DL and UL transmission does not occur through a link connected to the second STA based on the DL frame. Accordingly, the second STA may enter the doze state until the end point of the n-th DL frame reception. The second STA may enter the awake state after receiving the n-th DL frame. Information on the n-th DL frame may be transmitted while being included in the first transmitted DL frame or may be transmitted while being included in the last transmitted n-th DL frame. Accordingly, after entering the doze state, the second STA may change the state to the awake state at the end of receiving the n-th DL frame.

Figure 33:
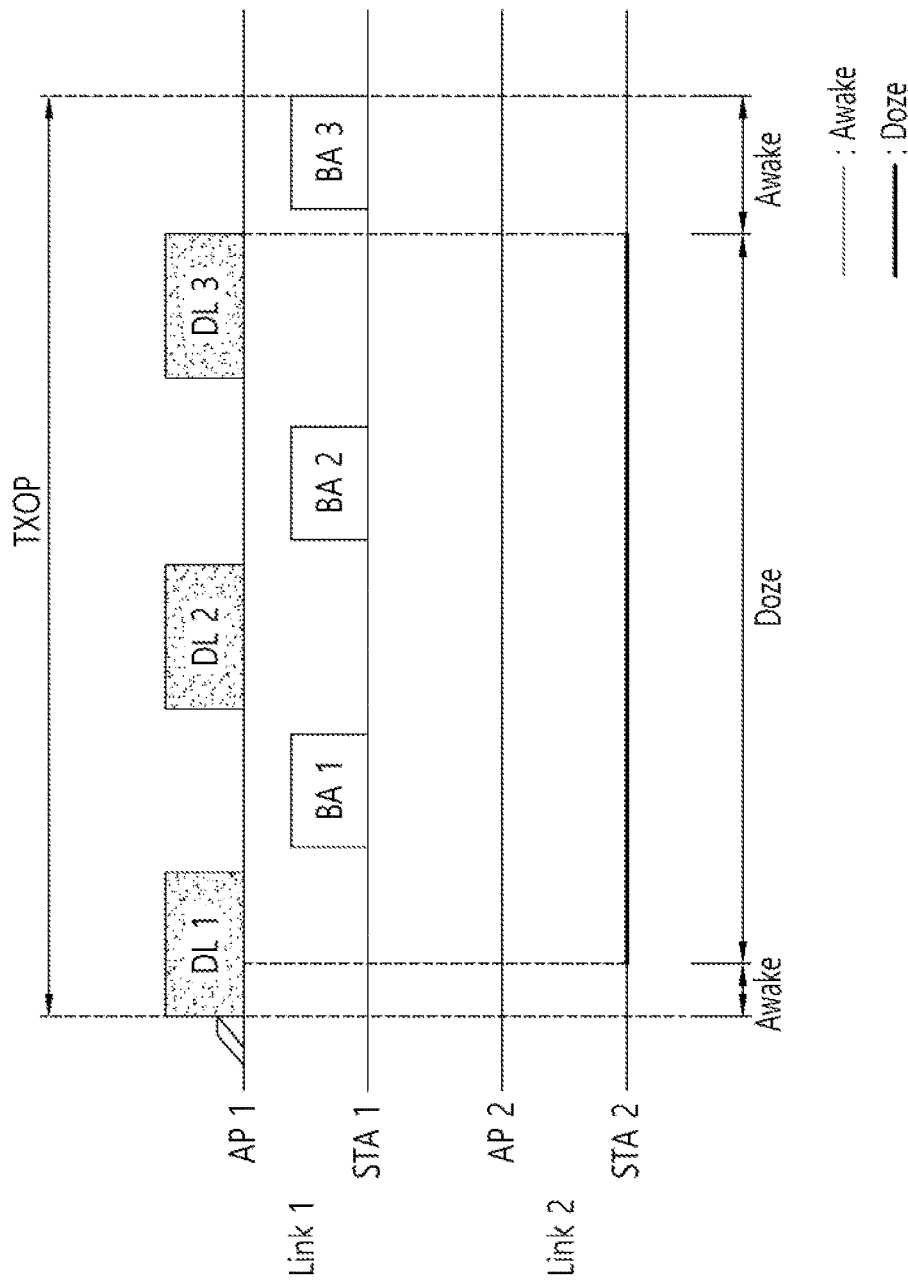
FIG. 33 shows another example of the operation of a non-AP MLD and an AP MLD.

FIG. 33 shows another example of the operation of a non-AP MLD and an AP MLD.

Referring to FIG. 33, STA 1 may be an example of the above-described first STA. STA 2 may be an example of the above-described second STA. AP MLD 1 (for example, AP 1) may acquire TXOP from Link 1.

For example, the time point at which STA 2 enters the doze state may be the time point at which the non-AP MLD 1 knows whether data is transmitted to itself through a DL frame (for example, DL 1). For example, the time point at which STA 2 enters the doze state may be the time point at which the non-AP MLD 1 checks the STAID field value of the PHY Header of the SU/MU PPDU or the RA value of the MAC Header of the SU/MU PPDU.

For another example, the time point at which STA 2 enters the doze state may be a time point at which non-AP MLD 1 recognizes that there is no DL frame (for example, DL 1) transmitted to STA 2 within the same DL TXOP period. For example, the time point at which STA 2 enters the doze state may be a time point at which non-AP MLD 1 checks information indicating the presence or absence of DL frame for STA 2 in a DL frame received from STA 1.

For another example, the time point at which STA 2 enters the doze state may be a time point at which DL 1 transmission starts.

According to an embodiment, the non-AP MLD 1 may change the state of STA 2 from the doze state to the awake state when DL 3 ends.

The Fourth Embodiment

Hereinafter, for the convenience of description, at least one STA that receives a DL frame may be described as a first STA. Also, for convenience of description, STAs distinguished from the first STA that do not receive the DL frame may be described as second STAs.

According to the fourth embodiment, the non-AP MLD may set/change the state of the second STA to the Doze state until (DL frame reception end time+SIFS+BA (or BACK/Block ACK) transmission time). In other words, the non-AP MLD may set the state of the second STA as Doze State when receiving the DL frame, in response to the DL frame, the status of the second STA can be maintained as the doze State until the transmission of BA after SIFS is completed. The second STA can enter the awake state after the end of the BA. According to the fourth embodiment, there is the effect that can reduce power consumption.

In the first embodiment, during DL TXOP (TXOP in which a DL frame is transmitted), the non-AP MLD sets the second STA to the Doze state. Unlike the first embodiment, the fourth embodiment may set/change the state of the second STA to the Doze state until the end of BA transmission.

Figure 34:
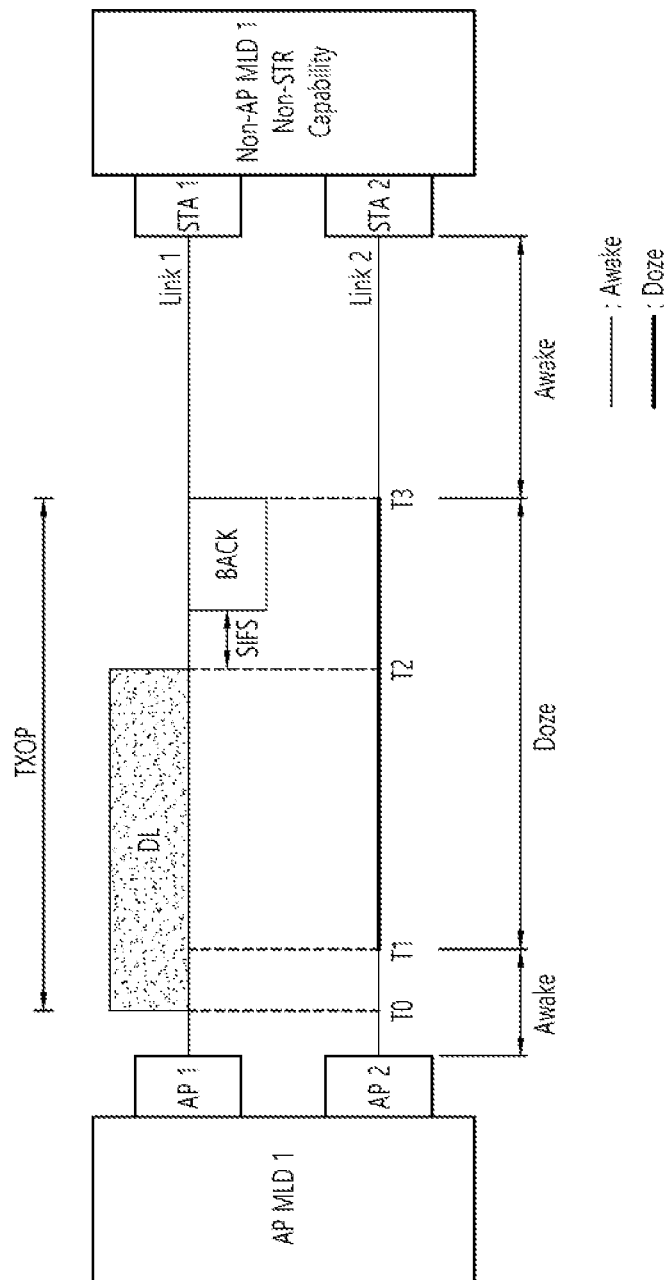
FIG. 34 shows another example of the operation of a non-AP MLD and an AP MLD.

FIG. 34 shows another example of the operation of a non-AP MLD and an AP MLD.

Referring to FIG. 34, STA 1 may be an example of the above-described first STA. STA 2 may be an example of the above-described second STA. During the TXOP period, only one DL frame may be transmitted. STA 2 may operate in a doze state until the transmission end time (for example, T3) of the BA (or BACK). In other words, STA 2 that has entered the Doze state may operate in the Doze state until the DL frame reception end time+SIFS+BA transmission time (for example, T3), in addition to the duration of the DL frame. In other words, the non-AP MLD 1 may change the state of STA 2 from the doze state to the awake state after the BA transmission is terminated.

Figure 35:
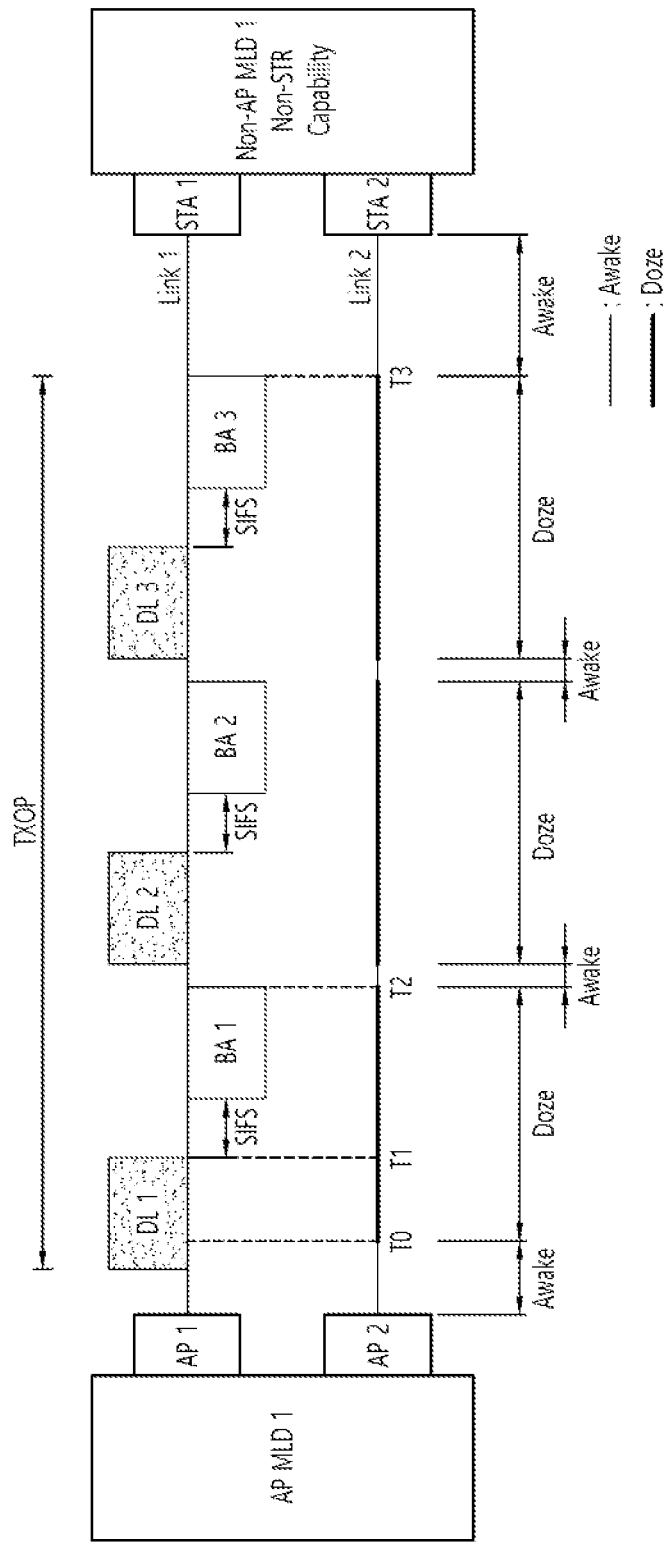
FIGS. 35 and 36 show other examples of operations of a non-AP MLD and an AP MLD.
Figure 36:
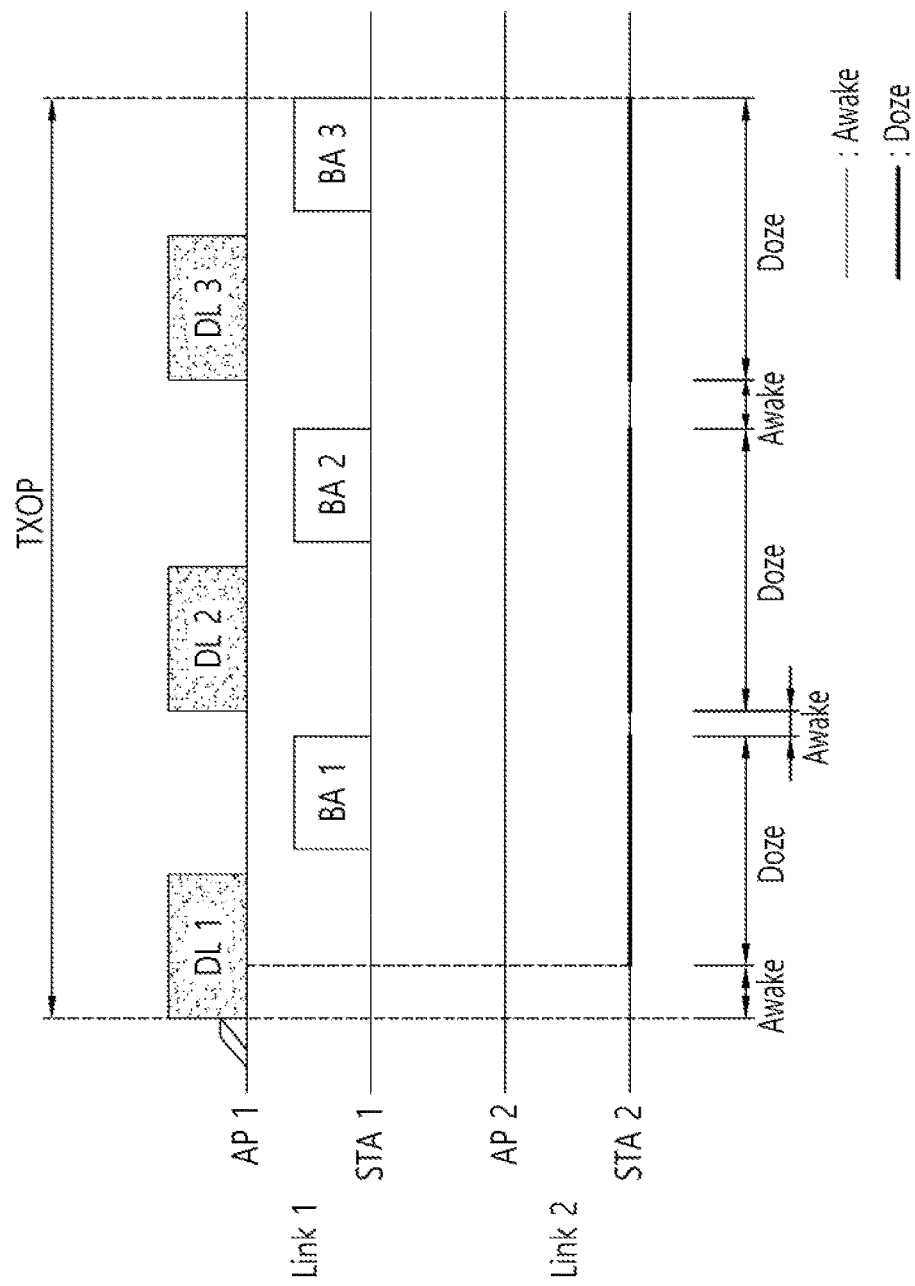

FIGS. 35 and 36 show other examples of operations of a non-AP MLD and an AP MLD.

Referring to FIGS. 35 and 36, STA 1 may be an example of the above-described first STA. STA 2 may be an example of the above-described second STA. A plurality of DL frames may be transmitted during the TXOP period. AP MLD 1 (for example, AP 1) may acquire TXOP from Link 1.

The non-AP MLD 1 may change the state of STA 2 from the awake state to the doze state based on the DL 1.

For example, the time point at which STA 2 enters the doze state may be the time point at which the non-AP MLD 1 knows whether data is transmitted to itself, through a DL frame (for example, DL 1). For example, the time point at which STA 2 enters the doze state may be the time point at which the non-AP MLD 1 checks the STAID field value of the PHY Header of the SU/MU PPDU or the RA value of the MAC Header of the SU/MU PPDU.

For another example, the time point at which STA 2 enters the doze state may be a time point at which non-AP MLD 1 recognizes that there is no DL frame (for example, DL 1) transmitted to STA 2 within the same DL TXOP period. For example, the time point at which STA 2 enters the doze state may be a time point at which non-AP MLD 1 checks DL frame presence or absence indication information for STA 2 in a DL frame received from STA 1.

As another example, the time point at which STA 2 enters the doze state may be the time point at which DL 1 is transmitted (for example, T0 in FIG. 35).

According to an embodiment, the non-AP MLD 1 may change the state of STA 2 from the doze state to the awake state at the time point at which the BA transmission ends (for example, T2 in FIG. 35). The non-AP MLD 1 may operate in the same manner as the above-described operation even when DL 2 and DL 3 are received.

Power-Saving Mechanism when Transmitting UL PPDU

Hereinafter, when the non-AP MLD transmits UL data (or UL PPDU) to the AP MLD, a power-saving mechanism may be described. When the non-AP MLD transmits UL data (or UL PPDU) to the AP MLD, an example of the operation of the non-AP MLD and the AP MLD may be described with reference to FIG. 37.

Figure 37:
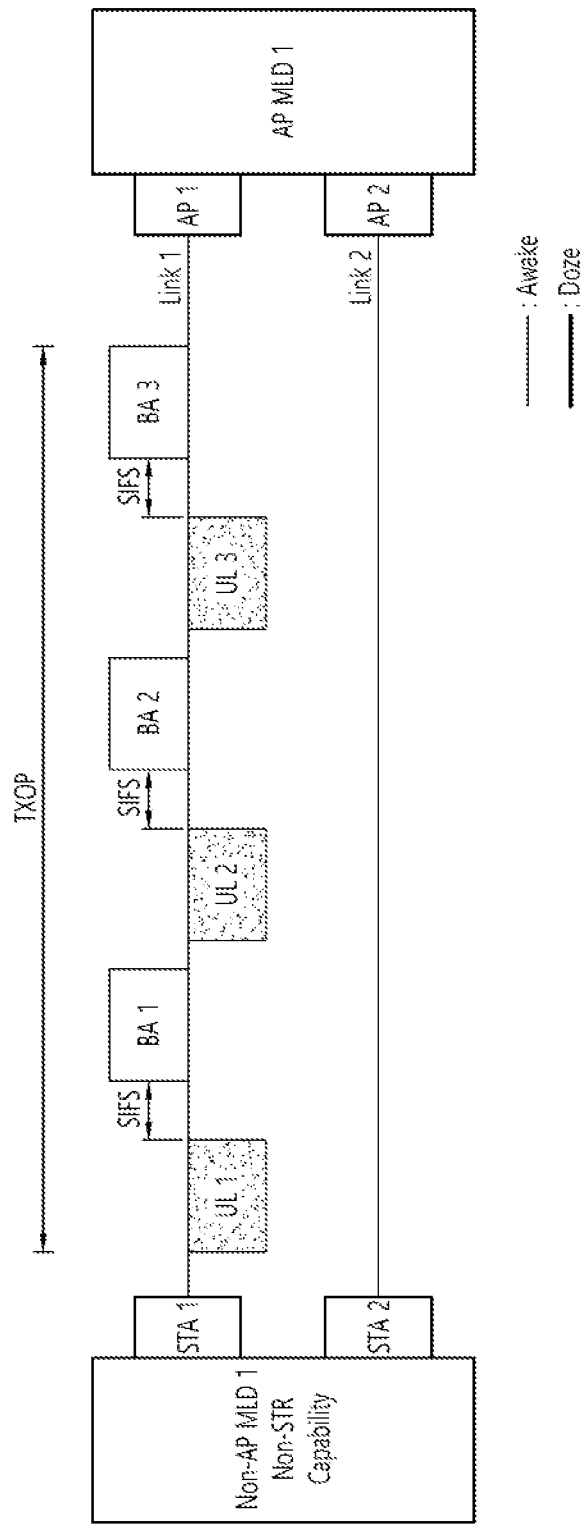
FIG. 37 shows another example of the operation of a non-AP MLD and an AP MLD.

FIG. 37 shows another example of the operation of a non-AP MLD and an AP MLD.

Referring to FIG. 37, non-AP MLD 1 and AP MLD 1 may have the structures of non-AP MLD 1 and AP MLD 1 of FIG. 23. Non-AP MLD 1 may be a non-STR capability device (or non-STR MLD) that does not support STR capability.

STA 1 of Non-AP MLD 1 may transmit a UL PPDU (or UL signal) to AP 1 through Link 1. Until the UL PPDU transmission is finished, AP 2 cannot transmit a second UL PPDU different from the UL PPDU (or a second UL signal different from the UL signal) to avoid interference. In other words, STA 2 cannot receive a DL PPDU (or a DL signal) to avoid interference until the UL PPDU transmission is finished. That is, STA 2 may only transmit the UL PPDU.

According to one embodiment, UL PPDU transmission to AP 2 may not occur during STA 2 during the same UL TXOP period. In this case, in STA 2, there is a section that does not generate both UL PPDU transmission/DL PPDU reception until the UL PPDU transmission is over. During this section, STA 2 can enter a Doze State (or a Power-saving State, a Sleep State, or an unavailable state for other links) to reduce power.

In the following specifications, various embodiments of the section where STA 2 enters the Doze State may be explained.

The Fifth Embodiment

Hereinafter, for the convenience of description, at least one STA that transmits a UL frame may be described as a first STA. Also, for the convenience of description, STAs distinguished from the first STA that do not transmit the UL frame may be described as second STAs.

According to the fifth embodiment, the second STA may enter the doze state during the TXOP period of the UL data frame (or UL PPDU). Accordingly, there is the effect of reducing power consumption.

Specifically, if the first STA transmits the UL frame, it may be considered that no DL and UL transmission occurs in the second STA. In order to reduce power consumption, the second STA can enter the Doze State for itself during the TXOP period of the UL data frame. The second STA can enter the Doze State by itself when the first STA starts the UL frame transmission.

In order to reduce power consumption, the second STA that has entered the doze state by itself may maintain the doze state until the transmission of UL data is finished (for example, TXOP Duration of UL data). However, when the first STA fails to transmit UL data, the non-AP MLD 1 may change the state of STA 2 entering the doze state to the awake state.

Figure 38:
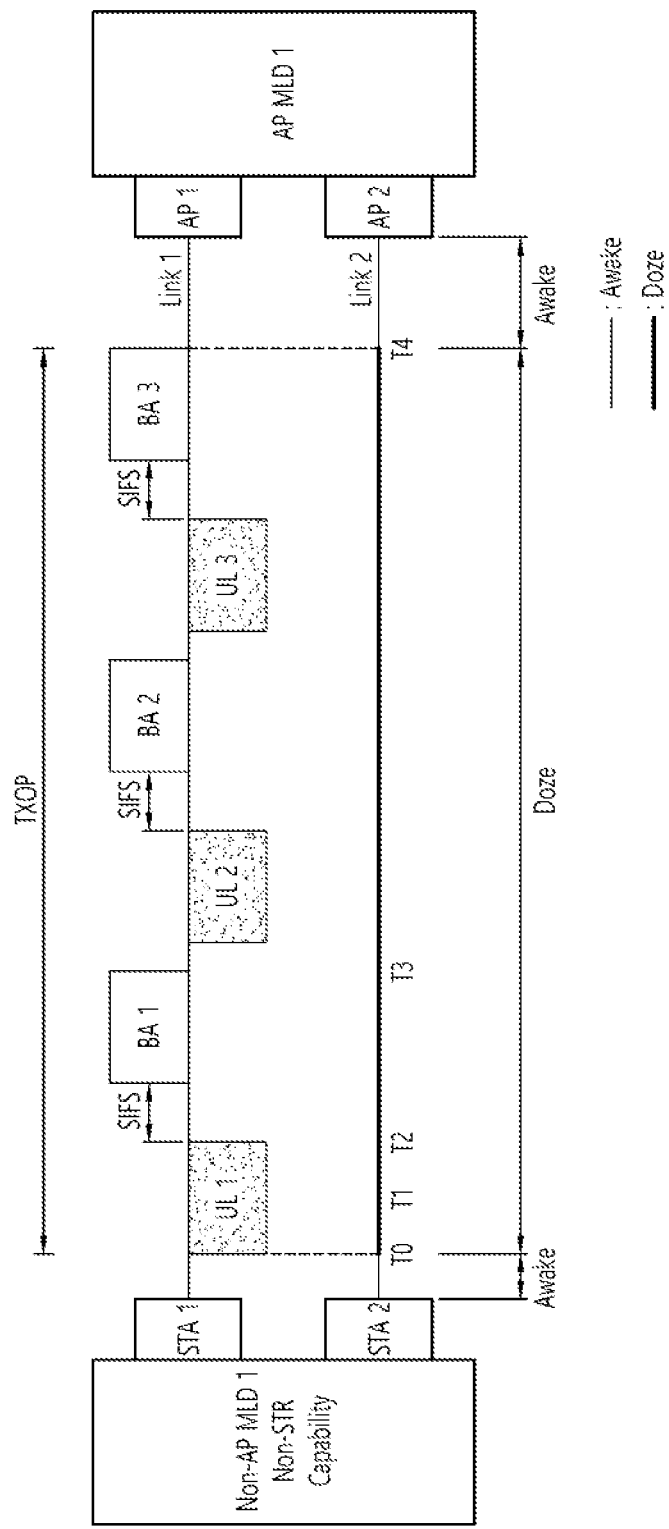
FIGS. 38 and 39 show other examples of operations of a non-AP MLD and an AP MLD.
Figure 39:
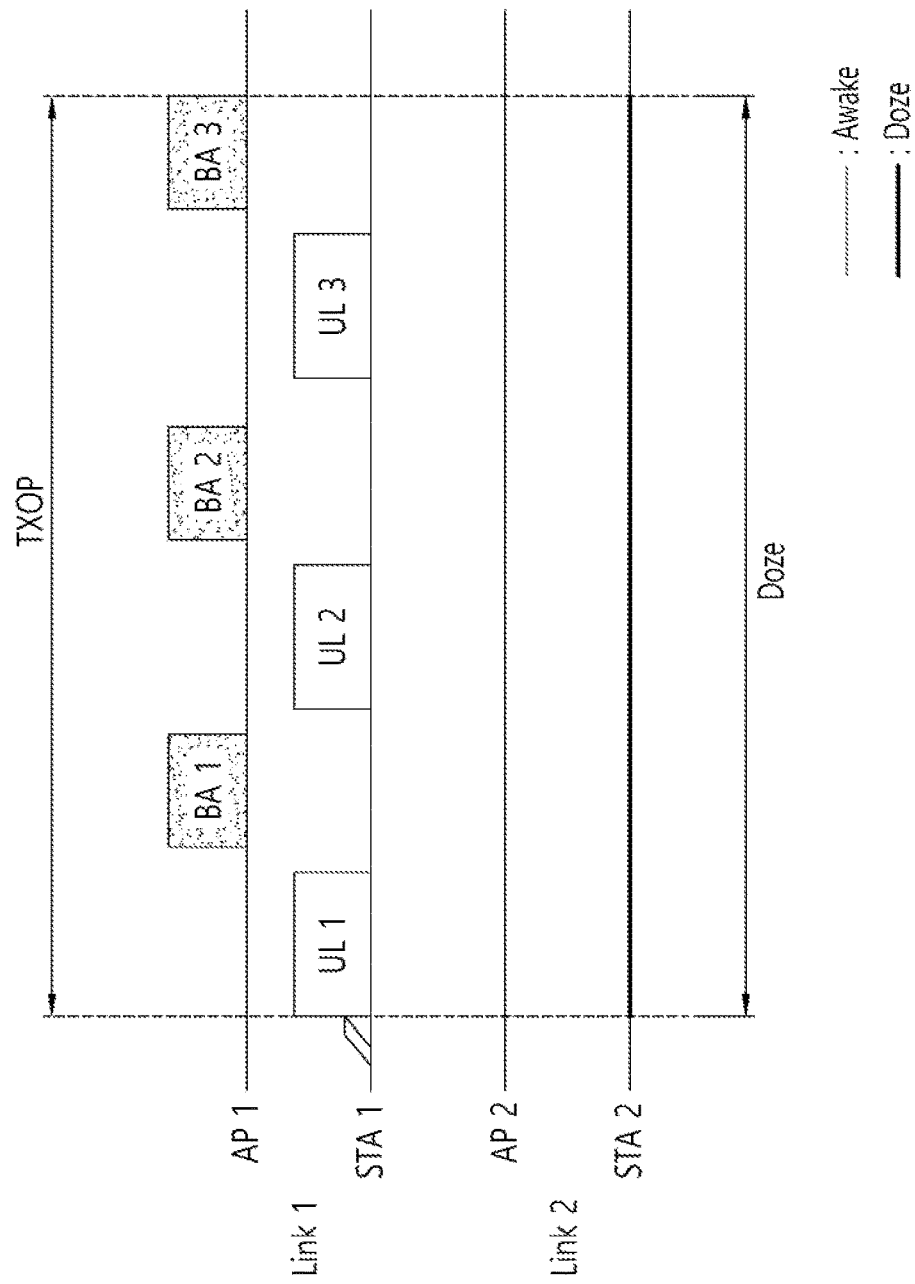

FIGS. 38 and 39 show other examples of operations of a non-AP MLD and an AP MLD.

Referring to FIGS. 38 and 39, STA 1 may be an example of the above-described first STA. STA 2 may be an example of the above-described second STA. A plurality of UL frames may be transmitted during the TXOP period. Non-AP MLD 1 (for example, STA 1) may acquire TXOP from Link 1.

STA 1 may transmit UL 1, UL 2, and UL 3 within the acquired TXOP. Non-AP MLD 1 can know that UL or DL data transmission does not occur in Link 2 during the TXOP (for example, T0 to T4 in FIG. 38). For example, non-AP MLD 1 may confirm that UL data transmission does not occur based on no data buffered in link 2. As another example, non-AP MLD 1 may confirm that DL data transmission does not occur based on BA 1 received from AP MLD 1 (for example, AP 1).

Accordingly, the non-AP MLD 1 may change STA 2 from the awake state to the doze state during the TXOP. In other words, STA 2 may enter a doze state during the TXOP. For example, the time point at which STA 2 enters the doze state may be a time point at which UL frame transmission starts (for example, T0 in FIG. 38).

Although not shown, when STA 1 fails to transmit UL 1, non-AP MLD 1 may change the state of STA 2 from a doze state to an awake state. For example, when STA 1 does not receive BA 1, non-AP MLD 1 may change the state of STA 2 from a doze state to an awake state.

According to an embodiment, even when STA 2 enters the doze state, when UL data to be transmitted from STA 2 is generated, it may change to an awake state and attempt UL data transmission. A specific example related to the above embodiment may be described with reference to FIG. 40.

Figure 40:
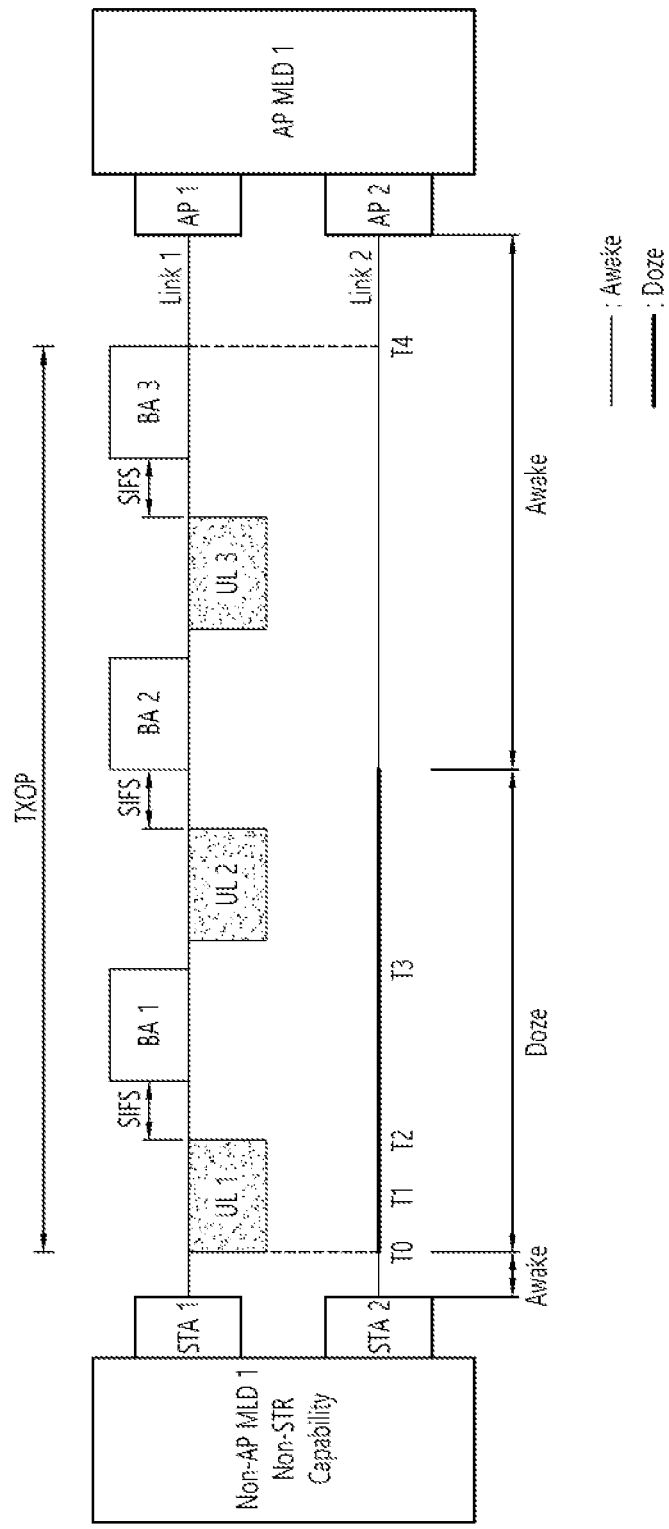
FIG. 40 shows another example of the operation of a non-AP MLD and an AP MLD.

FIG. 40 shows another example of the operation of a non-AP MLD and an AP MLD.

Referring to FIG. 40, STA 1 may obtain a TXOP and transmit UL 1, UL 2, and UL 3 within the TXOP. STA 2 may change the state of STA 2 from an awake state to a doze state at a transmission time of UL 1 (for example, T0).

After UL 2 is transmitted, UL data to be transmitted through link 2 may be generated. In other words, STA 2 may check the buffered data. STA 2 may change the state from the doze state to the awake state. Although not shown, when UL 3 is transmitted, STA 2 may transmit buffered data to AP 2 through link 2.

The Sixth Embodiment

Hereinafter, for the convenience of description, at least one STA that transmits a UL frame may be described as a first STA. Also, for the convenience of description, STAs distinguished from the first STA that do not transmit the UL frame may be described as second STAs.

According to the sixth embodiment, the Non-AP MLD can set/change the status of the second STA to a doze state until the time point at which the reception of the UL frame is terminated. According to the second embodiment, there is the effect that can reduce power consumption.

In the fifth embodiment, during the UL TXOP (TXOP where the UL frame is transmitted), non-AP MLD set the second STA to a doze state. Unlike the fifth embodiment, the sixth embodiment can set/change the status of the second STA to a doze state until the end of the UL frame transmission. The sixth embodiment has the effect of increasing the use of links compared to the fifth embodiment. However, compared to the fifth embodiment, although the transmission opportunity (for example, channel access) increases, the power efficiency could be reduced.

Specifically, when the first STA transmits the UL frame, it may be considered that DL and UL transmissions do not occur in the second STA. Accordingly, the second STA may enter the doze state until the end of the UL frame transmission. The second STA may enter the awake state after the transmission of the UL frame is terminated.

Figure 41:
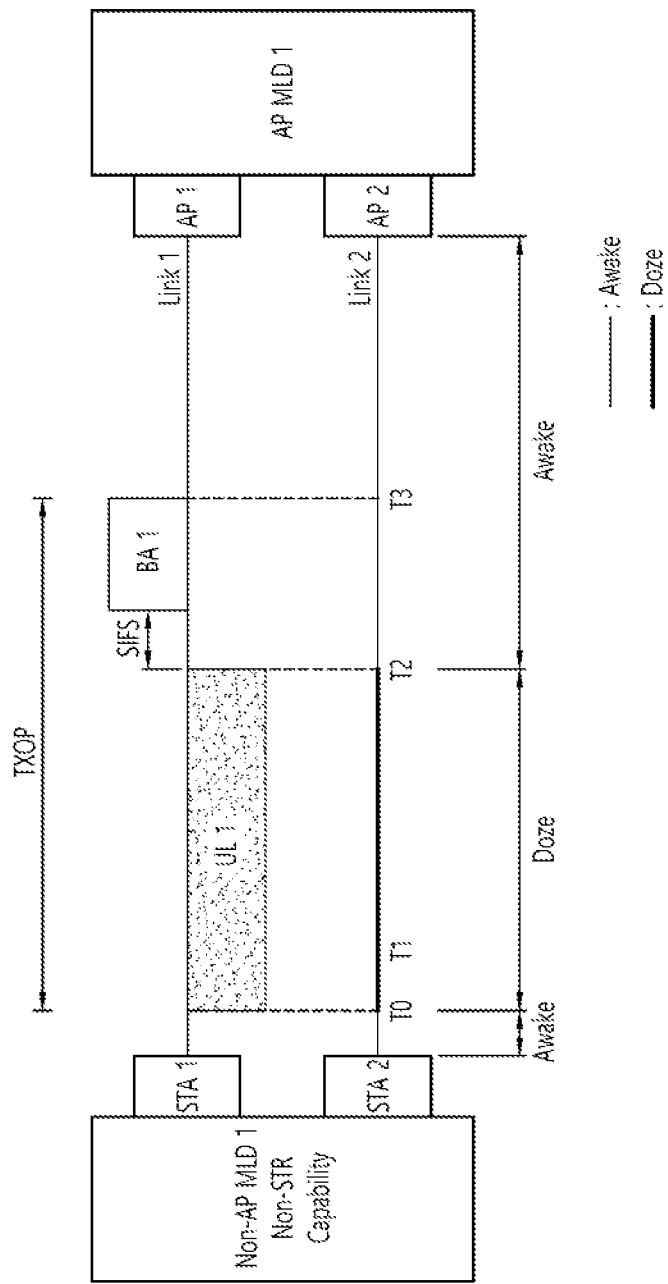
FIG. 41 shows another example of the operation of a non-AP MLD and an AP MLD.
Figure 42:
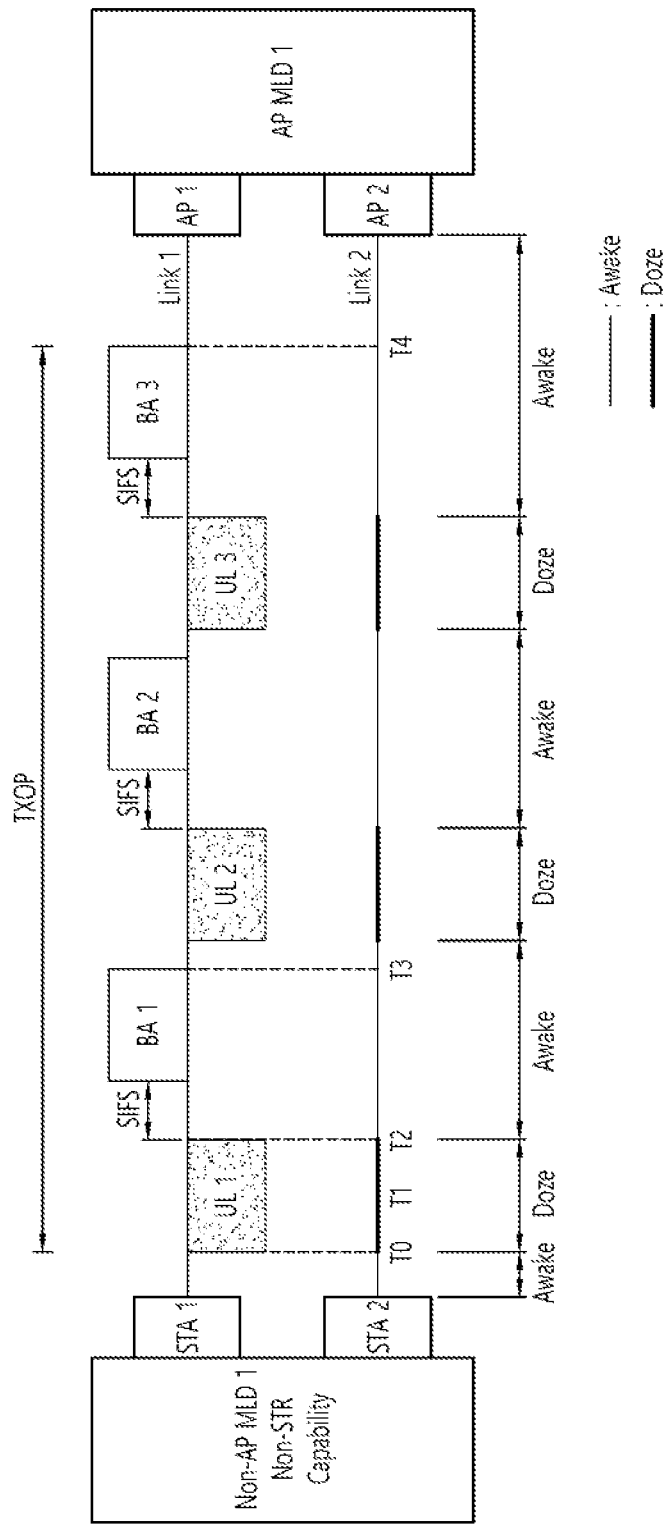
FIGS. 42 and 43 show other examples of operations of a non-AP MLD and an AP MLD.
Figure 43:
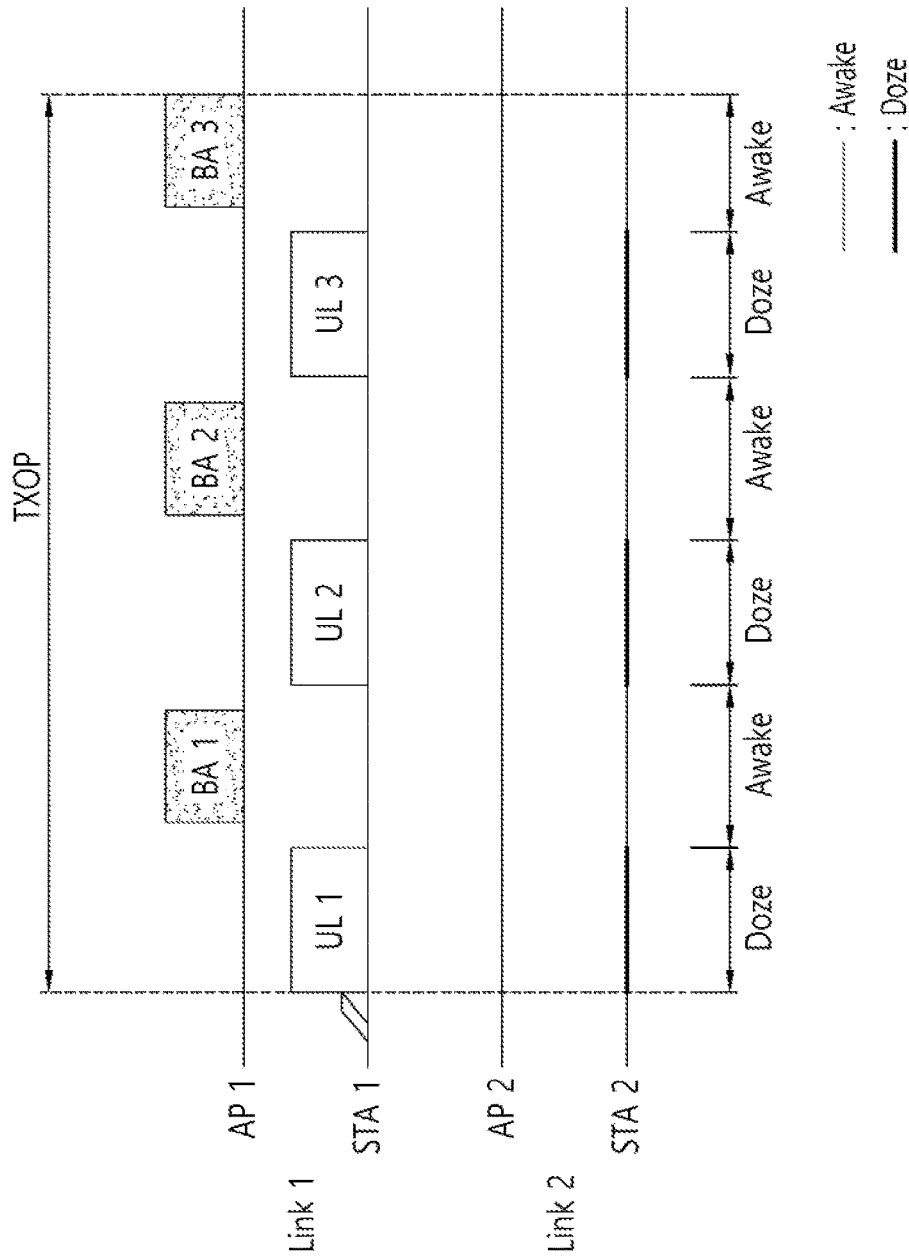

A specific example of the sixth embodiment may be described with reference to FIGS. 41 to 43. FIG. 41 may shows the case of a single frame. FIGS. 42 and 43 may show the case of multiple frames.

FIG. 41 shows another example of the operation of a non-AP MLD and an AP MLD.

Referring to FIG. 41, STA 1 may be an example of the above-described first STA. STA 2 may be an example of the above-described second STA. During the TXOP period, only one UL frame may be transmitted. STA 2 may operate in a doze state until the end of reception of the UL frame (for example, T2).

FIGS. 42 and 43 show other examples of operations of a non-AP MLD and an AP MLD.

Referring to FIGS. 42 and 43, STA 1 may be an example of the above-described first STA. STA 2 may be an example of the above-described second STA. A plurality of UL frames may be transmitted during the TXOP period. Non-AP MLD 1 (for example, STA 1) may acquire TXOP from Link 1.

STA 1 may transmit UL 1, UL 2, and UL 3 within the acquired TXOP. It can be seen that non-AP MLD 1 does not generate UL or DL data transmission in Link 2 during the transmission period of UL 1 (for example, T0 to T2 in FIG. 42). For example, non-AP MLD 1 may confirm that UL data transmission does not occur based on no data buffered in link 2.

Accordingly, the non-AP MLD 1 may change STA 2 from the awake state to the doze state during the transmission period of UL 1 (or the duration of UL 1). In other words, STA 2 may enter a doze state during the transmission period of UL 1. For example, the time point at which STA 2 enters the doze state may be a time point at which UL 1 transmission starts (for example, T0 in FIG. 42).

When a plurality of UL frames (for example, UL 1, UL 2, and UL 3) are transmitted through Link 1 during the UL TXOP period, STA 1 may receive each Block ACK (BA) for each UL frame from AP 1 through DL.

During a period in which DL data reception for BA occurs, the same DL data transmission may occur from AP 2. Accordingly, STA 2 may change the state to the awake state at every time at which the reception of DL frame reception is terminated. That is, STA 2 may receive a DL frame from AP 2 when receiving BA from STA 1.

Therefore, according to the sixth embodiment, there is the effect of increasing link utilization. However, according to the sixth embodiment, although the transmission opportunity may increase, power efficiency may decrease.

Although not shown, when STA 1 fails to transmit UL 1, the non-AP MLD 1 may change the state of STA 2 from a doze state to an awake state. For example, when STA 1 does not receive BA 1, non-AP MLD 1 may change the state of STA 2 from a doze state to an awake state.

According to an embodiment, even when STA 2 enters the doze state, when UL data to be transmitted from STA 2 occurs, STA 2 may change to an awake state and attempt UL data transmission.

The Seventh Embodiment

Hereinafter, for the convenience of description, at least one STA that transmits a UL frame may be described as a first STA. Also, for the convenience of description, STAs distinguished from the first STA that do not transmit the UL frame may be described as second STAs.

According to the seventh embodiment, when multiple UL frames are transmitted during the same TXOP, the non-AP MLD may set/change the state of the second STA to the doze state until the nth UL frame ends. 'n' mean the total number of UL frames transmitted by the non-AP MLD (for example, STA 1). The n-th UL frame may be changed according to the number of frames. That is, the n-th UL frame may mean the last transmitted frame. According to the seventh embodiment, there is the effect of reducing power consumption.

Specifically, when the first STA transmits the UL frame, it may be considered that DL and UL transmission does not occur in the second STA (or the link on which the second STA operates). Accordingly, the second STA may enter the doze state until the time when the n-th UL frame transmission is terminated. The second STA may enter the awake state after the n-th UL frame transmission is terminated.

Information on the n-th DL frame may be transmitted while being included in the first transmitted DL frame or may be transmitted while being included in the last transmitted n-th DL frame. Accordingly, after entering the doze state, the second STA may change the state to the awake state at the end of transmission of the n-th DL frame.

Figure 44:
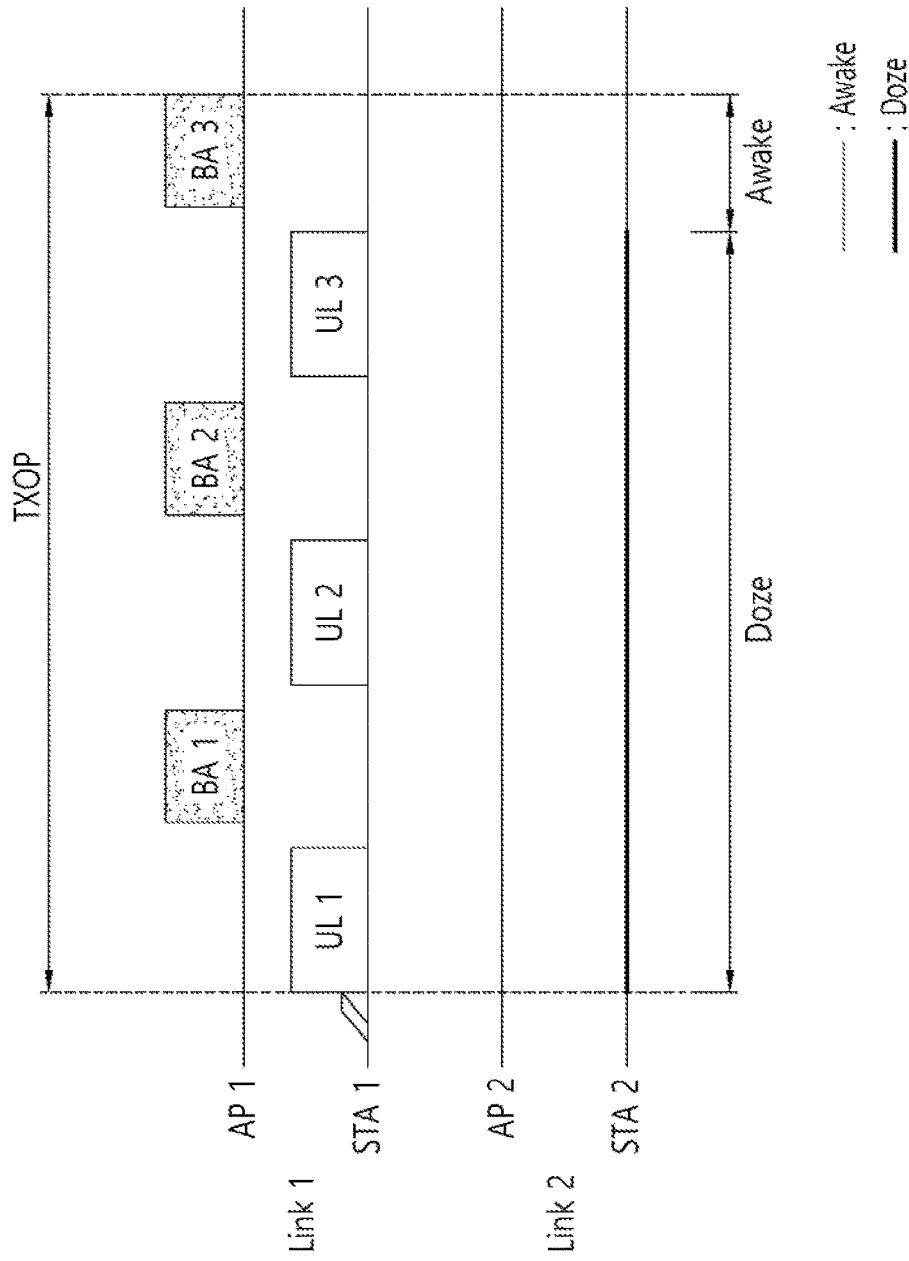
FIG. 44 shows another example of the operation of a non-AP MLD and an AP MLD.

FIG. 44 shows another example of the operation of a non-AP MLD and an AP MLD.

Referring to FIG. 44, STA 1 may be an example of the above-described first STA. STA 2 may be an example of the above-described second STA. A plurality of UL frames may be transmitted during the TXOP period. Non-AP MLD 1 (for example, STA 1) may acquire TXOP from Link 1.

STA 1 may transmit UL 1, UL 2, and UL 3 within the acquired TXOP. The non-AP MLD 1 may change the state of STA 2 to the doze state until the end of the UL 3 transmission. In other words, STA 2 may maintain a doze state until the end of UL 3 transmission. For example, the time point at which STA 2 enters the doze state may be a time point at which UL 1 transmission starts. After entering the doze state, STA 2 may change the state from the doze state to the awake state at the UL 3 transmission end point.

Although not shown, when STA 1 fails to transmit UL 1, the non-AP MLD 1 may change the state of STA 2 from a doze state to an awake state. For example, when STA 1 does not receive BA 1, non-AP MLD 1 may change the state of STA 2 from a doze state to an awake state.

According to an embodiment, even when STA 2 enters the doze state, when UL data to be transmitted from STA 2 occurs, STA 2 may change to an awake state and attempt UL data transmission.

The Eighth Embodiment

Hereinafter, for the convenience of description, at least one STA that transmits a UL frame may be described as a first STA. Also, for the convenience of description, STAs distinguished from the first STA that do not transmit the UL frame may be described as second STAs.

According to the eighth embodiment, the non-AP MLD may set/change the state of the second STA to the Doze state until (UL frame reception end time+SIFS+BA transmission time) in addition to the duration of the UL frame. In other words, the non-AP MLD may set the state of the second STA to the Doze state when transmitting the UL frame, and in response to the UL frame, the state of the second STA may be maintained in the doze state until the reception of the BA after SIFS is completed. The second STA may enter the awake state after BA reception is terminated. According to the eighth embodiment, there is the effect of reducing power consumption.

In the fifth embodiment, during DL TXOP (TXOP in which a DL frame is transmitted), the non-AP MLD sets the second STA to the doze state. Unlike the fifth embodiment, the eighth embodiment may set/change the state of the second STA to the doze state until the BA transmission ends.

Figure 45:
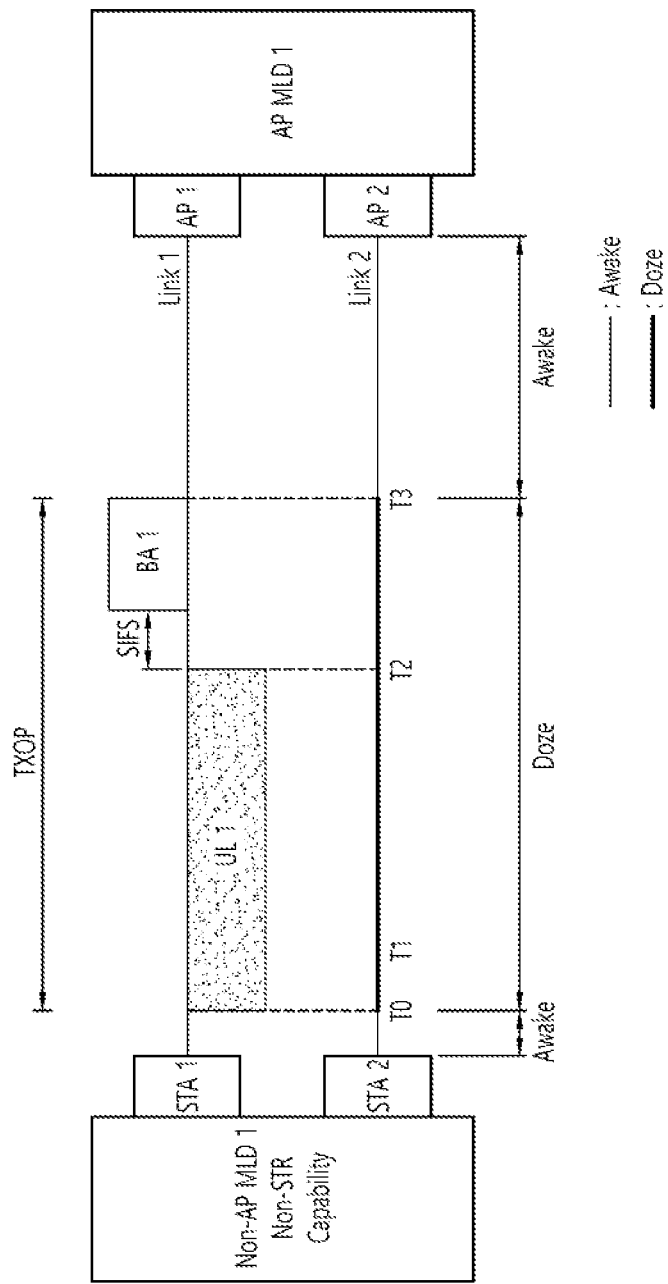
FIG. 45 shows another example of the operation of a non-AP MLD and an AP MLD.

FIG. 45 shows another example of the operation of a non-AP MLD and an AP MLD.

Referring to FIG. 45, STA 1 may be an example of the above-described first STA. STA 2 may be an example of the above-described second STA. During the TXOP period, only one UL frame may be transmitted. STA 2 may operate in a doze state until the reception end time of the BA (or BACK) (for example, T3). In other words, STA 2 that has entered the doze state may operate in the doze state until "UL frame reception end time+SIFS+BA transmission time" in addition to the duration of the UL frame (for example, T3). In other words, the non-AP MLD 1 may change the state of STA 2 from the doze state to the awake state after BA reception is terminated.

Figure 46:
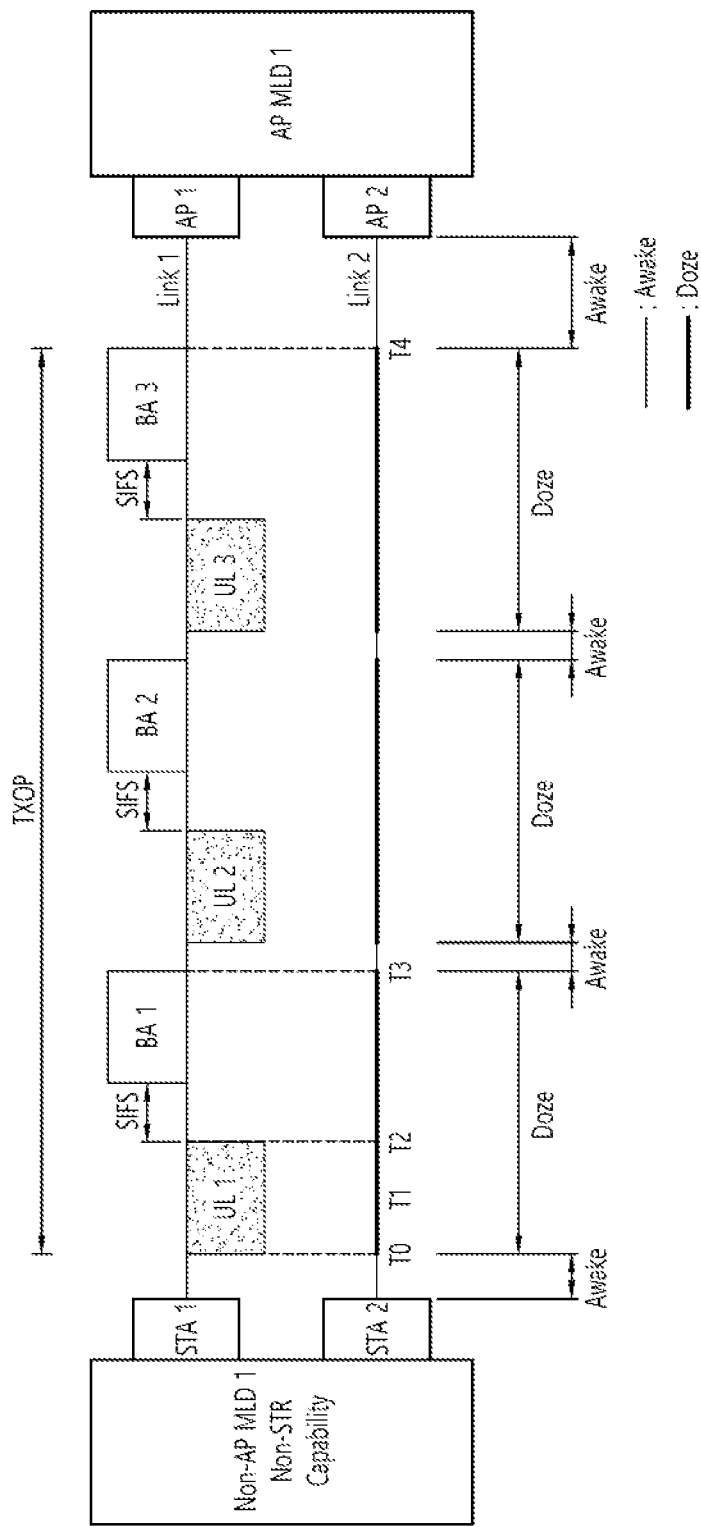
FIGS. 46 and 47 show other examples of operations of a non-AP MLD and an AP MLD.
Figure 47:
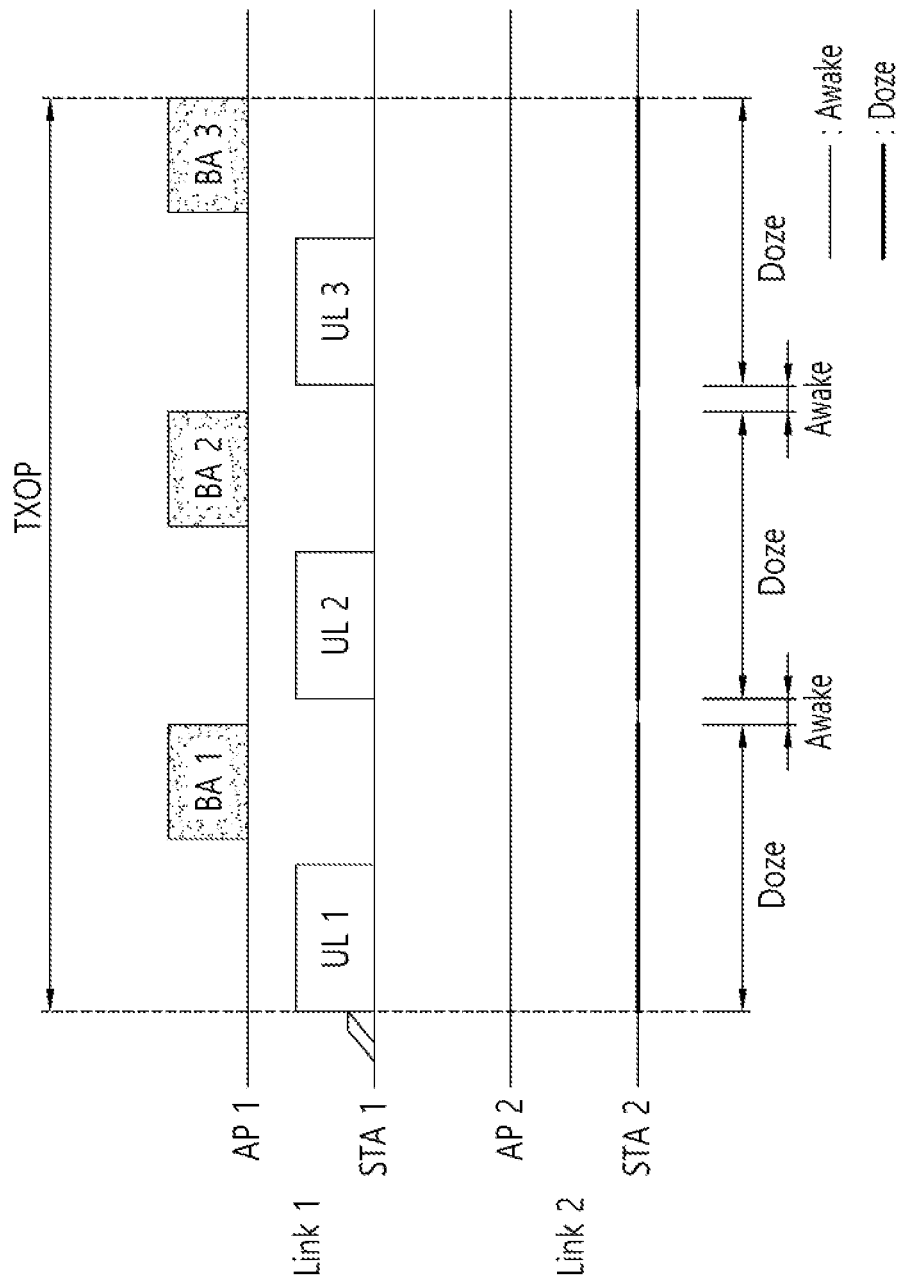

FIGS. 46 and 47 show other examples of operations of a non-AP MLD and an AP MLD.

FIGS. 46 and 47, STA 1 may be an example of the above-described first STA. STA 2 may be an example of the above-described second STA. A plurality of UL frames may be transmitted during the TXOP period. Non-AP MLD 1 (for example, STA 1) may acquire TXOP from Link 1.

The non-AP MLD 1 may change the state of STA 2 from an awake state to a doze state based on UL 1.

For example, the time point at which STA 2 enters the doze state may be the time point at which UL 1 is transmitted (for example, T0 in FIG. 46).

According to an embodiment, the non-AP MLD 1 may change the state of STA 2 from the doze state to the awake state at the time point at which the BA transmission ends (for example, T2 in FIG. 46). The non-AP MLD 1 may operate in the same manner as the above-described operation even when DL 2 and DL 3 are received.

Although not shown, when STA 1 fails to transmit UL 1, the non-AP MLD 1 may change the state of STA 2 from a doze state to an awake state. For example, when STA 1 does not receive BA 1, non-AP MLD 1 may change the state of STA 2 from a doze state to an awake state.

According to an embodiment, even when STA 2 enters the doze state, when UL data to be transmitted from STA 2 occurs, STA 2 may change to an awake state and attempt UL data transmission.

Signaling to Change Non-AP MLD from Doze State to Awake State

The above-described first to eighth embodiments are embodiments in which the non-AP MLD enters the doze state. In the following embodiments, when the STA of the non-AP MLD enters the doze state, a signaling procedure for changing it to the awake state may be described.

Signaling Process when Receiving DL PPDU

As described in the above embodiments, in general, even if DL data to be transmitted to STA 2 occurs during the DL TXOP period, AP 2 buffers the data until the DL TXOP is finished because STA 2 has already entered the doze state.

However, depending on circumstances, the AP may transmit DL data, after selectively waking STA 2 during DL TXOP.

For example, referring to FIG. 29 again, there is no DL data for STA 2 to be transmitted from AP 2 at the time point in which AP 1 transmits DL 1, but data to be transmitted may occur during DL TXOP. For another example, there is DL data for STA 2, but the channel state is busy, so AP 2 may not transmit DL data and may buffer it.

In the case of the above example, the AP 1 may transmit information for awake of STA 2 (for example, traffic indication information for STA 2) and timing information for awake in the DL frame (for example, DL 1 PPDU duration information or DL1+SIFS+BA1 information, etc.). Based on the information for waking STA 2 and the timing information for awake, STA 2 may wake at an appropriate timing to receive its DL data.

According to an embodiment, the timing information for awake may be omitted, and when omitted, STA 2 may awake at an appropriate timing in consideration of interference between links. Various embodiments thereof may be described below.

The Ninth Embodiment

A ninth embodiment may be described with reference to FIG. 48.

Figure 48:
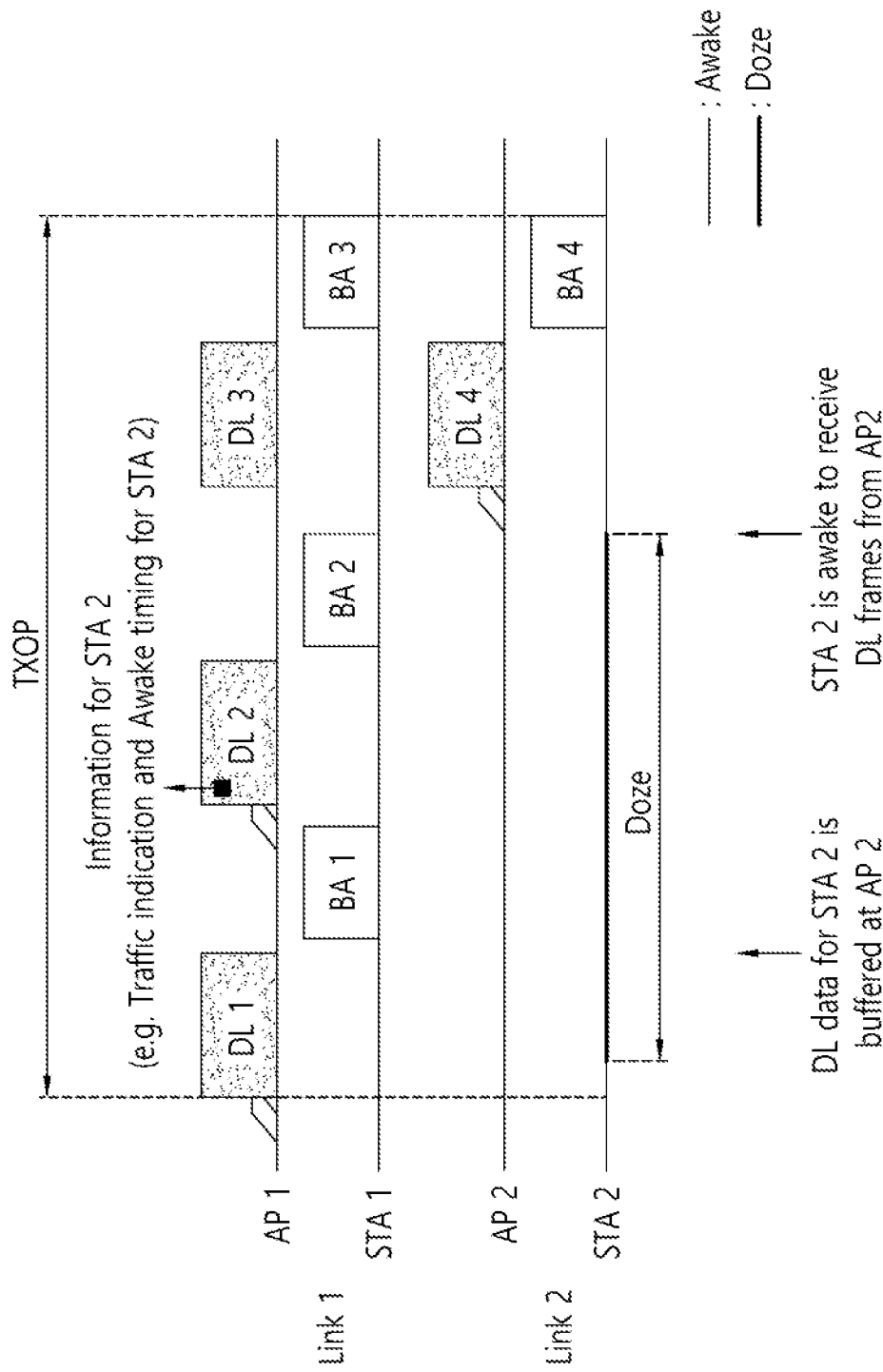
FIG. 48 shows another example of the operation of a non-AP MLD and an AP MLD.

FIG. 48 shows another example of the operation of a non-AP MLD and an AP MLD.

Referring to FIG. 48, STA 2 that does not receive DL data, when AP 1 transmits DL 1, may enter a doze state during DL TXOP based on the above-described non-STR PSM.

If, before AP 1 transmits DL 2, DL data to be transmitted by AP 2 to STA 2 may be generated. Accordingly, AP 1 may transmit information on DL data to be transmitted to STA 2 (for example, traffic indication (TI) information (or TIM information) and awake timing information for STA 2) by being included in the DL 2 frame. As an example, traffic indication (TI) information may include various types of information. Traffic indication (TI) information may include TIM information or information about more data bits.

The non-AP MLD 1 may receive information on DL data to be transmitted to the STA 2. The non-AP MLD 1 may check awake timing information included in the information on the DL data to be transmitted to the STA 2, and awake STA 2 based thereon. According to an embodiment, the awake timing information may be omitted.

According to an embodiment, although not shown, when non-AP MLD 1 supports STR capability, STA 2 can simultaneously perform transmission/reception. Accordingly, AP MLD 1 (for example, AP 1) may not need to transmit DL 2 including separate awake timing information. In other words, STA 2 that has received the awake information about itself may immediately awake and receive DL data (for example, DL 4) from AP 2.

According to an embodiment, non-AP MLD 1 may not support STR capability. In this case, AP 2 shall transmit DL 4 according to the DL 3 transmission period of AP 1 in order to avoid data collision due to inter-link interference. That is, while STA1 transmits BA 2 for DL 2 or BA 3 for DL 3, AP 2 shall not perform DL RX. In other words, AP 2 cannot transmit DL 4 in the transmission interval of BA 2 and the transmission interval of BA 3.

In this case, when appropriate time information (for example, DL 2 PPDU duration+SIFS+BA2 time) for DL 3 reception is transmitted to STA 2, more power consumption is reduced. However, whether AP 2 transmits DL data to STA 2 may be determined based on the channel access situation of AP 2 (for example, when the backoff count becomes 0).

The Tenth Embodiment

The tenth embodiment may be described with reference to FIG. 49.

Figure 49:
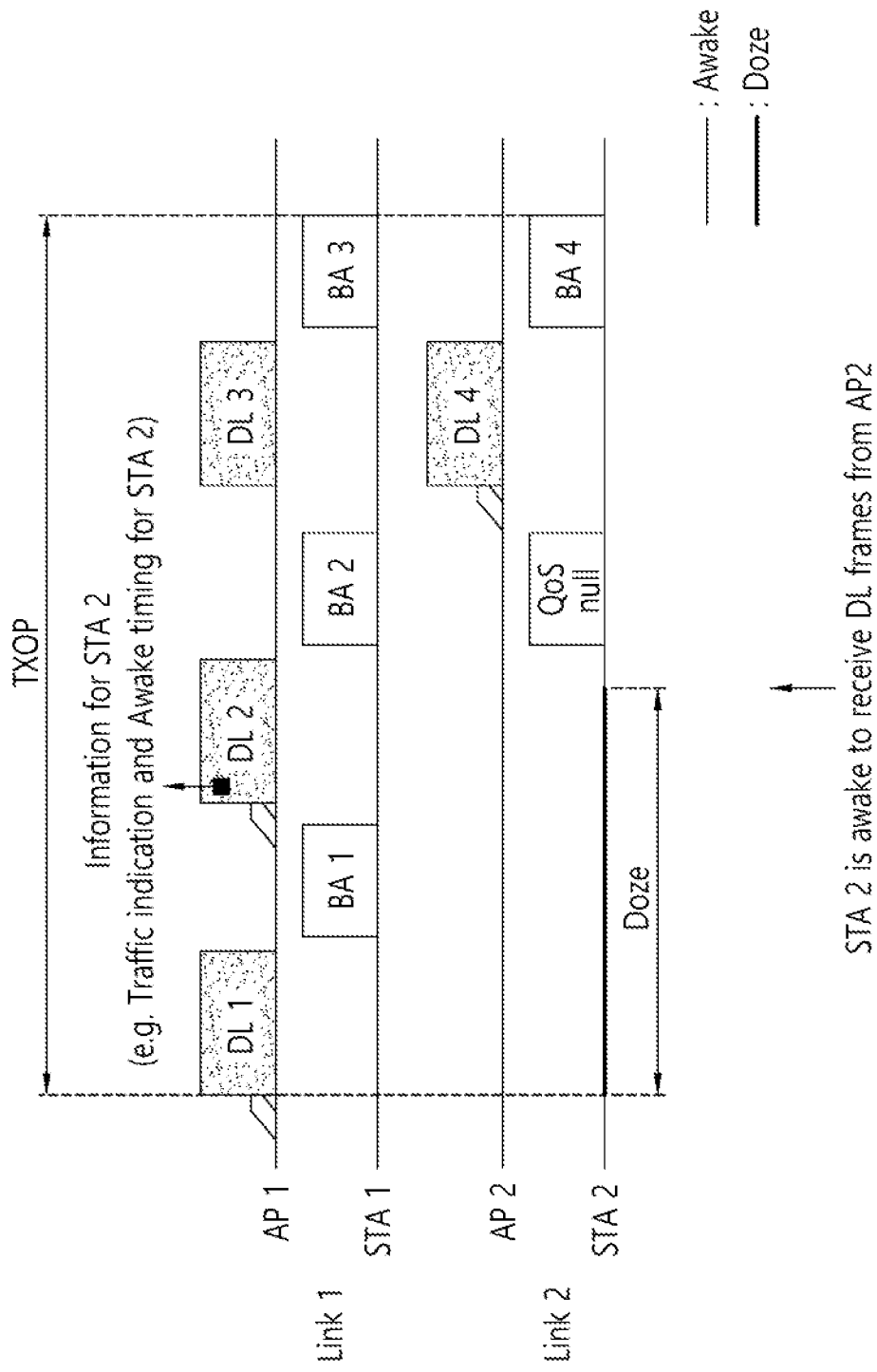
FIG. 49 shows another example of the operation of a non-AP MLD and an AP MLD.

FIG. 49 shows another example of the operation of a non-AP MLD and an AP MLD.

Referring to FIG. 49, AP 1 may transmit DL 2 PPDU duration information as awake time information for STA 2. Upon receiving the awake information, STA 2 may immediately awake or may awake according to the termination of the DL 2 PPDU reception by STA 1.

According to an embodiment, the awake STA 2 may transmit a frame for notifying AP 2 that it has awakened according to the UL TX timing for the ACK by STA 1. For example, STA 2 may notify AP 2 that it has awakened by transmitting a PS-Poll or QoS null frame to AP 2. As another example, information regarding that STA 2 has awakened may be transmitted through ACK or BA (for example, BA 2) transmitted by STA 1.

According to an embodiment, STA 2 may wake up based on the indication of DL 2. Non-AP MLD 1 may indicate information that STA 2 has awakened to BA 2 transmitted by STA 1 as an indication, and may transmit it to AP MLD 1. In this case, there is the effect of reducing overhead for UL data transmitted by STA 2.

After confirming that STA 2 has awakened, AP 2 may start transmitting DL data (that is, DL 4) to STA 2 during the transmission period of DL 3 frame by AP 1. However, whether AP 2 transmits DL data to STA 2 may be determined based on the channel access situation of AP 2 (for example, when the backoff count becomes 0).

According to the tenth embodiment, the amount of reduced power consumption may be reduced compared to the ninth embodiment. However, according to the tenth embodiment, there is the effect that STA 2 can clearly inform AP 2 that it has awakened.

In the ninth and tenth embodiments, an embodiment in which the AP MLD transmits DL data has been described. Hereinafter, an embodiment in which the non-AP MLD transmits UL data to the AP MLD may be described.

Signaling Process when UL PPDU is Transmitted

When STA 1 of Non-AP MLD 1, which does not support STR capability, transmits UL data to AP 1 through Link 1, STA 2 without a UL frame to transmit may enter a doze state. However, if it is assumed that DL data transmission from AP 2 to STA 2 does not occur during the same UL TXOP period, in the point of view of STA 2, there may be a period in which neither UL data transmission/DL data reception occurs during the UL TXOP period of STA 1. An example of this may be described with reference to FIG. 50.

Figure 50:
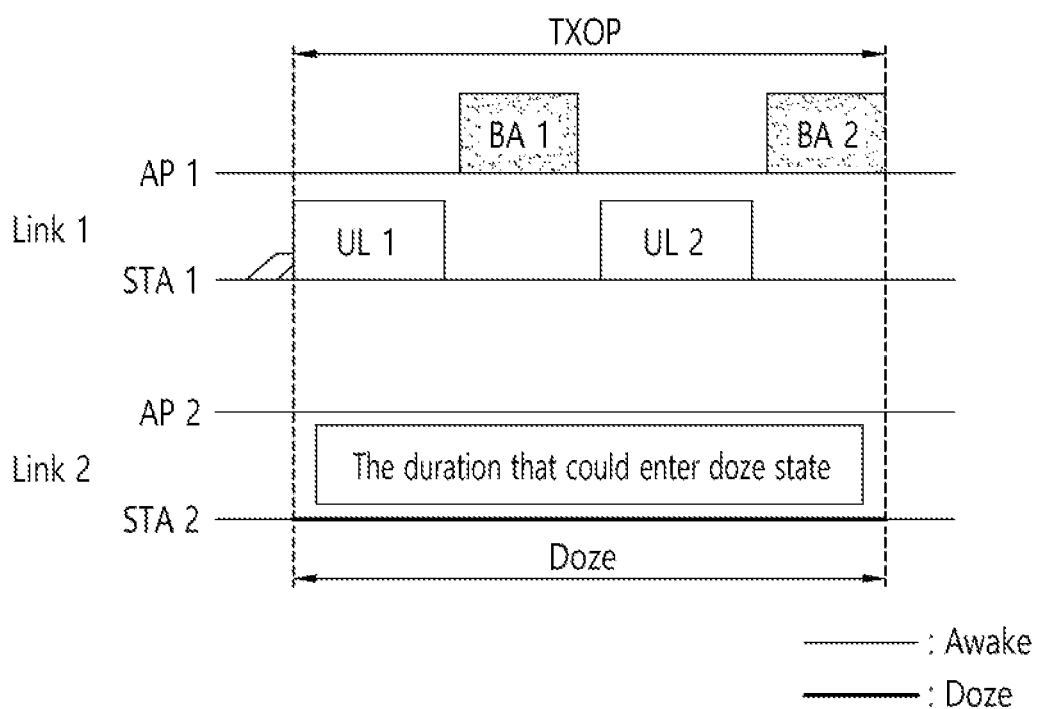
FIG. 50 shows another example of the operation of a non-AP MLD and an AP MLD.

FIG. 50 shows another example of the operation of a non-AP MLD and an AP MLD.

Referring to FIG. 50, STA 1 may acquire a TXOP and start UL TX transmission (for example, the transmission of UL 1 and UL 2). When STA 1 starts UL TX transmission, if STA 2 does not have a UL frame to transmit, it may enter a doze (or a doze state). Thereafter, STA 1 may receive BA 1 from AP 1. In this case, since the non-AP MLD does not support the STR capability, STA 2 can only receive DL from AP 2 and shall not perform UL transmission. Therefore, if there is no UL data to be transmitted by STA 2, until the UL TXOP of STA 1 ends, STA 2 may maintain a doze state. During the time when AP 1 performs DL transmission for BA 1 or BA 2 to STA 1, AP 2 may also transmit DL to STA 2. However, since the BA transmission period is short, it is difficult to perform DL transmission. Therefore, it is more efficient for STA 2 to maintain a doze state during this period.

According to an embodiment, when UL transmission data is generated during the UL TXOP period of STA 1, STA 2 may awake itself to transmit UL data according to the timing at which STA 1 transmits UL data. In this case, in order to prevent link interference, STA 2 should not perform UL transmission in the period in which AP 1 transmits ACK or BA to STA 1.

The Eleventh Embodiment

According to an embodiment, DL data for STA 2 may be buffered by AP 2 during the UL TXOP period of STA 1. When AP MLD 1 (for example, AP 1) informs STA 2 of information about that DL data for STA 2 has been buffered to AP 2, STA 2 may receive this DL data by waking before the end of the UL TXOP. For the above embodiment, AP MLD 1 (for example, AP 1) may transmit an indication including buffered traffic information for STA 2 through ACK or BA transmitted by itself. The above embodiment may be described with reference to FIG. 51.

Figure 51:
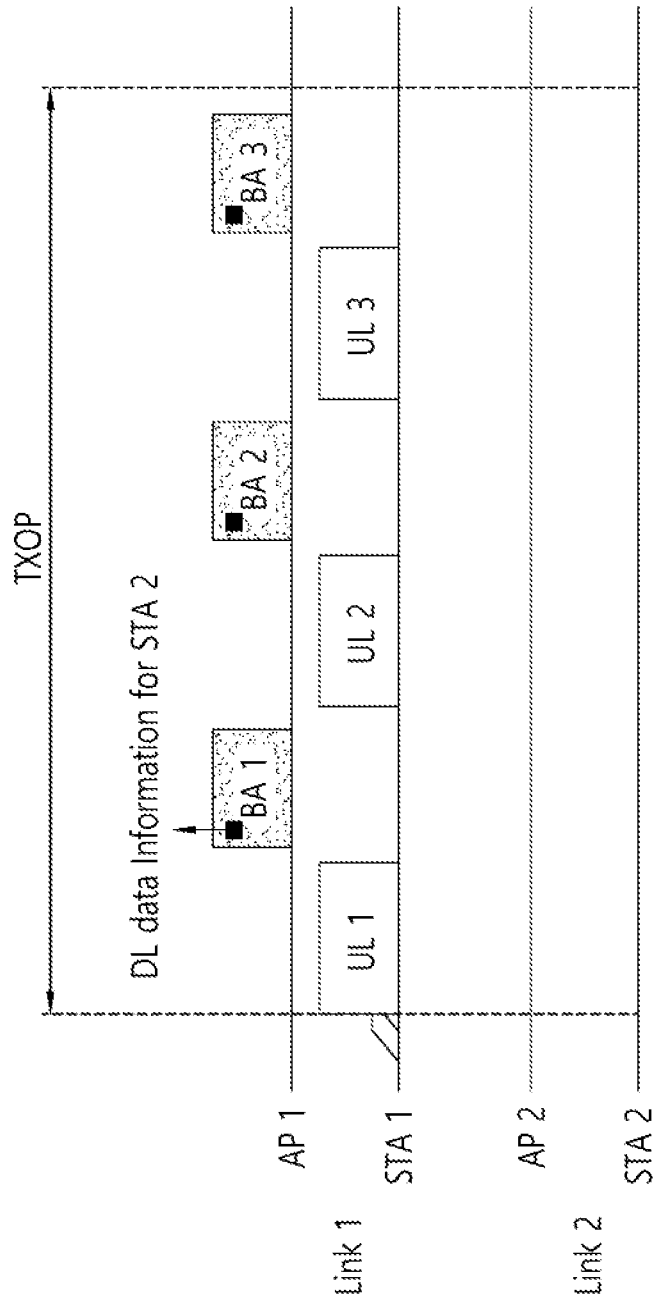
FIG. 51 shows another example of the operation of a non-AP MLD and an AP MLD.

FIG. 51 shows another example of the operation of a non-AP MLD and an AP MLD.

Referring to FIG. 51, for example, AP MLD 1 (for example, AP 1) indicates the presence or absence of a data buffer of a STA (for example, STA 2) connected to another link to an ACK or BA frame, so that it could inform whether there is a data buffer of a STA connected to another link.

The indication included in this ACK frame may be skipped, if there is no content to indicate to a STA (for example, STA 2) connected to another link. For example, when STA 2 does not have buffered data, the indication may be omitted in BA 1.

The Twelfth Embodiment

According to an embodiment, the indication described in the eleventh embodiment may be used as a signaling method to wake the non-AP MLD 1 operating as a power saving mechanism. AP 1 may transmit awake timing information along with the presence or absence of a DL data buffer of STA 1. AP 1 may transmit DL data after awaking STA 2 of the doze state. According to an embodiment, the awake timing information may be omitted. The above embodiment can be described with reference to FIG. 52.

Figure 52:
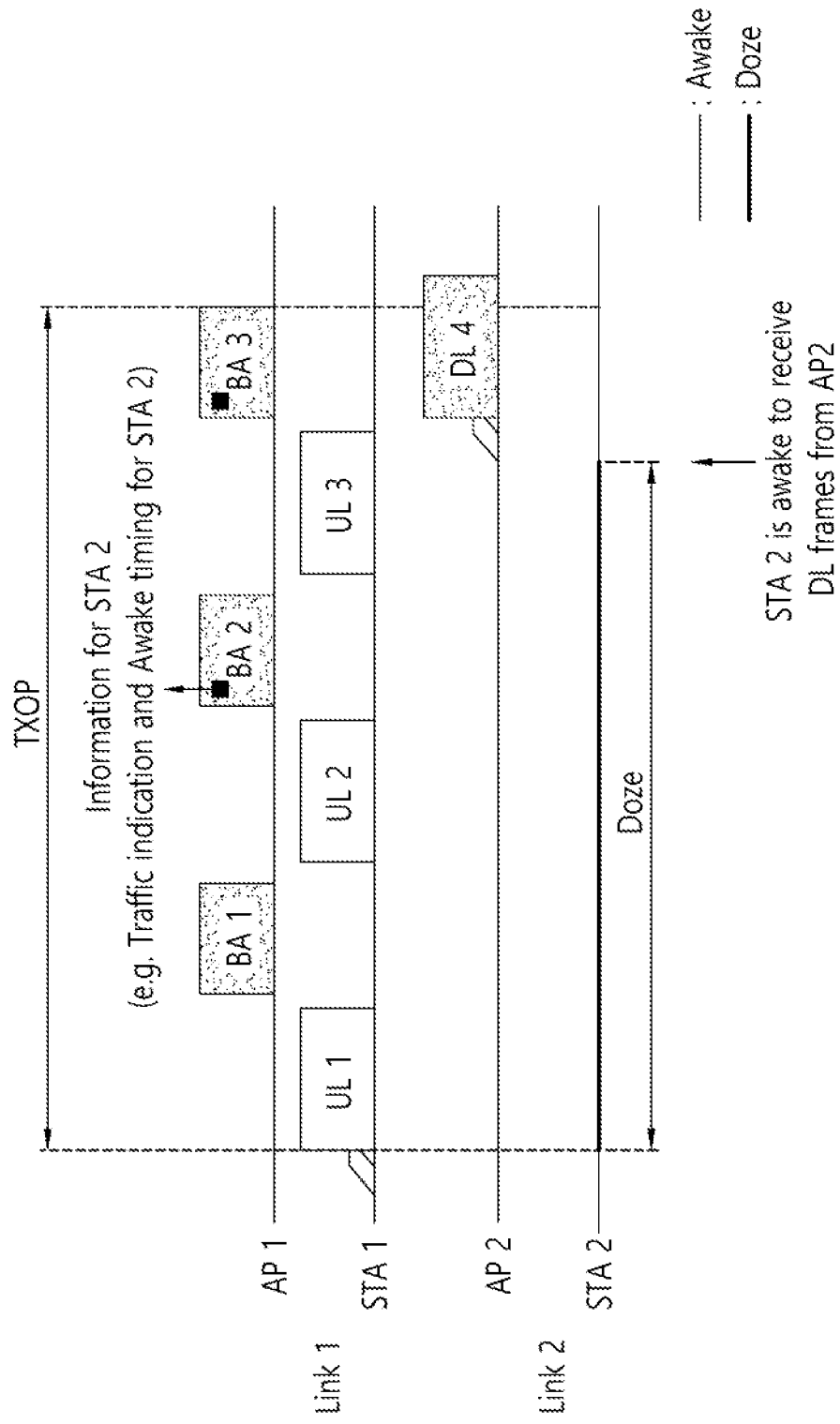
FIG. 52 shows another example of the operation of a non-AP MLD and an AP MLD.

FIG. 52 shows another example of the operation of a non-AP MLD and an AP MLD.

Referring to FIG. 52, when data for STA 2 occurs in the UL TXOP period, non-AP MLD 1 may change STA 2 to an awake state in the middle of the UL TXOP period.

For example, when STA 1 starts transmitting UL data, STA 2 having no UL data to transmit may enter a doze state. Since non-AP MLD 1 is non-STR capability, when STA 1 transmits UL, AP 2 does not transmit DL to STA 2 to avoid interference. Therefore, STA 2 can enter doze.

At this time, if non-AP MLD 1 checks that there is buffer data for STA 2 in AP 2 through BA 2, STA 2 may awake according to the awake timing transmitted through BA 2 (for example, before starting BA 3 transmission of AP 1). Awake STA 2 may receive DL data from AP 1 after UL 3 transmission of STA 1.

The Thirteenth Embodiment

According to an embodiment, when STA 2 wakes up through the indication described in the twelfth embodiment, STA 2 may notify AP MLD 1 (for example, AP 2) that it has awakened through a PS-Poll or QoS null frame. The above embodiment may be described with reference to FIG. 53.

Figure 53:
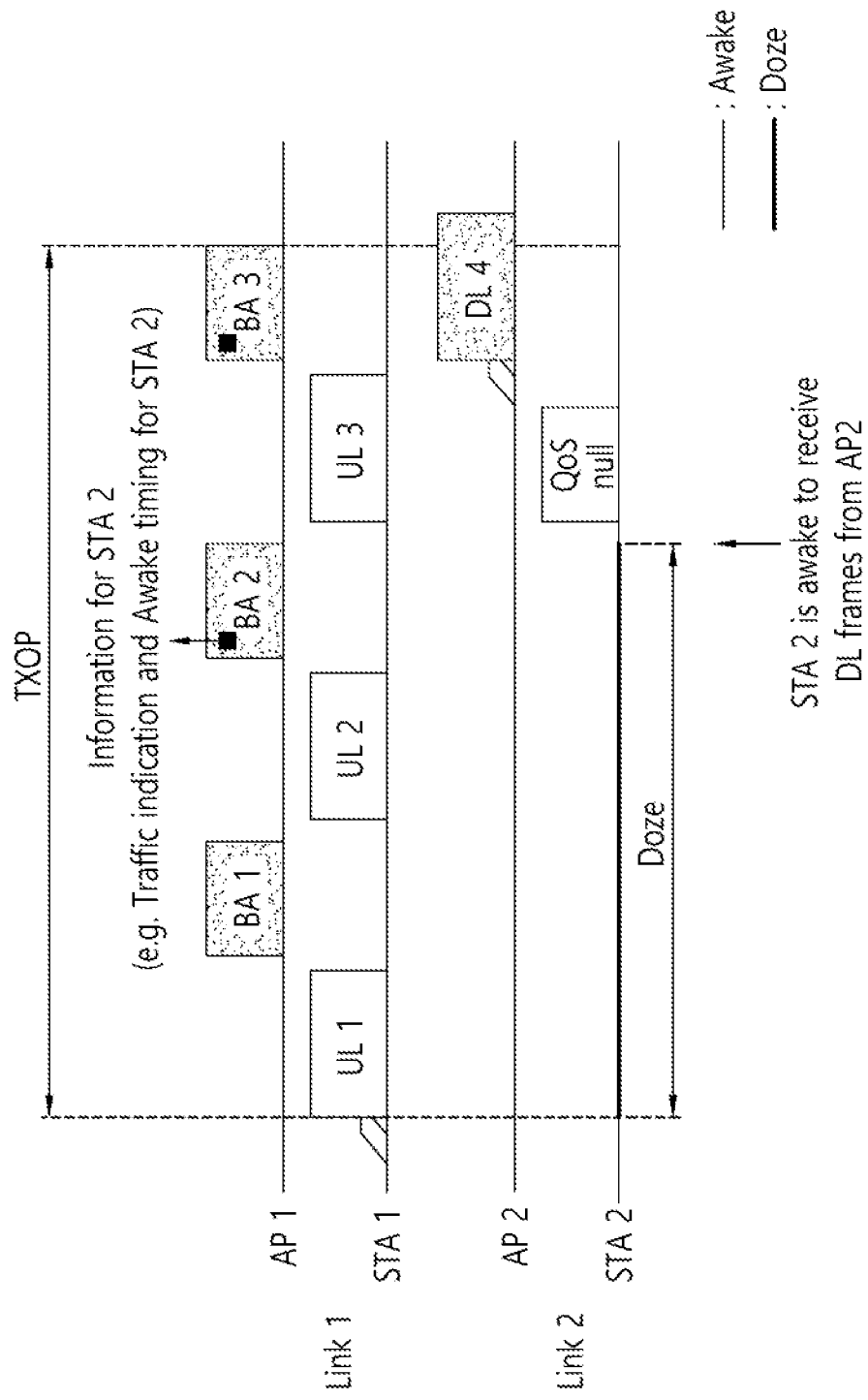
FIG. 53 shows another example of the operation of a non-AP MLD and an AP MLD.

FIG. 53 shows another example of the operation of a non-AP MLD and an AP MLD.

Referring to FIG. 53, non-AP MLD 1 and AP MLD 1 may operate similarly to the operation shown in FIG. 52 (that is, the twelfth embodiment).

However, unlike the twelfth embodiment, after awaking, STA 2 may transmit a QoS null frame (or PS-Poll frame) to AP 2 to inform that it has awakened. In this case, the QoS null frame (or PS-Poll frame) may be transmitted during the UL TX period of STA 1 to avoid inter-link interference. After that, the awake STA 2 may receive DL data from AP 2 according to the BA reception timing of the STA 1.

The thirteenth embodiment has the effect of notifying the AP MLD 1 (for example, AP 2) that STA 2 has awakened more reliably than the twelfth embodiment. However, the awake time may be slightly increased compared to the twelfth embodiment.

According to one embodiment, STA 2 may transmit information about whether it has awakened (for example, PS-Poll or QoS null frames, and the like) through a UL frame (for example, UL 3) transmitted by the STA 1. According to the above embodiment, an additional frame is not required for transmitting information about awake. Therefore, according to the above embodiment, there is the effect of reducing overhead.

The awake signaling method according to the above-described various embodiments is used during DL/UL TXOP and has the effect of waking a STA that has entered doze. However, in the case of non-AP MLD supporting non-STR capability, when a STA transmits UL through one link and an AP transmits DL through another link, a collision may occur. Therefore, it is possible for the STA to receive DL data through another link according to the timing at which the AP transmits ACK or BA for the UL data of the STA through one link.

Power Saving Mechanism of Non-AP MLD Supporting STR Capability

The above-described embodiments relate to the PSM of a non-AP MLD having the non-STR capability. According to an embodiment, the PSM may also be applied to a non-AP MLD supporting STR capability. Hereinafter, an embodiment related to the PSM of the non-AP MLD supporting the STR capability may be described. That is, the awake signaling method may be applied to MLD supporting STR capability.

Figure 54:
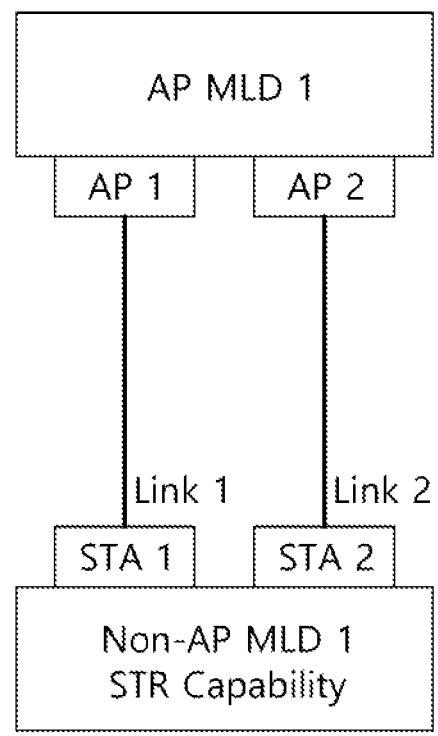
FIG. 54 shows an example of an AP MLD and a non-AP MLD supporting STR capability.

FIG. 54 shows an example of an AP MLD and a non-AP MLD supporting STR capability.

Referring to FIG. 54, AP MLD 1 may include AP 1 and AP 2. The non-AP MLD 1 may include STA 1 and STA 2. Non-AP MLD 1 and/or AP MLD 1 may support STR capability. AP 1 and STA 1 may be connected through link 1. AP 2 and STA 2 may be connected through link 2.

According to an embodiment, AP MLD 1 and/or non-AP MLD 1 may operate in a power save mode for each link. An embodiment in which the power save mode operates for each link may be described with reference to FIG. 55. The structures of an AP MLD and a non-AP MLD described in the following specification may correspond to structures of AP MLD 1 and non-AP MLD 1 of FIG. 54.

Figure 55:
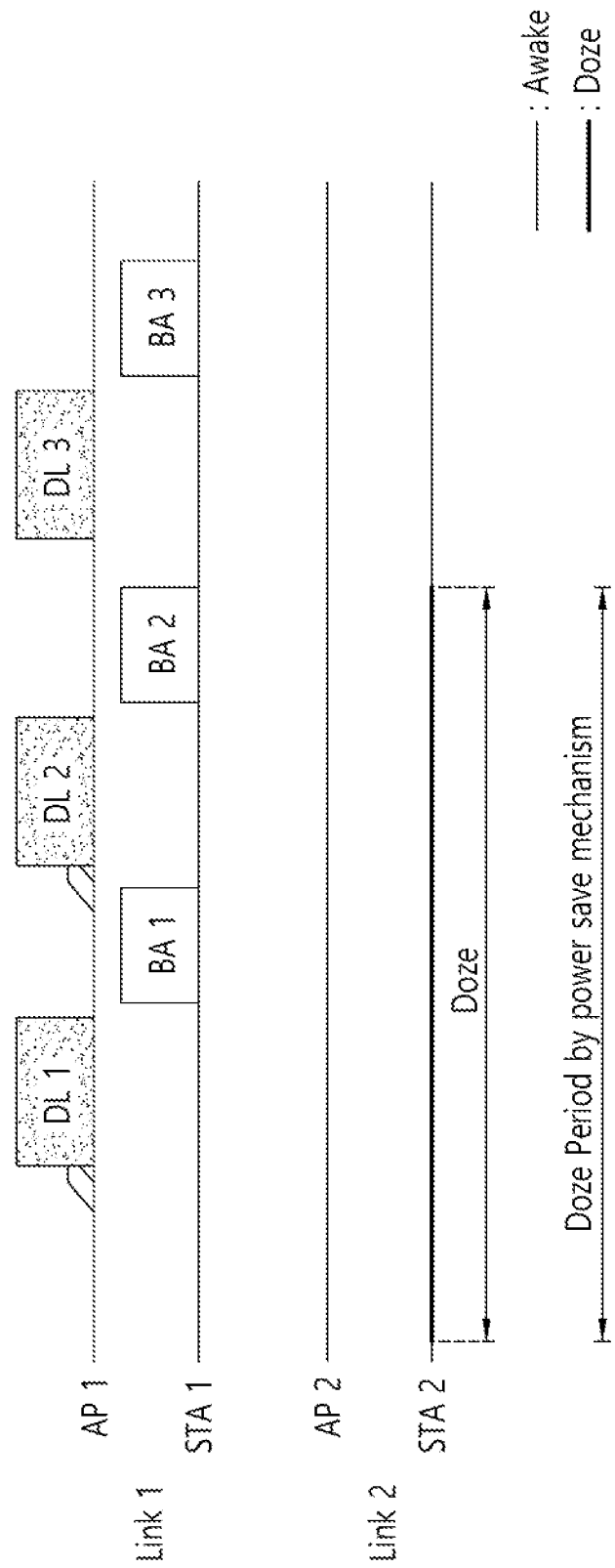
FIG. 55 shows another example of the operation of a non-AP MLD and an AP MLD.

FIG. 55 shows another example of the operation of a non-AP MLD and an AP MLD.

Referring to FIG. 55, in the MLD structure composed of two links shown in FIG. 54, Link 1 (that is, STA 1) and Link 2 (that is, STA 2) may independently operate a power save mechanism.

When non-AP MLD 1 supports STR capability, STA 2 may maintain doze and awake states according to its power save mechanism operation regardless of DL reception of STA 1. For example, when Link 2 operates with an opportunistic power save (OPS) mechanism, STA 2 enters a doze for the specified OPS Duration period regardless of the data transmission/reception operation of STA 1, and may wake up after that period.

According to an embodiment, in the case of MLD (for example, AP MLD 1), there is a case in which data is aggregated and transmitted simultaneously using multiple links in order to increase data transmission efficiency. For this, if there is a STA (for example, STA 2) that has entered the doze, it must be awakened. The above embodiment may be described with reference to FIG. 56.

Figure 56:
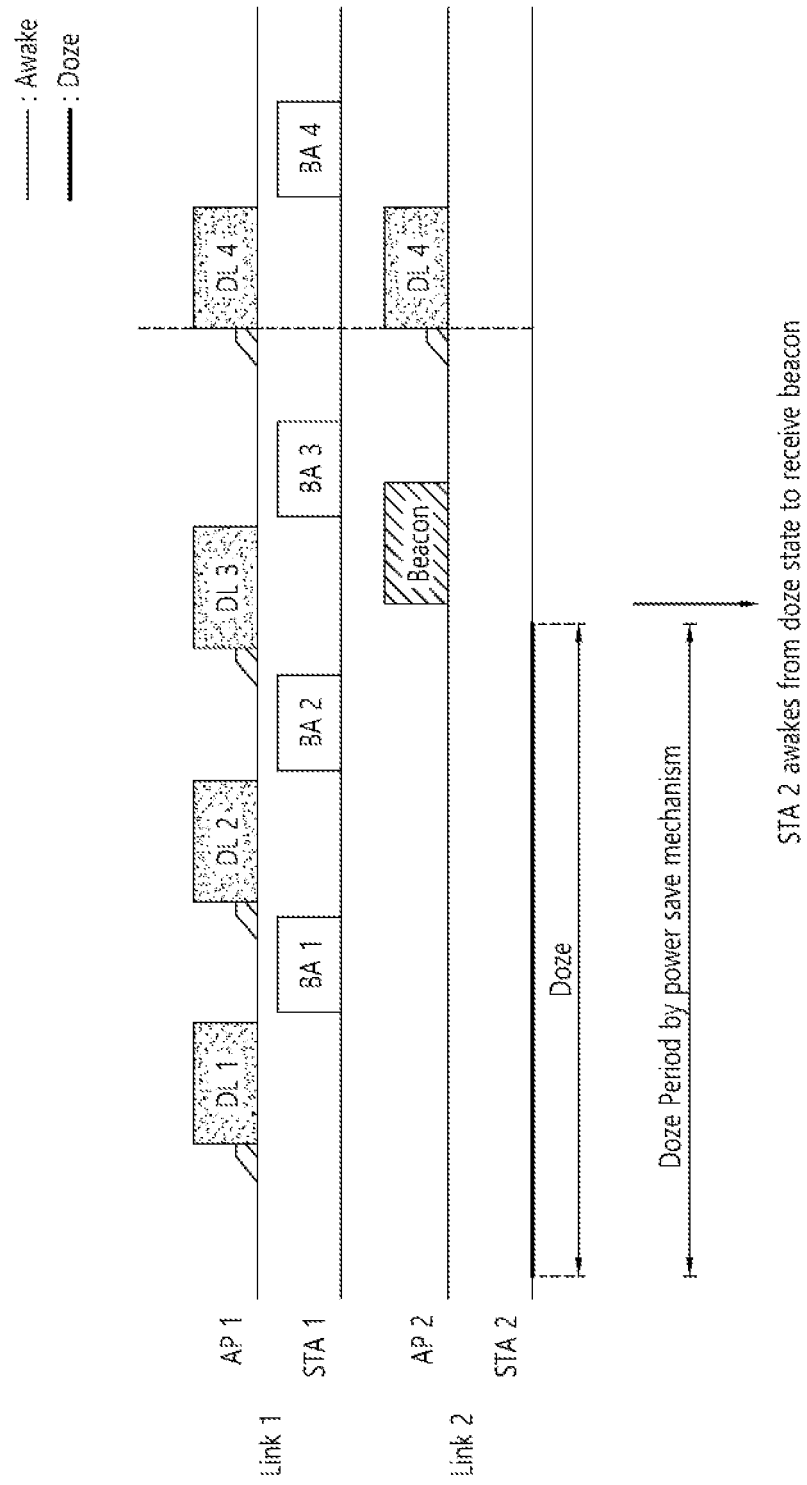
FIG. 56 shows another example of the operation of a non-AP MLD and an AP MLD.

FIG. 56 shows another example of the operation of a non-AP MLD and an AP MLD.

Referring to FIG. 56, when STA 2 enters the Doze state, AP 2 waits for the next TBTT period. When STA 2 awakes, information regarding the presence or absence of buffered data may be transmitted to STA 2 through the TIM element of the Beacon frame. Accordingly, STA 2 may maintain an awake state based on the beacon frame. That is, AP 2 may wait for STA 2 to wake up until the next TBTT of STA 2. After STA 2 wakes up, AP 2 may transmit a beacon frame and transmit DL data. AP 2 may transmit DL data (that is, DL 4) through link 1 and link 2 after aggregation.

According to one embodiment, when AP2 has buffer data to transmit to STA 2 that has entered doze, regardless of the next TBTT, STA 2 in the doze state may be awake by using the DL frame being transmitted in the other link (that is, link 1). Accordingly, in the following specification, an embodiment of awake signaling for awake of a STA (for example, STA 2) that has entered a doze state may be described.

The Fourteenth Embodiment

According to the fourteenth embodiment, similar to the above-described embodiment of the non-STR capability, the AP MLD 1 may transmit an indication indicating the presence or absence of buffer data of STA 2 (for example, traffic indication (TI) information for STA 2 (for example, TIM information)) in the DL frame being transmitted. An embodiment for this may be described with reference to FIG. 57.

Figure 57:
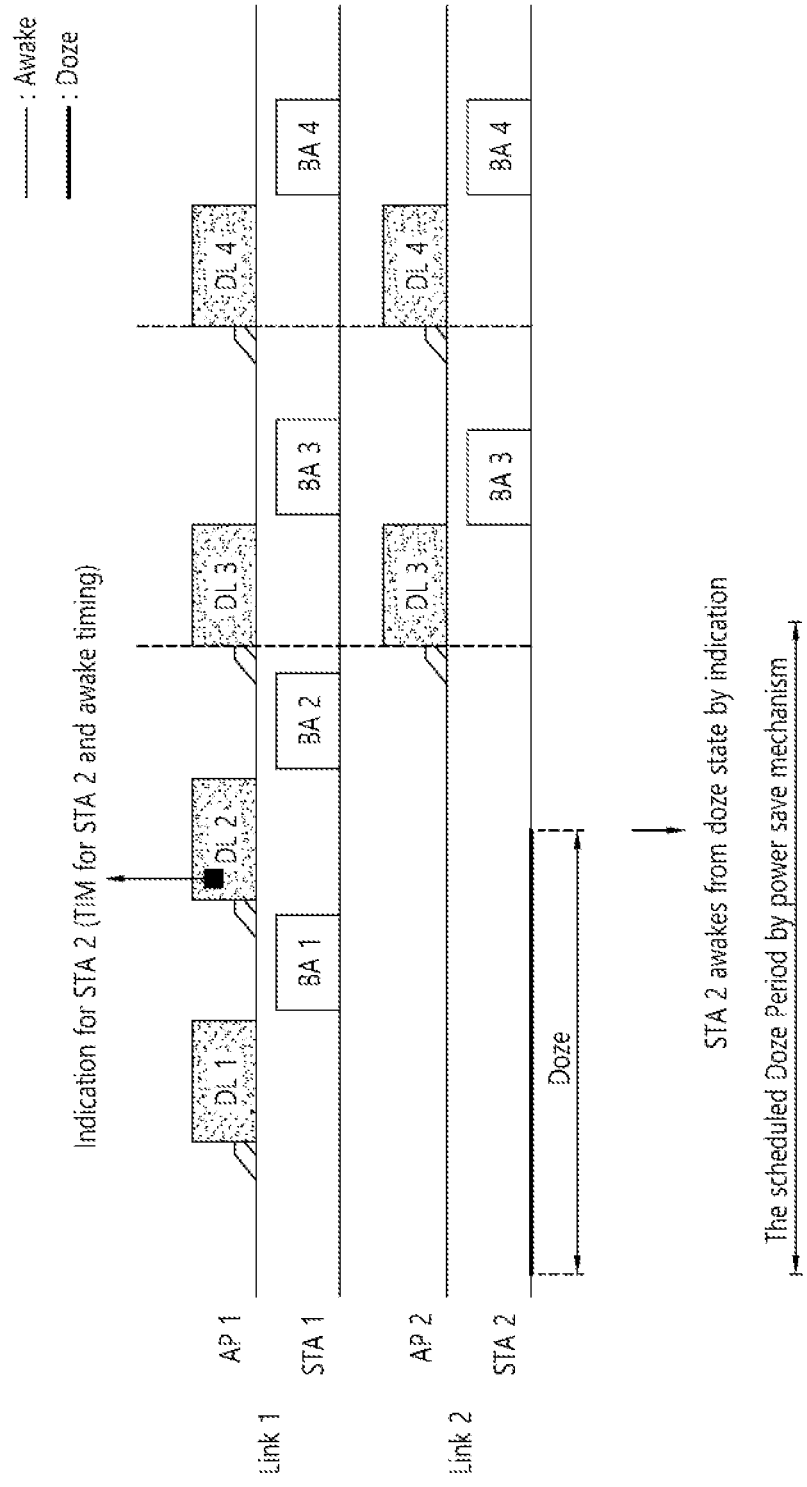
FIG. 57 shows another example of the operation of a non-AP MLD and an AP MLD.

FIG. 57 shows another example of the operation of a non-AP MLD and an AP MLD.

Referring to FIG. 57, STA 2 may enter doze for a period scheduled by a power saving mechanism. In this case, data to be transmitted from AP 2 to STA 2 may be generated. Without waiting until STA 2 wakes up (for example, next TBTT), AP MLD 1 (for example, AP 1) may include an indication for waking STA 2 in a DL frame transmitted to STA 1 and may transmit it. For example, the indication for awake STA 2 may include TI information (for example, TIM information) and/or awake timing information of STA 2. For example, if there is buffered data for STA 2 in TI information (for example, TIM information), the indication for awake STA 2 may further include information for requesting awake of STA 2.

Upon receiving the above-described information (or indication) from AP 1, STA 1 may wake STA 2 through information sharing in non-AP MLD 1. Based on the above-described information (or indication), AP MLD 1 may awake STA 2 that has already entered doze during the scheduling period.

The Fifteenth Embodiment

According to the fifteenth embodiment, the above-described fourteenth embodiment may be applied to the individual transmission for each link rather than aggregation data transmission of AP MLD. An example of the fifteenth embodiment may be described with reference to FIG. 58.

Figure 58:
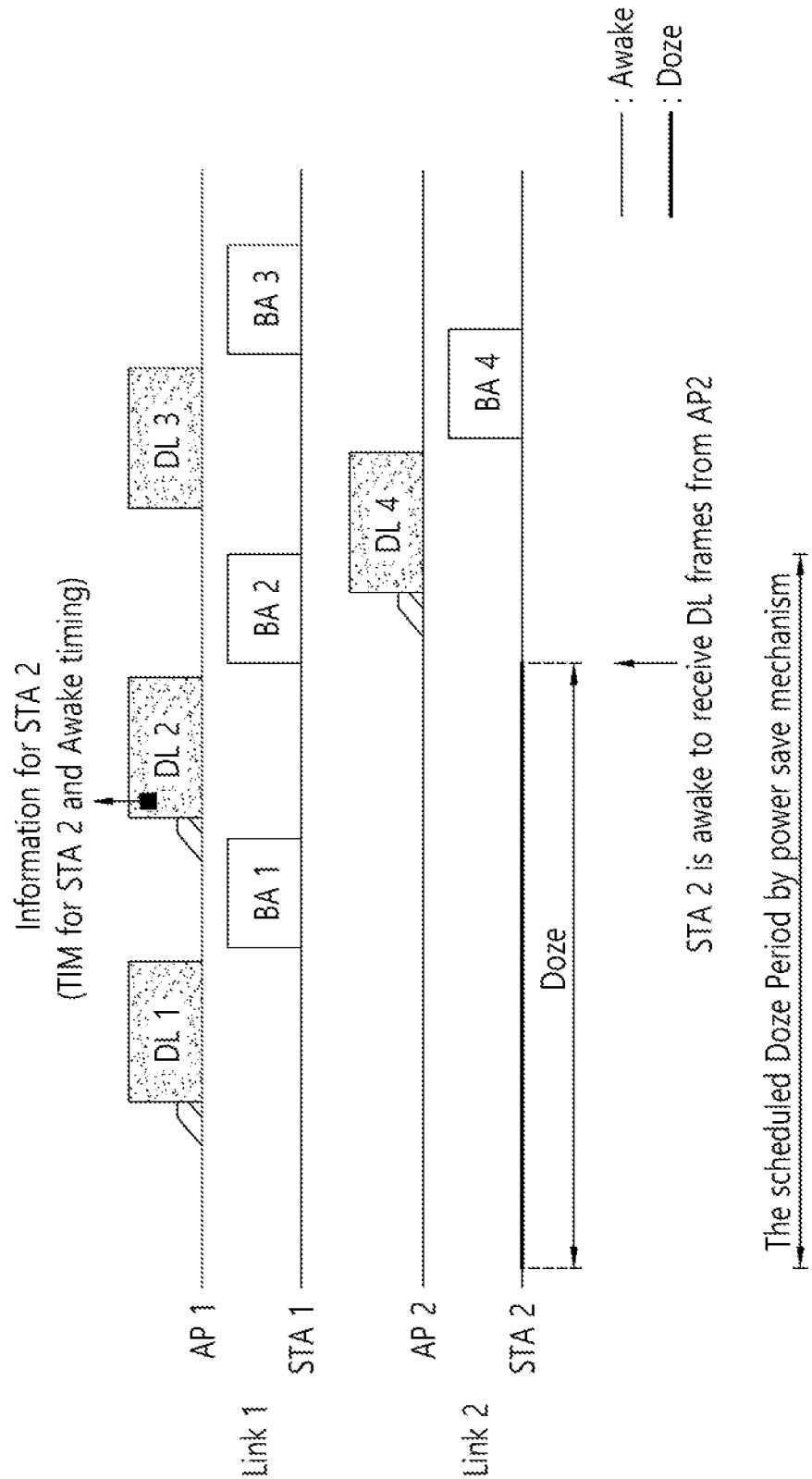
FIG. 58 shows another example of the operation of a non-AP MLD and an AP MLD.

FIG. 58 shows another example of the operation of a non-AP MLD and an AP MLD.

Referring to FIG. 58, when buffer data for STA 2 occurs in AP 2 (after STA 2 enters doze), AP 1 may wake STA 2 that has entered doze by the doze period which is previously scheduled through the DL frame. For example, AP 1 may include information about DL 2 having buffer data for STA 2 (for example, TI information (for example, TIM information) and/or information about awake timing). The non-AP MLD 1 may change from the doze state to the awake state based on information about the existence of buffer data for STA 2 and/or information about awake timing. Thereafter, STA 2 may receive DL 4.

The Sixteenth Embodiment

According to an embodiment, the awake STA 2 may transmit, to AP 2, a frame (for example, PS-Poll or QoS null frame) for notifying AP 2 that it has been awakened, in order to receive more accurate DL data. After confirming that STA 2 has awakened, AP 2 may start transmitting the buffered DL data to the STA 2. The above embodiment can be described with reference to FIGS. 59 and 60.

Figure 59:
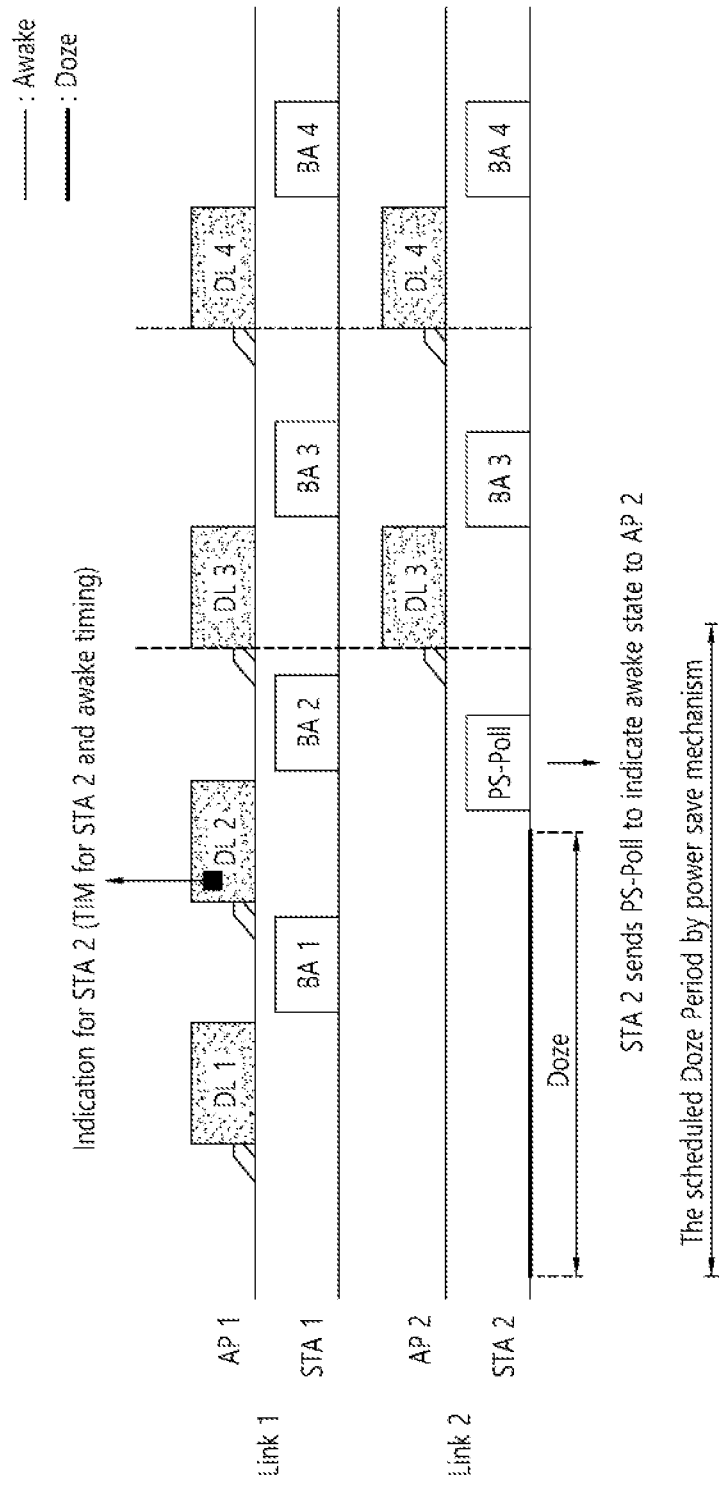
FIG. 59 shows another example of the operation of a non-AP MLD and an AP MLD.

FIG. 59 shows another example of the operation of a non-AP MLD and an AP MLD.

Referring to FIG. 59, STA 2 may transmit a PS-Poll frame to notify AP 2 that it has changed to an awake state. AP 2 may transmit DL 3 based on the PS-Poll frame. For example, DL 3 may be transmitted over Link 1 and Link 2.

Figure 60:
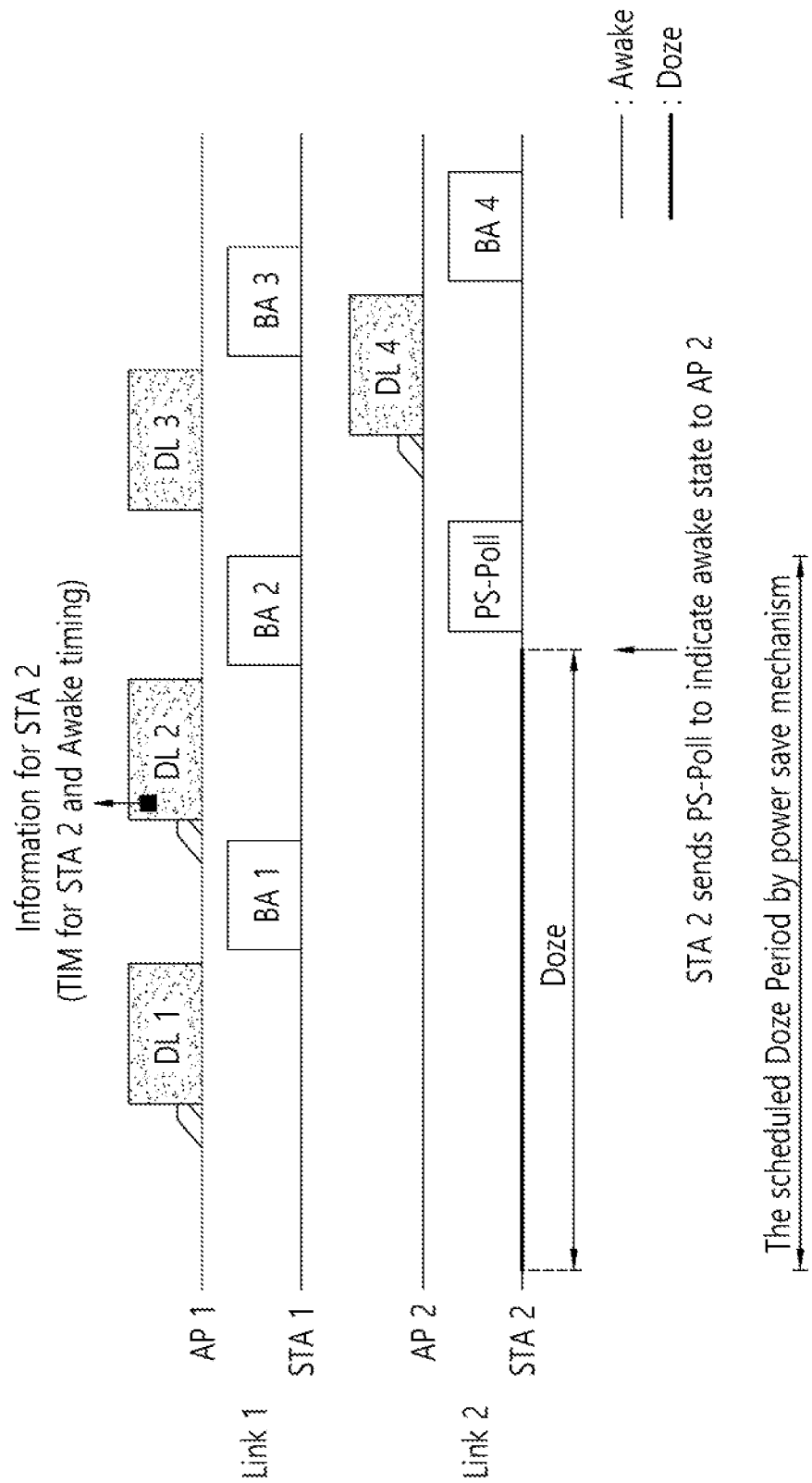
FIG. 60 shows another example of the operation of a non-AP MLD and an AP MLD.

FIG. 60 shows another example of the operation of a non-AP MLD and an AP MLD.

Referring to FIG. 60, STA 2 may transmit a PS-Poll frame to notify AP 2 that it has changed to an awake state. AP 2 may transmit DL 4 based on the PS-Poll frame. For example, DL 4 may be transmitted through link 2 independently from link 1.

According to the sixteenth embodiment, although the message overhead for PS-Poll transmission is increased compared to the embodiment of FIG. 15, there is the effect that STA 2 can clearly inform AP 2 that it has been awakened.

According to the above-described various embodiments, the non-AP MLD that does not support STR capability has the effect of reducing unnecessary power consumption. Additionally, an embodiment related to awake signaling for the non-AP MLD supporting STR capability has been proposed, and according to the embodiment, the non-AP MLD supporting STR capability can also reduce unnecessary power consumption.

In addition, according to the various embodiments described above, there is the effect of increasing the autonomy of the AP for DL data transmission to the STA that has entered the doze state for power saving. The above-described embodiments may be more usefully applied to aggregation data transmission using multi-link.

Figure 61:
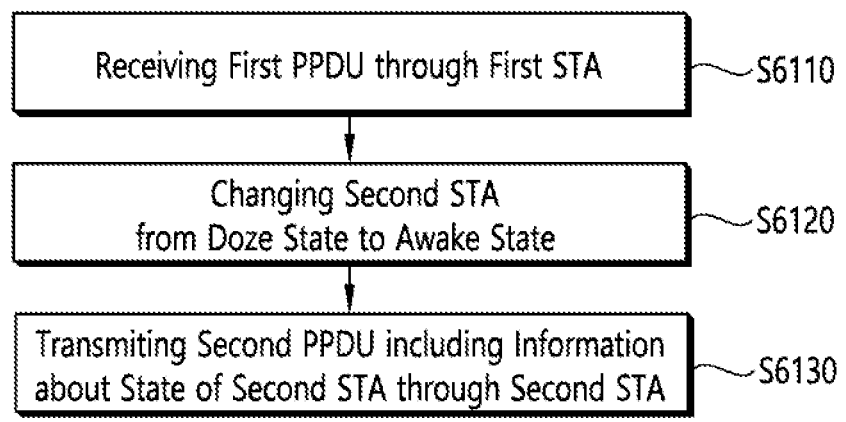
FIG. 61 is a flowchart for explaining the operation of a multi-link device.

FIG. 61 is a flowchart for explaining the operation of a multi-link device.

Referring to FIG. 61, in step S6110, a multi-link device (MLD) (for example, non-AP MLD 1 described above) may receive a first PPDU through a first STA (for example, STA 1 described above). In other words, the multi-link device (MLD) may receive the first PPDU through the first link.

According to an embodiment, the multi-link device may include a first STA and a second STA (for example, STA 2 described above). For example, the first STA may be associated with the first link (for example, link 1 described above). As an example, the first STA may operate in the first link. In other words, the first STA may be connected to the first link. For example, the second STA may be associated with a second link (for example, link 2 described above). As an example, the second STA may operate on the second link. In other words, the second STA may be connected to the second link.

According to an embodiment, the first link may be included in one of 2.4 GHz, 5 GHz, 6 GHz bands. In addition, the second link may also be included in one of the 2.4 GHz, 5 GHz, 6 GHz bands.

According to an embodiment, the first link may be configured by a combination of at least one channel included in the 2.4 GHz, 5 GHz, and 6 GHz bands. The second link may also be configured by a combination of at least one channel included in the 2.4 GHz, 5 GHz, and 6 GHz bands.

According to an embodiment, the first STA may include a first processor and/or a first transceiver. Also, the second STA may include a second processor and/or a second transceiver.

For example, the first STA and the second STA may be controlled by the processor of the multi-link device and may operate by the processor of the multi-link device. For example, the processor of the multi-link device may request the processor of the first STA to transmit/receive a signal through the first link. The processor of the first STA may transmit/receive a signal through the first link in response to the request.

For another example, the first STA and the second STA may operate independently. For example, the first STA may perform communication through the first link based on the first processor and the first transceiver. In addition, the second STA may perform communication through the second link based on the second processor and the second transceiver. The processor of the multi-link device may transmit information necessary for the multi-link operation to the first STA or the second STA. The first STA or the second STA may perform a multi-link operation based on information necessary for the multi-link operation.

According to one embodiment, the multi-link device can receive a first PPDU from the AP multi-link device. The AP multi-link device can obtain a TXOP on the first STA. In other words, the AP multi-link device can obtain a TXOP for transmitting signals/data from the first STA. For example, the multi-link device can receive a first PPDU within the TXOP for the first STA.

According to one embodiment, after the AP multi-link device obtains a TXOP on the first STA, the second STA (or second link) may operate in the Power Saving Mechanism (PSM) mode. In other words, the second STA can operate in PSM mode within TXOP on the first STA.

According to an embodiment, the PSM mode may be set based on whether simultaneous transmit and receive (STR) is supported.

For example, the PSM mode may operate when simultaneous transmit and receive (STR) is not supported. For example, the PSM mode may include a non-STR PSM mode. If the STR is not supported, the second STA may enter a doze state in the PSM mode. When data to be received by the second STA occurs during the PSM mode, the second STA may receive data within the same period as the first STA (for example, a PPDU transmission period transmitted to the first STA).

For example, the PSM mode may operate even when simultaneous transmit and receive (STR) is supported. For example, the PSM mode may include an STR PSM mode.

According to an embodiment, the first PPDU may include information about traffic buffered in the second STA. For example, information about traffic buffered in the second STA may include information about timing to change to the awake state and/or TI information (example, TIM information). For example, information about traffic buffered in the second STA may include information informing that there is the traffic buffered in the second STA. For example, information about traffic buffered in the second STA may include information for changing the second STA from the doze state to the awake state.

According to an embodiment, information about the traffic buffered in the second STA may be included in the PPDU (for example, the first PPDU) only when the traffic buffered in the second STA is included. When there is no traffic buffered in the second STA, information on traffic buffered in the second STA may be omitted.

In operation S6120, the multi-link device (MLD) may change the second STA from the doze state to the awake state.

According to one embodiment, the multi-link device can change the second STA from the doze state (or sleep state) to the awake state in response to the first PPDU. For example, the multi-link device may change the second STA from a doze state to an awake state based on information about traffic buffered in the second STA.

For example, the multi-link device can change the second STA from the doze state to the awake state based on the Traffic Indication (TI) information. TI information may include various information. For example, TI information may include Traffic Indication Map (TIM) information and/or more information about more data bit.

As an example, the multi-link device may change the second STA from the doze state to the awake state based on information about the timing to change to the awake state.

In step S6130, the multi-link device (MLD) may transmit a second PPDU including information about the state of the second STA through the second STA. According to an embodiment, after the state of the second STA is changed to the awake state, the multi-link device may transmit a second PPDU including information about the state of the second STA through the second STA. For example, the information about the state of the second STA may include information about the state of the second STA being awake. For example, the second PPDU may include a power save-poll (PS-Poll) frame or a quality of service (QoS) null frame.

According to an embodiment, the second PPDU may be transmitted within the TXOP for the first STA. That is, even when the TXOP for the second PPDU is not obtained, the second PPDU may be transmitted within the TXOP for the first STA.

For example, the second PPDU can be transmitted together in the transmission section of the ACK frame for the first PPDU. For example, when the multi-link device does not support the STR, the second PPDU may be transmitted together in the transmission period of the ACK frame for the first PPDU.

As another example, when the multi-link device supports the STR, the second PPDU may be transmitted regardless of the transmission period of the ACK frame for the first PPDU. In other words, the second PPDU may be transmitted independently from a frame transmitted from the first STA (or first link).

According to an embodiment, the multi-link device may receive the traffic through the second STA based on the second PPDU.

For example, if the multi-link device does not support STR, the multi-link device may receive the traffic (or a PPDU including the traffic) within the TXOP for the first STA, during a transmission period of the PPDU transmitted to the first STA.

For another example, when the multi-link device supports the STR, the multi-link device may independently receive the traffic (or a PPDU including the traffic).

According to an embodiment, the multi-link device may receive the traffic through a first STA (or a first link) and a second STA (or a second link) based on the second PPDU. The traffic may be aggregated and received.

Figure 62:
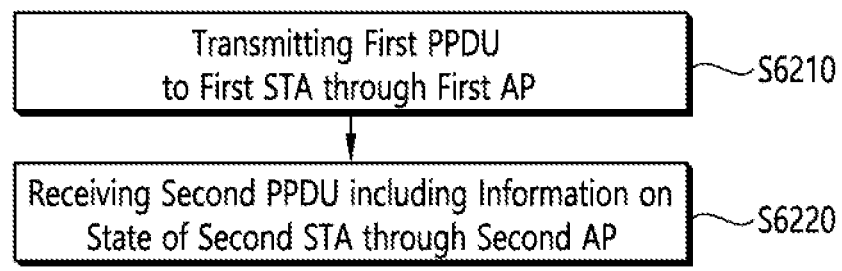
FIG. 62 is a flowchart for explaining the operation of an AP multi-link device.

FIG. 62 is a flowchart for explaining the operation of an AP multi-link device.

Referring to FIG. 62, in step S6210, the AP multi-link device (for example, AP MLD 1 described above) may transmit a first PPDU to the first STA (for example, STA 1 described above) through the first AP (for example, AP 1 described above). In other words, the AP multi-link device may transmit the first PPDU to the first STA through the first link (for example, link 1 described above).

According to an embodiment, the AP multi-link device may include a first AP and a second AP (for example, AP 2 described above). For example, a first AP may be associated with a first link. As an example, the first AP may operate in the first link. In other words, the first AP may be connected to the first link. For example, the second AP may be associated with a second link (for example, link 2 described above). As an example, the second AP may operate in the second link. In other words, the second AP may be connected to the second link.

According to an embodiment, the first link may be included in one of 2.4 GHz, 5 GHz, 6 GHz bands. In addition, the second link may also be included in one of the 2.4 GHz, 5 GHz, 6 GHz bands.

According to an embodiment, the first link may be configured by a combination of at least one channel included in the 2.4 GHz, 5 GHz, and 6 GHz bands. The second link may also be configured by a combination of at least one channel included in the 2.4 GHz, 5 GHz, and 6 GHz bands.

According to an embodiment, the first AP may include a first processor and/or a first transceiver. Also, the second AP may include a second processor and/or a second transceiver.

For example, the first AP and the second AP may be controlled by the processor of the multi-link device and may operate by the processor of the multi-link device. For example, the processor of the multi-link device may request the processor of the first AP to transmit/receive a signal through the first link. The processor of the first AP may transmit/receive a signal through the first link in response to the request.

For another example, the first AP and the second AP may operate independently. For example, the first AP may perform communication through the first link based on the first processor and the first transceiver. In addition, the second AP may perform communication through the second link based on the second processor and the second transceiver. The processor of the multi-link device may transmit information necessary for the multi-link operation to the first AP or the second AP. The first AP or the second AP may perform a multi-link operation based on information necessary for the multi-link operation.

According to one embodiment, the AP multi-link device can transmit a first PPDU to the multi-link device. The AP multi-link device can obtain a TXOP on the first STA. In other words, the AP multi-link device can obtain a TXOP for transmitting signals/data from the first STA. For example, the multi-link device can receive a first PPDU within the TXOP for the first STA.

According to one embodiment, after the AP multi-link device obtains a TXOP on the first STA, the second STA (or second link) may operate in the Power Saving Mechanism (PSM) mode. In other words, the second STA can operate in PSM mode within TXOP on the first STA.

According to an embodiment, the PSM mode may be set based on whether simultaneous transmit and receive (STR) is supported.

For example, the PSM mode may operate when simultaneous transmit and receive (STR) is not supported. For example, the PSM mode may include a non-STR PSM mode. If the STR is not supported, the second STA may enter a doze state in the PSM mode. When data to be transmitted from the second AP to the second STA occurs in the PSM mode, the second AP may transmit data within the same period as the first AP (for example, a transmission period of the PPDU transmitted by the first AP).

For example, the PSM mode may operate even when simultaneous transmit and receive (STR) is supported. For example, the PSM mode may include an STR PSM mode.

According to an embodiment, the first PPDU may include information about traffic buffered in the second STA.

For example, information on traffic buffered in the second STA may include traffic indication (TI) information and/or information on timing to change to an awake state. For example, the TI information may include various types of information. The TI information may include traffic indication map (TIM) information and/or information about more data bits.

For example, the information about the traffic buffered in the second STA may include information about the presence of the traffic buffered in the second STA. For example, information about traffic buffered in the second STA may include information for changing the second STA from a doze state to an awake state.

According to an embodiment, information on traffic buffered in the second STA may be included in the PPDU (for example, the first PPDU), only when the traffic buffered in the second STA is included. When there is no traffic buffered in the second STA, information on traffic buffered in the second STA may be omitted. In other words, when there is no traffic buffered in the second STA, the AP multi-link device may transmit a PPDU that does not include information about the traffic buffered to the second STA.

In step S6220, the AP multi-link device may receive a second PPDU including information on the state of the second STA through the second AP.

According to an embodiment, after the state of the second STA is changed to the awake state, the AP multi-link device may receive a second PPDU including information about the state of the second STA through the second AP. For example, the information about the state of the second STA may include information about the state of the second STA being awake. For example, the second PPDU may include a power save-poll (PS-Poll) frame or a quality of service (QoS) null frame.

According to an embodiment, the second PPDU may be received within the TXOP for the first STA. That is, even when the TXOP for the second PPDU is not obtained, the second PPDU may be received within the TXOP for the first STA.

For example, the second PPDU may be received together in the reception period of the ACK frame for the first PPDU. For example, when the multi-link device (or AP multi-link device) does not support the STR, the second PPDU may be received together in the reception period of the ACK frame for the first PPDU.

For another example, if the multi-link device (or AP multi-link device) supports the STR, the second PPDU may be received regardless of the reception period of the ACK frame for the first PPDU. In other words, the second PPDU may be independently received regardless of a frame transmitted from the first STA (or first link).

According to an embodiment, the AP multi-link device may transmit the traffic through the second AP based on the second PPDU.

For example, if the multi-link device (or AP multi-link device) does not support STR, the AP multi-link device may transmit the traffic (or the PPDU including the traffic) within the TXOP for the first STA during the transmission period of the PPDU to be transmitted to the first STA.

As another example, when the multi-link device (or AP multi-link device) supports the STR, the AP multi-link device may independently transmit the traffic (or the PPDU including the traffic).

According to an embodiment, the AP multi-link device may transmit the traffic through a first AP (or a first link) and a second AP (or a second link) based on the second PPDU. The traffic may be aggregated and transmitted. For example, the AP multi-link device may aggregate the traffic and transmit a PPDU including the traffic through the first AP and the second AP.

The technical features of the present disclosure described above may be applied to various devices and methods. For example, the above-described technical features of the present disclosure may be performed/supported through the apparatus of FIGS. 1 and/or 19. For example, the above-described technical features of the present disclosure may be applied only to a part of FIGS. 1 and/or 19. For example, the technical features of the present disclosure described above may be implemented based on the processing chips 114 and 124 of FIG. 1, may be implemented based on the processors 111 and 121 and the memories 112 and 122 of FIG. 1, or may be implemented based on the processor 610 and the memory 620 of FIG. 19. For example, the apparatus of the present disclosure includes a processor and a memory coupled to the processor. The processor may be adapted to receive, through a first STA operating in a first link, a first physical layer protocol data unit (PPDU), wherein the first PPDU includes information on traffic buffered in a second STA operating in a second link; change the second STA from a doze state to an awake state in response to the first PPDU; and transmit, through the second STA, a second PPDU including information on a state of the second STA, after the state of the second STA is changed to the awake state.

The technical features of the present disclosure may be implemented based on a computer readable medium (CRM). For example, a CRM proposed by the present disclosure may store instructions which perform operations including the steps of receiving, through a first STA operating in a first link, a first physical layer protocol data unit (PPDU), wherein the first PPDU includes information on traffic buffered in a second STA operating in a second link; changing the second STA from a doze state to an awake state in response to the first PPDU; and transmitting, through the second STA, a second PPDU including information on a state of the second STA, after the state of the second STA is changed to the awake state. The instructions stored in the CRM of the present disclosure may be executed by at least one processor. At least one processor related to CRM in the present disclosure may be the processors 111 and 121 or the processing chips 114 and 124 of FIG. 1, or the processor 610 of FIG. 19. Meanwhile, the CRM of the present disclosure may be the memories 112 and 122 of FIG. 1, the memory 620 of FIG. 19, or a separate external memory/storage medium/disk.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a multi-link device (MLD) including a first station (STA) and a second STA in a wireless local area network system, the method comprising:
    receiving, through the first STA operating in a first link, a first physical layer protocol data unit (PPDU),
    wherein the first PPDU includes information on traffic buffered in the second STA operating in a second link;
    changing the second STA from a doze state to an awake state in response to the first PPDU; and
    transmitting, through the second STA, a second PPDU including information on a state of the second STA, after the state of the second STA is changed to the awake state.

2. The method of claim 1,
    wherein the information on the traffic buffered in the second STA includes traffic indication (TI) information or information on timing to change to the awake state.

3. The method of claim 1,
    wherein the second PPDU is transmitted within a transmission opportunity (TXOP) for the first STA.

4. The method of claim 1,
    wherein the second STA operates in a power saving mechanism (PSM) mode within the TXOP for the first STA.

5. The method of claim 4,
    wherein the PSM mode is configured based on whether simultaneous transmission and reception (STR) is supported.

6. The method of claim 1,
    wherein the second PPDU is transmitted together in a transmission period of an acknowledgment (ACK) frame for the first PPDU.

7. The method of claim 1,
    wherein the second PPDU includes a power save-poll (PS-Poll) frame or a quality of service (QoS) null frame.

8. The method of claim 1,
    wherein the information on the state of the second STA includes information on the state of the second STA being the awake state.

9. The method of claim 1, wherein the method further comprises,
    receiving, through the second STA, the traffic based on the second PPDU.

10. The method of claim 1, wherein the method further comprises,
    receiving, through the first STA and the second STA, the traffic based on the second PPDU,
    wherein the traffic is aggregated and received.

11. The method of claim 1,
    wherein the first link is included in one of 2.4 GHz, 5 GHZ, and 6 GHz bands, and
    wherein the second link is included in one of the 2.4 GHZ, 5 GHZ, and 6 GHz bands.

12. A method performed by an AP multi-link device (MLD) including a first access point (AP) and a second AP in a wireless local area network system, the method comprising:
    transmitting, to a first station (STA) through the first AP operating in a first link, a first physical layer protocol data unit (PPDU),
    wherein the first PPDU includes information on traffic buffered in the second STA operating in a second link; and
    receiving, through the second AP operating in the second link, a second PPDU including information on a state of the second STA, after the state of the second STA is changed to the awake state.

13. A multi-link device (MLD) in a wireless local area network system, the MLD comprising:
    a first station (STA) operating in a first link among a multi-link;
    a second STA operating in a second link among the multi-link; and
    a processor coupled to the first STA and the second STA,
    wherein the processor is adapted to,
    receive, through the first STA, a first physical layer protocol data unit (PPDU), wherein the first PPDU includes information on traffic buffered in the second STA;
    change the second STA from a doze state to an awake state in response to the first PPDU; and
    transmit, through the second STA, a second PPDU including information on a state of the second STA, after the state of the second STA is changed to the awake state.

14. The MLD of claim 13,
    wherein the information on the traffic buffered in the second STA includes traffic indication (TI) information or information on timing to change to the awake state.

15. The MLD of claim 13,
    wherein the second PPDU includes a power save-poll (PS-Poll) frame or a quality of service (QoS) null frame.

16. The MLD of claim 13,
    wherein the second PPDU is transmitted together in a transmission period of an acknowledgment (ACK) frame for the first PPDU.

17. The MLD of claim 13, wherein the processor is further adapted to:
    receive, through the first STA and the second STA, the traffic based on the second PPDU,
    wherein the traffic is aggregated and received.

* * * * *